United States Patent
Kulp et al.

(10) Patent No.: US 10,547,990 B2
(45) Date of Patent: Jan. 28, 2020

(54) DYNAMIC ADAPTABLE ENVIRONMENT RESOURCE MANAGEMENT CONTROLLER APPARATUSES, METHODS AND SYSTEMS

(71) Applicant: SCHNEIDER ELECTRIC USA, INC., Andover, MA (US)

(72) Inventors: Yann Kulp, Winnetka, IL (US); Jason Lien, Lavergne, TN (US); Simon Leblond, Montreal (CA); Pierre Paquette, Montreal (CA); Patrick R. Lemire, La Prairie (CA)

(73) Assignee: Schneider Electric Buildings, LLC, Rockford, IL (US)

( * ) Notice: Subject to any disclaimer, the term of this patent is extended or adjusted under 35 U.S.C. 154(b) by 532 days.

(21) Appl. No.: 15/113,663

(22) PCT Filed: Jan. 23, 2015

(86) PCT No.: PCT/US2015/012711
§ 371 (c)(1),
(2) Date: Jul. 22, 2016

(87) PCT Pub. No.: WO2015/112877
PCT Pub. Date: Jul. 30, 2015

(65) Prior Publication Data
US 2017/0070842 A1 Mar. 9, 2017

Related U.S. Application Data

(60) Provisional application No. 61/931,460, filed on Jan. 24, 2014.

(51) Int. Cl.
*H04W 4/50* (2018.01)
*H04W 4/38* (2018.01)
(Continued)

(52) U.S. Cl.
CPC .......... *H04W 4/50* (2018.02); *H04L 12/2803* (2013.01); *H04L 67/10* (2013.01); *H04W 4/021* (2013.01);
(Continued)

(58) Field of Classification Search
CPC ........ H04W 4/50; H04W 4/38; H04W 4/021; H04L 12/2803; H04L 67/10; H04L 67/325; G06Q 50/10; G05B 2219/2614
(Continued)

(56) References Cited

U.S. PATENT DOCUMENTS 4,354,241 A * 10/1982 Barello ............. G05D 23/1917
340/3.71
4,369,916 A * 1/1983 Abbey ..................... F24F 11/30
236/11
(Continued)

FOREIGN PATENT DOCUMENTS

KR 101013807 B1 2/2011

OTHER PUBLICATIONS

Extended European Search Report for European Application No. 15740385.8 dated Jul. 27, 2017.
(Continued)

*Primary Examiner* — Kenneth M Lo
*Assistant Examiner* — Michael W Choi
(74) *Attorney, Agent, or Firm* — Locke Lord LLP

(57) ABSTRACT

The DYNAMIC ADAPTABLE ENVIRONMENT RESOURCE MANAGEMENT CONTROLLER APPARATUSES, METHODS AND SYSTEMS ("DAERMC") transforms various user, component and environment inputs into responsive environment outputs. In some implementations, the DAERMC allows users to manage a plurality of locations via mobile electronic devices (e.g., electronic mobile devices, resource management devices, and/or the like), and
(Continued)

may be able to integrate and provide a plurality of information from said devices, including location data, current and projected weather data, current and future resource usage data, messages and/or like notifications, resource usage schedules, resource usage reports, resource usage settings, overrides, and/or the like.

17 Claims, 28 Drawing Sheets

(51) Int. Cl.
   *H04W 4/021* (2018.01)
   *H04L 12/28* (2006.01)
   *H04L 29/08* (2006.01)
(52) U.S. Cl.
   CPC ....... *H04W 4/38* (2018.02); *G05B 2219/2614* (2013.01)
(58) Field of Classification Search
   USPC .......................................................... 700/276
   See application file for complete search history.

(56) References Cited

U.S. PATENT DOCUMENTS

| | | | |
|---|---|---|---|
| 5,192,020 A * | 3/1993 | Shah | G05D 23/1904 236/46 R |
| 5,833,134 A * | 11/1998 | Ho | G05D 23/1905 236/49.3 |
| 2005/0119766 A1 * | 6/2005 | Amundson | G05D 23/1904 700/17 |
| 2005/0171645 A1 | 8/2005 | Oswald et al. | |
| 2009/0282357 A1 | 11/2009 | Schultz et al. | |
| 2010/0116224 A1 * | 5/2010 | Leeland | F24H 1/186 122/14.21 |
| 2011/0184562 A1 | 7/2011 | Amundson et al. | |
| 2011/0257795 A1 | 10/2011 | Narayanamurthy et al. | |
| 2012/0273581 A1 | 11/2012 | Kolk et al. | |
| 2012/0299728 A1 * | 11/2012 | Kirkpatrick | G06Q 10/109 340/541 |
| 2013/0052946 A1 | 2/2013 | Chatterjee et al. | |
| 2013/0234840 A1 * | 9/2013 | Trundle | G08C 19/16 340/12.53 |
| 2014/0131009 A1 * | 5/2014 | Zhou | F28F 27/00 165/104.14 |
| 2015/0051741 A1 * | 2/2015 | Bruck | F24F 11/30 700/276 |

OTHER PUBLICATIONS

International Search Report and Written Opinion for International Application No. PCT/US2015/012711 dated Apr. 29, 2015.
International Preliminary Report on Patentability and Written Opinion of the International Searching Authority for International Patent Application No. PCT/US2015/012711, dated Aug. 4, 2016.

* cited by examiner

DYNAMIC ADAPTABLE ENVIRONMENT RESOURCE MANAGEMENT CONTROLLER APPARATUSES, METHODS AND SYSTEMS

This application is a National Stage of International Patent Application Serial No. PCT/US2015/012711, filed Jan. 23, 2015, which in turn claims priority to and benefit of U.S. Provisional Application No. 61/931,460, filed Jan. 24, 2014 and entitled "DYNAMIC ADAPTABLE ENVIRONMENT RESOURCE MANAGEMENT CONTROLLER APPARATUSES, METHODS AND SYSTEMS"; the entirety of each of the aforementioned applications is herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address resource management, and more particularly, include DYNAMIC ADAPTABLE ENVIRONMENT RESOURCE MANAGEMENT CONTROLLER APPARATUSES, METHODS AND SYSTEMS.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Users may wish to control a plurality of resources within an area of a home and/or like building. A user may use an electronic device to monitor resource use.

BRIEF DESCRIPTION OF THE DRAWINGS

The accompanying drawings illustrate various non-limiting, example, innovative aspects in accordance with the present descriptions.

Figure 1A:
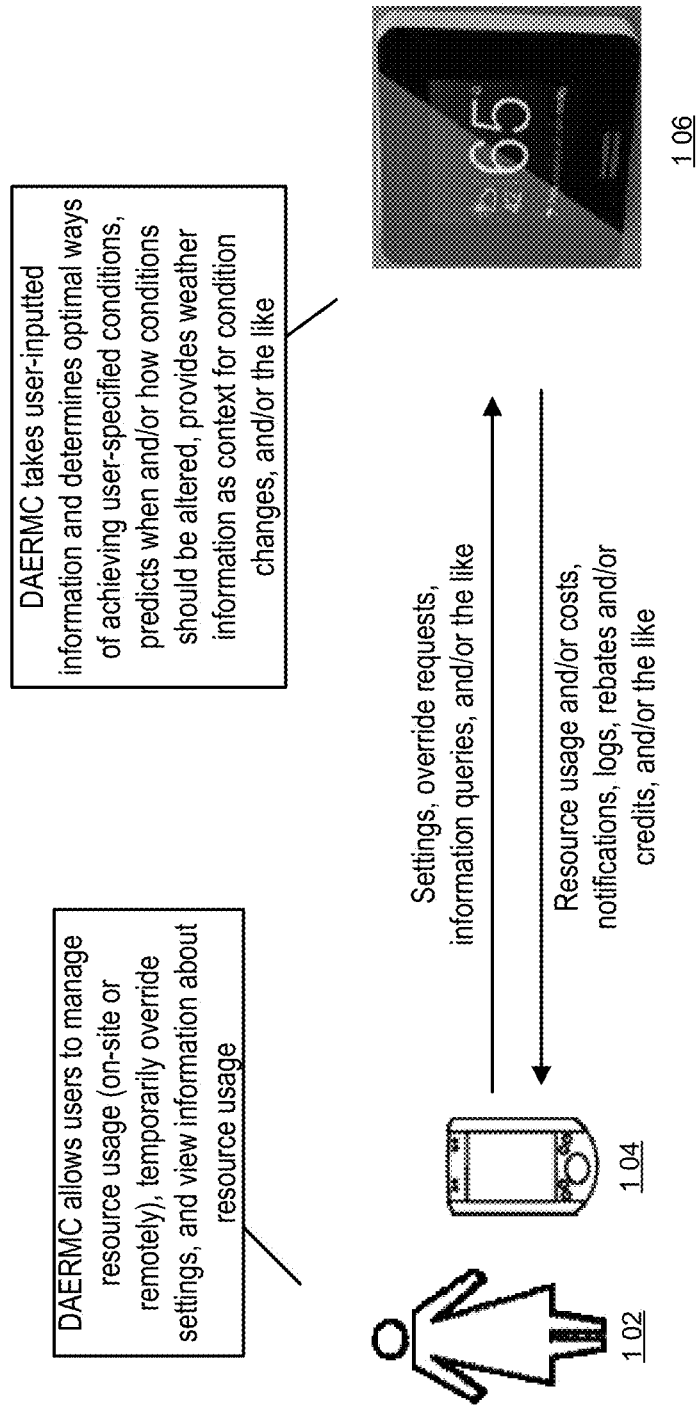
FIG. 1A shows a block diagram illustrating example embodiments of the DAERMC.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In some implementations, users may wish for streamlined ways of managing a variety of resources, e.g., within their homes and/or the like. In some implementations, DAERMC may allow users to manage a plurality of locations and/or the like via an application usable through electronic devices (e.g., electronic mobile devices, resource management devices, and/or the like), and may be able to view a plurality of information from said devices, including current and projected weather data, current and future resource usage data, messages and/or like notifications, resource usage schedules, resource usage reports, resource usage settings, and/or the like. In some implementations the background of the application is customizable and/or dynamically updates to reflect the user's location, current weather conditions, and/or the like. The resource management device can comprise a thermostat control located within a residential indoor enclosure, and can include a display, user interface, temperature sensor, HVAC control relays, and a remote control radio. It can also be compatible with 3H/2C stages, gas standing pilot and electric ignition, gas and oil fired burners, electric heat, 3-wire hot water motor valves, and/or air, ground, and/or hydro exchangers. The resource management device can also have heat/cool/auto and/or off system settings, auto and/or on fan settings. The resource management device can allow the user to adjust heat and cool setpoints (described in greater detail below), e.g., locally (on the resource management device's display) and/or remotely (e.g., via a mobile application on a mobile device).

In some implementations, the user may be able to hold down interactive buttons, dials, and/or like mechanisms in order to increase or decrease the amount of usage of a particular resource, to change the settings regarding a particular resource, and/or the like. In some implementations, holding down a button and/or the like may allow the user to override current settings temporarily in order to achieve an immediate effect, e.g., temporarily raising the temperature in order to achieve an immediate rise in the overall temperature of someone's living room, and/or the like. In some implementations such modifications may be made remotely or directly via a device in control of the resource. In some implementations overrides may also be used for longer periods of time, e.g., for vacations and/or the like, in order to create long-term resource usage changes without permanently altering existing resource schedules and/or the like. In some implementations the DAERMC may use previous settings (e.g., the user's previous override instructions and/or previous settings input, and/or the like), along with user proximity data (e.g., via geofencing, iBeacons, and/or the like) in order to predict when a user may wish to temporarily override her current settings and/or to make suggestions to the user about when to override settings (e.g., if a user wishes the settings to be overridden in order to reach a specified temperature quickly by the time she gets home, the DAERMC may be able to use a plurality of data in order to suggest when the user should override the settings in order to ensure her home is at her specified temperature when she reaches home, and/or the like).

In some implementations, a schedule can be a sequence of events (e.g., temperature changes) in time, e.g., for a predetermined period of time (e.g., for an hour, for a day, for a month, and/or for an undefined period of time). Control logic to control the temperature in the house/building can be kept in the DAERMC database as a schedule event. A schedule can include a start and end time for a schedule (and/or a start time and a duration for the schedule), a temperature set point and/or a series of temperature set points, and a duty cycle. A schedule can comprise or consist of 7 days, with, for example, at least 4 periods per day, with heat/cool setpoints available for each period. Users can program schedules either through the resource management device, and/or remotely, e.g., via a mobile application and/or the like. The resource management device can store and operate the current schedule in the absence of connectivity to the internet/cloud. If possible, the schedule can default to Energy Star (or similar) energy use recommendations.

Schedules can be created for daily events, Demand Response (DR) events, and/or for schedule exceptions like Heat/Cool Blast events (described at least in FIGS. 8-11). In some implementations, some schedules may be prioritized over other schedules; for example, DR schedules may have priority over Heat/Cool Blast schedules, which may have priority over manual user changes to a schedule, which may have priority over a user-created daily schedule.

To generate temporary schedules and/or manual events which may override a normal schedule, the resource management device may determine whether a temporary override of the normal schedule is allowed, the type of command being entered (e.g., temporary manual override, a temporary override of the normal schedule with a different schedule, and/or the like), a status of the resource management device (e.g., if the resource management device is off or on, which mode it is in currently, and/or the like), and heating and/or cooling setpoints from the normal schedule, a sleep mpde, an away mode, a vacation mode, and/or a manual mode, in order to determine effective heating and cooling setpoints for the temporary schedule and/or manual event which is replacing the normal schedule. The resource management device can also use motion detection input from a motion detection sensor to determine when to change modes, when to override a running schedule with a different schedule (e.g., to override an away mode schedule with a normal schedule if the resource management device detects a user within the home, and/or vice-versa).

Heat Blasts (e.g., a type of Comfort Boost) can allow the user to temporarily turn the heat on by generating a brief "blast" of heat to provide the user with the comfort of a quick warm up without affecting the user's current schedule. The blast may be time-based such that the user, when adjusting the desired setpoint, will initiate a 15 minute blast by use of a long press on the "up" arrow or similar. At such time the resource management device display may provide a countdown of time remaining in the blast while allowing the user to add time in 5 minute, 15 minute, and/or similar increments. The user may also be presented with a cancel feature during the countdown. Such that the user can cancel the heat blast if she so chooses. The resource management device can maintain the current control setpoint (scheduled or manual) once the blast is complete. A heat blast temperature setpoint can either be specified by the user, and/or can be set to a maximum temperature (e.g., based on the maximum temperature the resource management device can implement while keeping appliances and/or other utilities in working order). A heat blast may also be limited in duration, e.g., may be limited to a duration of 60 minutes and/or a like value. The user may only be able to increment this time in smaller increments, e.g., in order to encourage energy efficiency.

Cool Blasts (e.g., another type of Comfort Boost) can allow the user to temporarily turn the air conditioning to generate brief "blast" of cool air to provide the user with the comfort of a quick cool down without affecting the schedule. The blast may be time-base such that the user, when adjusting the desired setpoint, will initiate a 15 minute blast by use of a long press on the "down" arrow or similar. At such time the resource management device display may provide a countdown of time remaining in the blast while allowing the user to add time in 5 minute, 15 minute, and/or similar increments. The user may also, similar to during a heat blast, be presented with a cancel feature during the countdown. Such that the user can cancel the heat blast if she so chooses. The resource management device can maintain the current control setpoint (scheduled or manual) once the blast is complete. A cool blast temperature setpoint can either be specified by the user, and/or can be set to a minimum temperature (e.g., based on the minimum temperature the resource management device can implement while keeping appliances and/or other utilities in working order). A cool blast may also be limited in duration, e.g., may be limited to a duration of 60 minutes and/or a like value. The user may only be able to increment this time in smaller increments, e.g., in order to encourage energy efficiency.

The resource management device can provide a means of notifying the user of a DR event. Notification before and during the event can be provided. Messaging may be used to provide pre-event notification, but color or a unique indicator can also provide notification that an event is in-progress.

In some implementations users may also specify setpoints, e.g., high and low points for resource usage, between which devices may cycle in order to maintain preferred conditions within a space. In some implementations the DAERMC may be able to provide an estimate of how long it may take for a device to achieve the conditions the user may want, e.g., how long it may take to heat up a living room from 65° F. to 75° F. In some implementations it may be an educated estimation, e.g., based on the user's floorplans and/or space dimensions, based on previous records of the user raising the temperature of the space by ten degrees, and/or the like. In other implementations DAERMC may estimate based on how long it has taken others, e.g., within the same building, area, and/or the like, to heat their rooms and/or the like.

In some implementations, DAERMC may also calculate and provide resource usage reports and/or forecasts for the user in order to allow the user to view her resource usage and predict how much her bills will be, how much of her resources she is likely to use during a given time period, and/or the like. In some implementations resource usage may be broken down based on who has altered the settings, what scheduled time period changes have occurred, and/or the like. In some implementations, the user may be able to select data points on graphs and/or the like to determine details about various rooms, various users who have altered settings within the rooms, and/or the like.

In some implementations, the user may also be able to enroll in a demand response rewards program and/or a like program which allows the user to elect to have her resource settings altered, e.g., during peak times for the resource and/or emergencies, in exchange for receiving benefits for opting into the program a pre-determined number of times. In some implementations the user may receive rebates, coupons, gift cards and/or other benefits from enrolling and participating in the program. In some implementations users may receive stamps, stickers, and/or like indicators of how many times they have opted into a demand response event, and may allow users to view, for example, how many more times they may need to opt in to an event before they receive a rebate and/or the like, how many times they may opt out before they will no longer receive a rebate and/or the like, and/or the like. A demand response event may take in current heating and cooling setpoints, whether demand response changes are enabled, as well as demand response settings provided by the user and/or a utility company (e.g., a cooling setpoint, cooling setpoint use, cooling setpoint offset, cooling setpoint offset use, heating setpoint, heating setpoint use, heating setpoint offset, and/or heating setpoint offset use), to generate effective heating and cooling setpoints to use throughout the demand response event.

In some implementations users may be able to set resource schedules, e.g., periods of time in which resource usage may vary due to differing circumstances. For example, in some implementations a user may wish to specify that resources may be utilized less when the user is away than they may be when the user is in the monitored location, and/or the like. In some implementations the user may specify which parts of the day require different schedules, e.g., a home schedule, an away schedule, a sleep schedule, and/or the like. In some implementations DAERMC may use user input (e.g. where the user inputs settings from, when the user changes settings, and/or the like) to automatically and dynamically refine the resource schedules for the user. DAERMC may use geofencing, local PIR and/or true proximity sensors, Bluetooth and/or like beacon technology, and/or other like in order to further analyze actual user schedules for refinement of the resource schedules.

In some implementations DAERMC may be able to provide users with a plurality of messages and/or notifications to allow the user to know how resources are being used, and/or the like. In some implementations users may receive critical messages, e.g. urgent news which may require immediate attention, and/or the like; status changes, e.g., whether or not someone initiates a temporary settings override and/or the like; demand response alerts, e.g., a notification of the next demand response event that the user may opt into, and/or the like; monthly bill notifications, e.g., a notification of a new bill for review, the cost of resources during the last billing period, and/or the like; greetings, e.g., indicating current weather conditions, recent savings, and/or the like; resource tips, e.g., recommendations on how to save money and/or resources, and/or the like, and/or savings information, e.g., information on how much money and/or resources the user was able to save within a specified time period (e.g. current month, last billing period, and/or the like). In some implementations, such messages may fade out after a pre-determined amount of time, e.g., based on level of urgency (e.g. in some implementations very urgent messages may not fade, and/or casual greetings and/or the like may fade, e.g., after two minutes). In some implementations messages may be customized based on who is in the location controlled by the DAERMC device (e.g., if the DAERMC device determines that a user's electronic mobile device is within the location and/or the like, e.g., via GPS geofencing, iBeacons, and/or like technology, the DAERMC device may use the user's name in notifications and/or like messages, and/or the like).

In some implementations, LED backlights on a DAERMC device may also alert the user to the status of her resources, and/or the like. For example, in some implementations, blue lights may indicate the device is cooling the area; red lights may indicate the device is heating the area; green lights may indicate the device is maintaining current conditions, orange and/or pulsing lights may indicate participation in a demand response and/or like utility event, and/or the like.

In some implementations, when a user first sets up a device for managing resources, DAERMC may prompt the user to provide information based specifically on the location of the user, the weather around the user at the time, the season the user may be in based on her location, and/or the like. For example, in some implementations, a user in Los Angeles, Calif. during the summer may complete a prompt which asks questions about her summer resource usage habits, e.g., how often she likes to use the air conditioning, and/or the like; in some implementations, a user in Chicago, Ill. during the winter may be prompted to answer questions about winter resource usage habits, e.g., how often the user turns on heating, and/or the like.

A resource management device may have a touchscreen which allows the user to enter information into the resource management device. The resource management device may have sensors which, in combination, can facilitate a Sense feature, which can allow the resource management device to automatically initialize temperature schedules and/or changes when a user is close to the resource management device, when the light and/or humidity in a portion of a site changes, when weather in the user's area changes, and/or in response to weather pattern data, outdoor temperature data, and outdoor humidity data, and/or the like. A user may be able to update and/or customize interfaces for the resource management device, and/or for various other interfaces which may be used to interact with the resource management device. The resource management device may implement ready modes (e.g., Home, Away, Sleep, and/or Vacation modes) which can be changed easily when the user is at home, is going away for a short and/or extended period of time, and/or when the temperature can generally be lowered due to user inactivity within the home. The user can also set rules for the resource management device, so that the resource management device does not deviate too far from the user's preferred settings. An eco mode (e.g., an Eco IQ) can allow the resource management device to learn user habits, and learn how to efficiently meet user needs while using less energy.

Resource management devices can also use event notification actions to inform a user of when an event is occurring. For example, event notification actions can be on-display notifications, visual notifications using light-emitting diode (LED) lights to convey information, auditory notifications, e.g., using sound effects to convey information, and/or similar actions. Resource management devices may have a plurality of components which allow for such event notification actions. For example resource management devices can have touchscreen displays which can display notifications when particular events have started, when a status has changed, and/or the like. Additionally, LED lights can be used in event notification actions, and can serve as indicators for various status changes and/or events. For example, the LED lights can serve as solar capacity indicators, load control indicators (e.g., with LED lights for particular devices), loading indicators, set point change indicators (e.g., flashing LEDs when the setpoint changes, and/or provide haptic feedback/light haptic feedback), weather alert indicators (e.g., red LEDs for weather warnings and/or yellow LEDs for weather watches and advisories), intensity stage indicators, error handling and/or diagnostics indicators (e.g., indicators for when a Wi-Fi connection fails, or if the resource management device fails to load a screen), reminder and/or timer indicators, energy use indicators, filter change notification indicators, interaction indicators (e.g., increasing display brightness as the user interacts with the resource management device), schedule indicators, and/or other such indicators.

Resource management devices can also include a number of other features, such as set up tutorials, a percentage at which an electric car is charged, game modes, holiday light show modes, night light modes, coherence modes, grandfather clock modes (e.g., where the resource management device chimes and/or flashes based on the time), pre-heating and pre-cooling modes, DR modes, critical peak price modes, and/or customizable themes (e.g., wall colors, and/or the like).

The resource management device can reflect light onto the wall on which the resource management device is equipped with and/or mounted using LED lights and creating a "Halo" effect (also described herein as a light-manipulation action). Although discussed as LED lights, it is to be understood that a variety of alternative or additional energy-emitting illuminator(s) may be utilized. Such a light-manipulation action can support multiple colors over entire RGB color set. The resource management device can adjust the intensity of the light-manipulation action on a percentage scale from 1-100. The default may be 50%. The resource management device can enable/disable (turn on/off) the light-manipulation action. When the light-manipulation action is disabled, or off, in some embodiments, it will not glow for any event/mode at all, while in other embodiments, it may activate for a specified critical event or warning. The light-manipulation action can be ramped up or down in intensity level over a defined period of time to provide advanced visual cues regarding resource management device operation. An example is to create a pulse or breathing effect; to create the appropriate distinction, the intensity may be ramped between the current setting and a setting that is at least 25% brighter or dimmer (e.g., assuming intensity is set from 0-100%). The light-manipulation action may default to Enabled (ON) at 50% of available intensity. The default color can be white when OFF or not in a specified mode as set forth below.

The light-manipulation action can be used to provide at-a-glance knowledge of the resource management device's operation. Modes which may use the light-manipulation action can include a cool mode, a cool blast, a heat mode, a heat blast, an eco mode, a DR mode, a pricing mode, an off mode, a message mode, a weather alert mode, an upgrade process mode, a night light mode, an error/diagnostics mode, a setup/tutorial mode, a heat/cool stage indication mode, a clock mode, a filter change notification mode, a custom theme mode, an energy use mode, a solar capacity indicator mode, an electric vehicle (EV) charge indicator, a projector add-on mode, and/or similar modes. The DAERMC can also use light-manipulation action events, in addition to logs and/or other information derived from user behavior, to further analyze user behavior. For example, light-manipulation action event data can be used to determine if the light-manipulation action events succeed in conveying information to the user and/or in training the user to perform certain behaviors (e.g., to not change settings during a DR event, and/or the like). The DAERMC can use analysis of this data to suggest and/or dynamically implement new notifications for the user, and/or to suggest new changes to the user's regular schedule.

In a cool mode, the light-manipulation action can glow in a cool blue (e.g., "Sky Blue") when the system is in cool mode. When the resource management device is cooling (e.g., in cool mode and running), the light-manipulation action can pulse between the set intensity and an at least half of the setting (e.g., set at 50%, use 25%) at a rate of about 1-2 seconds. This mode can be overridden by DR, Peak Pricing, and Eco Mode.

In a cool blast mode, the light-manipulation action can glow in a cool blue (e.g., "Sky Blue") and pulse between the set intensity and at least half of the setting (e.g., set at 50%, use 25%) at a rate of about <1 second. This is intended to look similar to cooling, but the pulse may be noticeably faster. In some embodiments, this mode can be overridden by DR, Peak Pricing, and/or Eco Mode.

In a heat mode, the light-manipulation action can glow in a yellow/orange (e.g., "Honeysuckle Orange"). When the resource management device is actually heating (e.g., in heat mode and running), the light-manipulation action can pulse between the set intensity and an intensity which is at least half of the set intensity (e.g., set at 50%, use 25%) at a rate of about 1-2 seconds. In some implementations, this mode can be overridden by DR, Peak Pricing, Eco Mode, and/or the like.

In a heat blast mode, the light-manipulation action can glow in a yellow/orange (e.g., "Honeysuckle Orange") and pulse between the set intensity and at least half of the set intensity (e.g., set at 50%, use 25%) at a rate of about <1 second. This is intended to look similar to heating, but the pulse may be noticeably faster. This mode can, in some embodiments, be overridden by DR, Peak Pricing, Eco Mode, and/or the like.

In an Eco Mode, the light-manipulation action can glow in a green (e.g., "Seeding Green") when the resource management device is in eco mode. Regardless of heating or cooling, the light-manipulation action can pulse between the set intensity and at least half of the set intensity (e.g., set at 50%, use 25%) at a rate of about 1-2 seconds when the system is actually running. This mode can, in some embodiments, be overridden by DR and Peak Pricing.

In a DR mode, the light-manipulation action shall glow red (e.g., "Fuchsia Red") and pulse between the set intensity and at least half of the setting (e.g., at 50%, use 25%) at a rate of about 1-2 seconds when executing a DR event. In some embodiments, this mode may not be overridden by another mode. As an example of a light-manipulation action for a DR event, a user can opt into a DR event, and the resource management device can start to implement the DR event. The resource management device can monitor the room to determine if a user moves close to the resource management device. If a user does move close to the resource management device (e.g., to change settings and/or to view the status of the resource management device), the resource management device can flash red warning lights such that the user may be notified that the DR event is still in progress and that the user should not alter the resource management device settings yet.

In a pricing mode, the light-manipulation action can glow red (e.g., "Fuchsia Red") when the price of energy is higher than the users threshold or the tier is high/critical. The light-manipulation action may not pulse during a price event/period. This mode can be overridden by DR mode and/or other mode, depending on the embodiment.

In an off mode, the light-manipulation action can glow cool white when the resource management device is OFF.

In a message mode, the light-manipulation action can briefly flash cool white, e.g., 2-3 times, when a new message arrives.

In a weather alert mode, the light-manipulation action can briefly flash yellow (e.g., "Sunflower Yellow"), e.g., 2-3 times, when a new weather alert arrives.

In an upgrade mode, the light-manipulation action can glow white and pulse between the set intensity and at least half of the setting (ex. Set at 50%, use 25%) at a rate of about 1-2 seconds when executing a DR event. In some embodiments, this mode cannot be overridden by another mode.

In a night light mode, the light-manipulation action can glow white (or blue, green, etc.) at a lower (e.g., 50% max) intensity.

In an error/diagnostics mode, the light-manipulation action can be used to signal various system errors, by way of non-limiting example: Wi-Fi connectivity lost (e.g., for more than a few minutes); Invalid Wiring; and/or Upgrade failure or invalid firmware (e.g., firmware and/or upgrade hacked).

In a setup/tutorial mode, e.g., during the initial setup and/or tutorial, each LED can be enabled independently to demonstrate progress of the setup/tutorial (e.g., starting with 0 LED's enabled at the start of the setup/tutorial to having all 4 enabled and lit up when the setup/tutorial is completed.) Additionally, the light-manipulation action could blink/flash briefly to signal completion or transition to next step.

In a heat/cool stage indication mode, the light-manipulation action may be used to indicate the stage in which the system is actively heating or cooling. In one implementation, the resource management device may use intensity levels along with the earlier defined Heating/Cooling indicator. In another implementation, assuming independent control of the LED's, the resource management device can use color and the number of LED's in a particular color (e.g., Orange #1 can represent stage 1, Orange can represent second stage heating and only 2 LED's may light up in this color).

In a grandfather clock mode, the light-manipulation action can use each LED to represent a 15-minute clock segment. It the resource management device can light each LED at 15 past the hour, 30 past the hour, and so, while blinking the appropriate number of times when reaching the hour (e.g., at 6:00 PM, the light-manipulation action can blink, slowly, six times). With sound, a chime can also be introduced. Further, the display can show the clock when not in "interaction" mode.

In a filter change notification mode, the light-manipulation action can cause lights to flash a specific color, e.g., one not commonly in-use for other core modes (such as a different shade of green from the eco mode), to indicate that a filter change is needed.

In a custom theme mode, the resource management device can allow the end user to select their light-manipulation action colors and operation for each and every mode. Additionally, the resource management device can allow the end user to provide 1 core color (e.g., to match their wall) and be capable of building and supporting a theme from that color. It is possible for this configuration to be done in the cloud, and/or the resource management device may locally support storage of the colors and/or other settings.

In an energy use indicator mode, when connected to a Smart Metering device, the resource management device may use the light-manipulation action to indicate high power demand for the location. A segment, or possibly all segments, could change from Green→Blue→Orange→Red depending on the energy consumption of the location. The resource management device, acting as a gateway, can read and interpret this data directly from the device, and/or the cloud can provide an energy state value for the resource management device to use.

In a solar capacity indicator mode, when the resource management device is monitoring solar production, the light-manipulation action may be used to indicate the current level of output for the solar system. For example, it may use a light yellow for low production up to a very bright yellow when the resource management device is producing at its maximum capacity.

In an EV charge indicator mode, similar to energy and solar capacity, the light-manipulation action may be used to indicate either the amount of charge remaining (if available) or the amount of time remaining to charge, using the different segments to either represent time in hours or a percentage of the charge remaining.

In a projector add-on mode, the user would be able to purchase "stencil" like add-ons to place around the light-manipulation action lights to create unique effects as the light projects on the wall. Some examples can include a "disco ball", "holiday themes", "sports", etc.

Additionally, the touchscreen and light-manipulation action effect can be used to create game experiences on the resource management device. The user can gain access to such games by performing a specific task on the resource management device (accessing every screen, adjusting a particular setting, touching a field that isn't normally tied to an action, and/or possibly saving the most energy in a group of users).

Figure 1B:
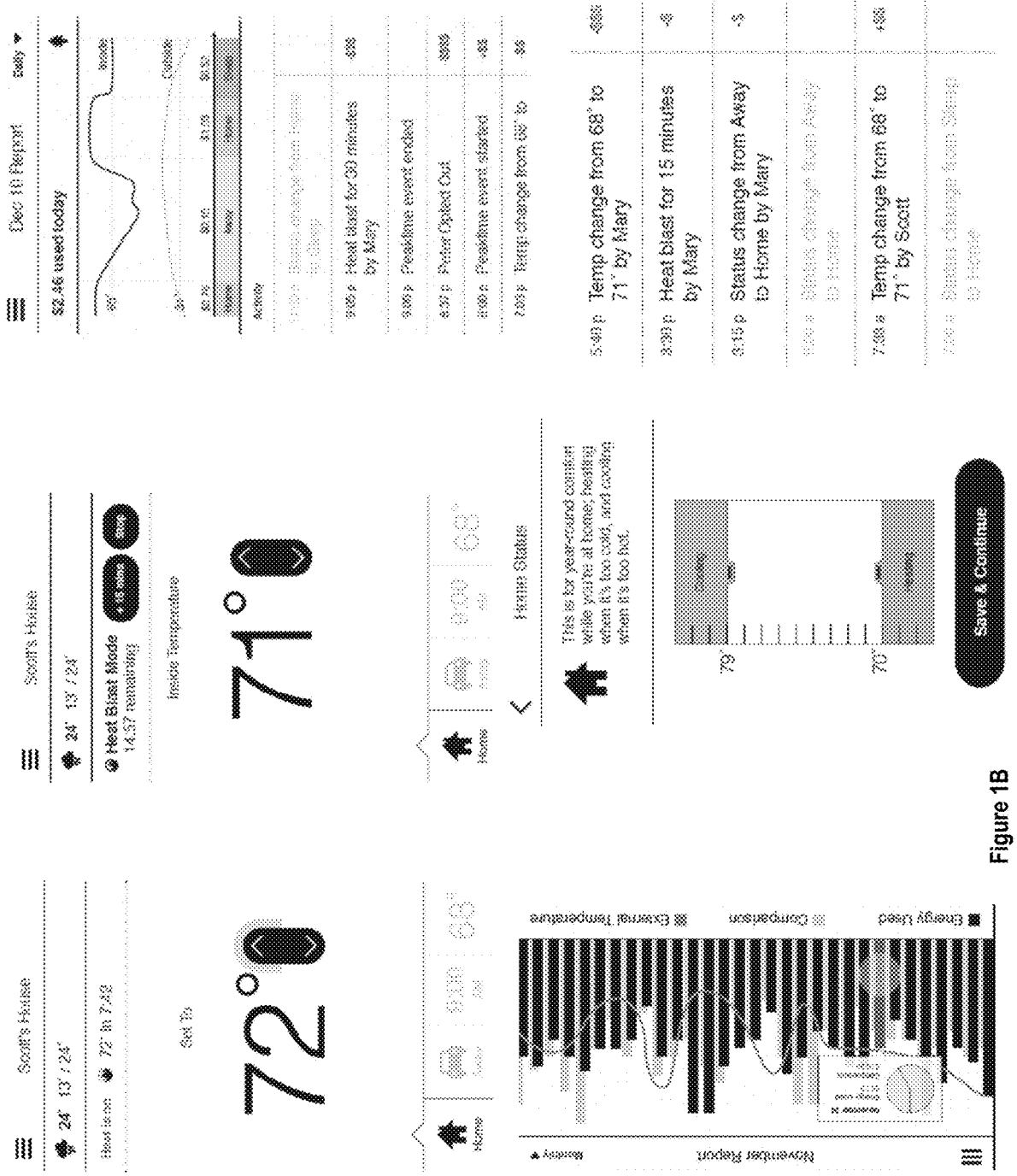
FIGS. 1B-1C provides example user interfaces for embodiments of the DAERMC.
Figure 1C:
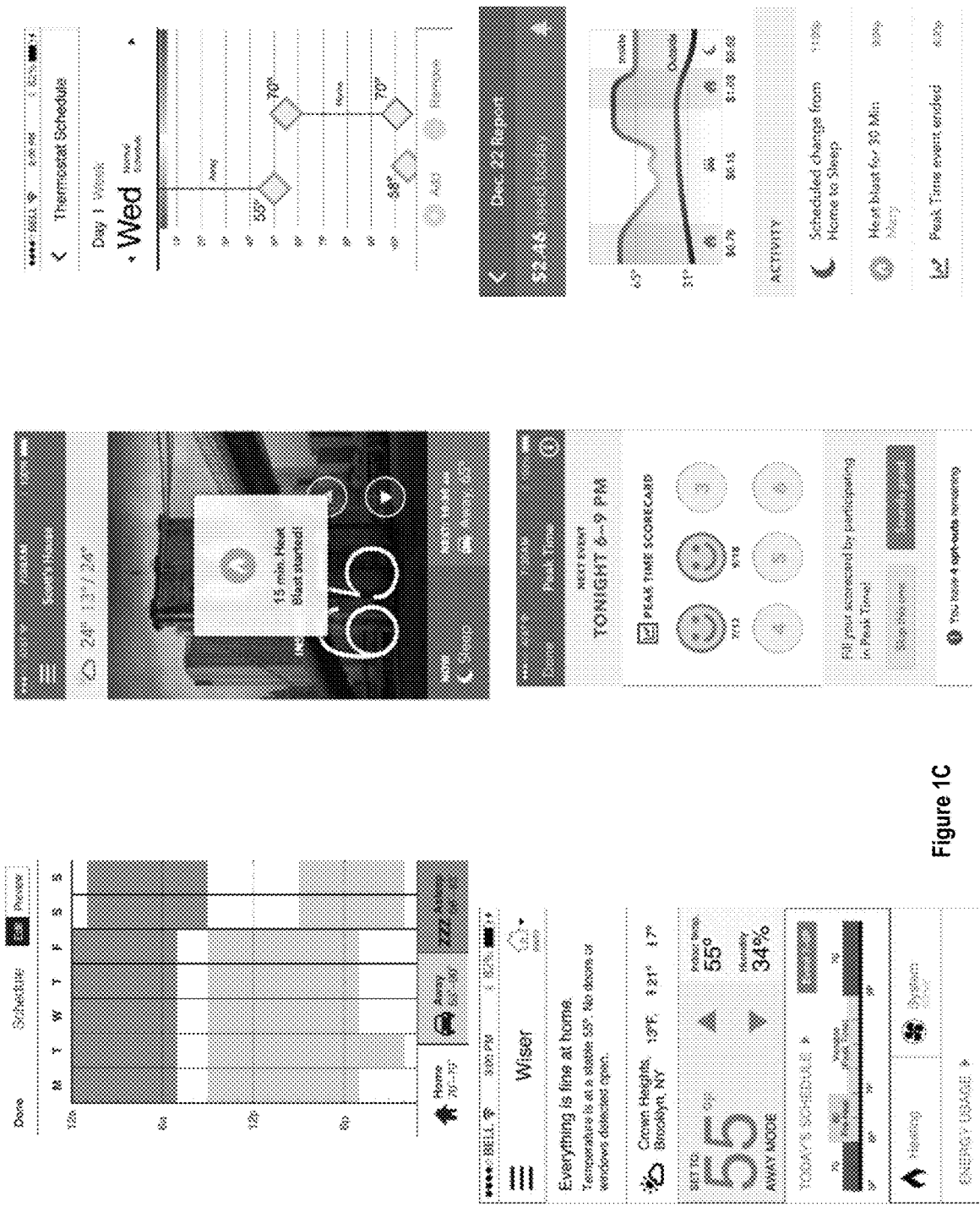

FIG. 1 shows a block diagram illustrating example embodiments of the DAERMC. In some implementations, DAERMC may allow users 102 to manage resources (e.g. energy resources, water resources, and/or the like) via a variety of resource management devices 106 throughout a location, e.g., via thermostats and/or like electronic devices which may control resource usage. In some implementations such devices may be placed throughout a residential space. In some implementations, users may be able to control these devices on-site (e.g. via an interface on the device, and/or the like) and/or remotely (e.g., via an electronic mobile device 104, such as a cell phone, smartphone, laptop, netbook and/or a like portable personal computing device, PDA, electronic tablet, and/or the like). In some implementations the user may also use the resource management device and/or mobile device in order to view information relating to resources, such as resource usage, costs, and/or the like. The user may also be able to set schedules for resources and/or the like, and may also be able to temporarily override previously-set schedules and/or the like, without affecting the previously-set schedule.

In some implementations, a resource management device may be able to use information provided by the user (e.g., settings, commands (e.g. settings override requests and/or the like), schedules, queries for information, and/or the like) and use the information to determine optimal ways of managing resources and/or the like for the user, including predicting when the user will or will not be in an area, predicting how long it takes to warm, cool, and/or perform other tasks within a space, predicting how external situations (e.g. weather patterns and/or conditions, and/or the like) may affect resources and managing resources within a space, predicting when users typically wish for changes in settings and/or like, and/or the like.

In some implementations the resource management device may also be able to provide notifications (e.g., about settings changes, upcoming events and/or weather conditions, and/or the like), logs, and/or the like to the user, as well as facilitate programs between the user and other entities (e.g., utility companies and/or the like) for the purpose of encouraging certain behavior for the receipt of rebates, credits, gift cards, and/or like benefits.

In some embodiments, the DAERMC interface may provide inside and outside temperature to the user, and one or both temperatures and/or outside weather conditions and/or forecasts may be used to determine a skin or particular image of the device and/or mobile interface. In some embodiments, skins may be downloaded and/or received for the device interface. Interface skins and/or background images may be selected from and/or automatically provided from geolocation, weather, interest and/or like parameters (e.g., a picture of the Empire State Building for a user/device in or around New York City).

In some implementations the DAERMC may provide an updated background based on interests (i.e., if a user is determined to be a fan, the background may include colors and current team stats, and in some embodiments, may provide feeds or alerts based thereon, such as reflecting current game score). In some embodiments, the device interface may be configured to mirror a user's mobile device interface and/or background, and such an implementation may be triggered by user location data, wireless communication, and/or the like. Other customized interfaces, messages, notifications, and so forth may be triggered by user location as determined by a user's mobile device, while some in-home devices may have sensors to determine that one or more users is in the house and/or is approaching the device and it may be updated accordingly.

In some implementations, a resource management device may determine that a user is child (e.g., based on the user's height, build, and/or the like), and an interface may be configured accordingly (e.g., parental controls may automatically be implemented which may restrict the child's ability to alter settings, such as the temperature, and/or the like). In some embodiments, such determination of a user identify, profile, and/or status may enable or disable certain features or options. Example device screens and/or example mobile interfaces are illustrated in the FIGS. 1B and 1C.

In some implementations the resource management device may provide overview usage data, and may be configured to allow a user to delve deeper into such data, i.e., allow a user to press on a usage data graph line for more granular location or user usage data and/or the like. In some embodiments, a device interface may be configured to provide alerts or updates (e.g., a tornado warning or flood warning, and/or the like). In some embodiments, hardware covers or faceplates may be interchangeable and/or customizable (i.e., such that they can be customized for a user's décor, interests, and/or the like).

Figure 2A:
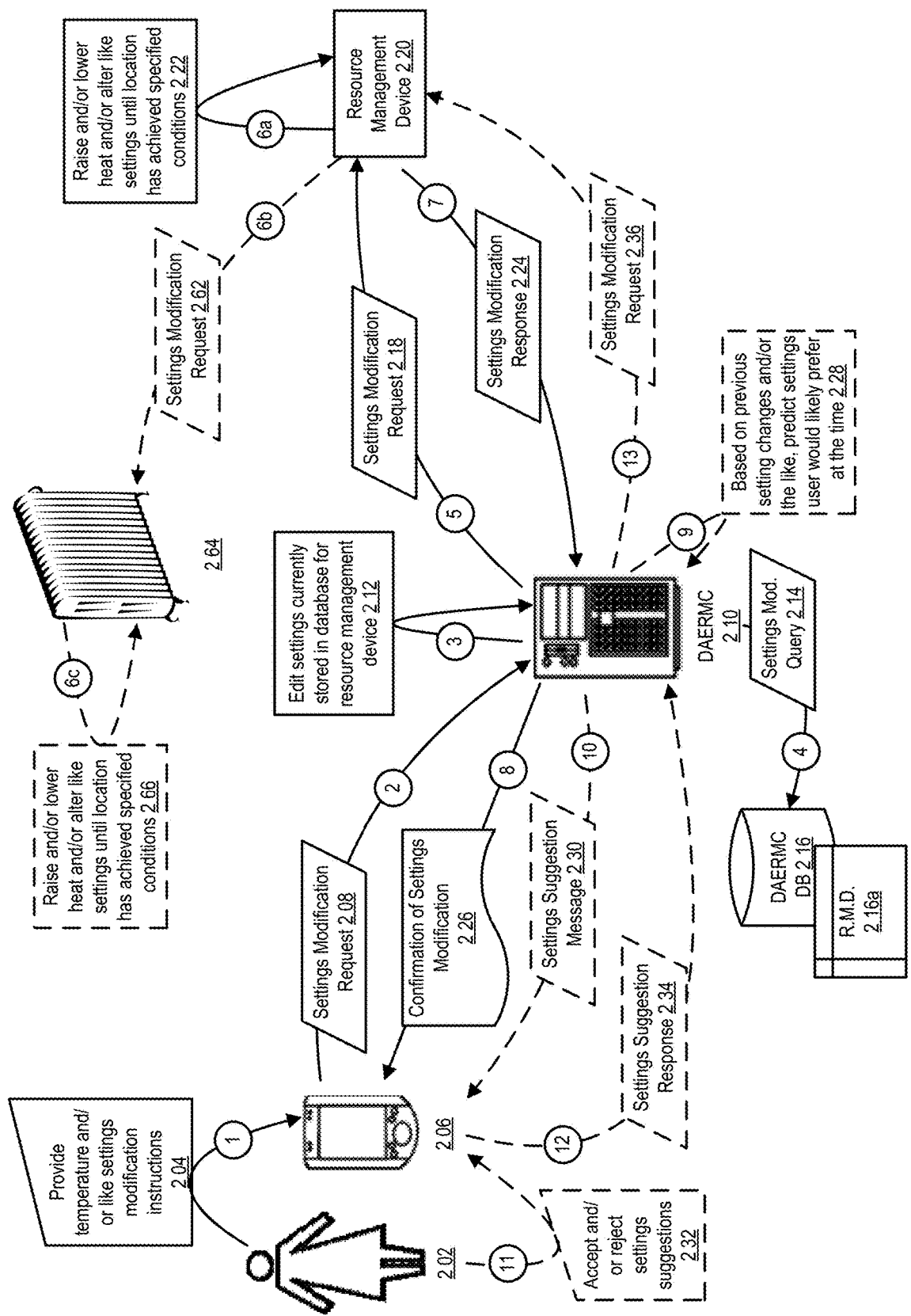
FIG. 2A shows a data flow diagram illustrating remotely modifying settings in some embodiments of the DAERMC.

FIG. 2A shows a data flow diagram illustrating remotely modifying settings in some embodiments of the DAERMC. In some implementations, a user 202 may interact with an electronic device 206 (e.g. a mobile device and/or the like) in order to provide temperature and/or like settings modification instructions 204 to a resource management device (e.g. a thermostat and/or the like). In some implementations a user may also provide instructions directly to the resource management device. In some implementations the electronic device may send a settings modification request 208 to the DAERMC server. In some implementations the settings modification request may be an XML-encoded HTTP(s) POST message which may take a form similar to the following:

```
POST /settings_modification_request.php HTTP/1.1
Host: www.DAERMCproccess.com
Content-Type: Application/XML
Content-Length: 788
<?XML version = "1.0" encoding = "UTF-8"?>
<RMD_update_message>
<timestamp>2016-01-01 12:30:00</timestamp>
    <user_params>
        <user_name>example_name</user_name>
        <user_password>********</user_password>
    </user_params>
    <RMD_params>
        <RMD_ID>12345678</RMD_ID>
        <RMD_GPS>-73, 140</RMD_GPS>
        <RMD_action>modify</RMD_action>
    </RMD_params>
    <settings>
        <electricity>
            <lights>
                ...
            </lights>
            <temperature>
                <temp_current>72,F</temp_current>
                <temp_hight>80, F</temp_high>
                <temp_low>70,F</temp_low>
                <temp_home>68,F<temp_home>
                <temp_away>58,F<temp_away>
                <temp_sleep>65,F<temp_sleep>
                <temp_blast></temp_blast>
            </temperature>
            ...
```

```
        </electricity>
        <water>
            ...
        </water>
        <gas>
            ...
        </gas>
        ...
    </settings>
</settings_modification_request>
```

In some implementations, the DAERMC server may edit the settings currently stored in the database for the resource management device 212 via editing the resource management device settings data structure in the resource management device table 216*a* of the DAERMC database 216, and/or replacing the settings data structure, and/or the like, via a settings modification query 214 to the database. In some implementations the settings modification query 214 may be a PHP-encoded query which may take a form similar to the following:

```
<?php
    ...
    $RMD = $_POST["RMD_ID"];
    $RMD_settings = $_POST["settings"];
    ...
    if(mysql_num_rows(mysql_query("SELECT settings FROM RMD WHERE RMD_ID = '$RMD'"))){
        $result= mysql_query (UPDATE RMD SET RMD_settings=$RMD_settings WHERE RMD_ID='$RMD');
        ...
    }
>
```

In some implementations, the DAERMC server may then forward the settings modification request sent by the user to the resource management device 220 via settings modification request 218, which may take a form similar to that of settings modification request 208. In some implementations settings modification request 218 may further comprise authentication information for the resource management device specifically, weather and/or like information being stored in the DAERMC database, and/or the like. In some implementations, the resource management device may raise and/or lower the heat, humidity, and/or other like settings 222 until the area has achieved the user-specified condition (e.g., the area is a particular temperature, and/or the like). In some implementations the resource management device may also send a settings modification request 262 to at least one other resource management device 264 (e.g. thermostats, heaters, air conditioners, humidifiers, and/or the like), said settings modification request taking a form similar to settings modification request 218. In some implementations the at least one other resource management device may then raise and/or lower heat and/or alter like resource usage settings until the conditions specified by the user for the area(s) occupied by the resource management device(s) have been achieved 266. The resource management device 220 may then send a settings modification response 224 with a confirmation that the resource management device updated its settings. DAERMC may then send a confirmation of settings modification 226 to the user, e.g., in the form of a push notification, pop-up, message notification within the user interface, email, text, and/or a like messaging mechanism.

In some implementations, the DAERMC may also periodically utilize previous settings, conditions, and/or the like in order to predict 228 settings user would like to choose for a particular time period, and/or the like. For example, previous requests to change settings may be correlated to average outdoor temperatures around that time in order to predict that if outdoor temperatures reach the average temperature, the DAERMC may suggest to the user that the settings be altered to match settings the user has previously used for those conditions. In some implementations, the DAERMC may send a settings suggestion message 230 to the user, which may take a form similar to settings modification request 208 (e.g. may comprise instructions to modify settings, and/or the like). In some implementations, the user may be able to accept and/or reject settings suggestions 232 via their electronic device, which may send the user's choice to the DAERMC via settings suggestion response 234. In some implementations, the DAERMC may then send the settings modification instructions to the resource management device if the user accepted the settings, via a settings modification request 236 which may take a form similar to settings modification request 218.

Figure 2B:
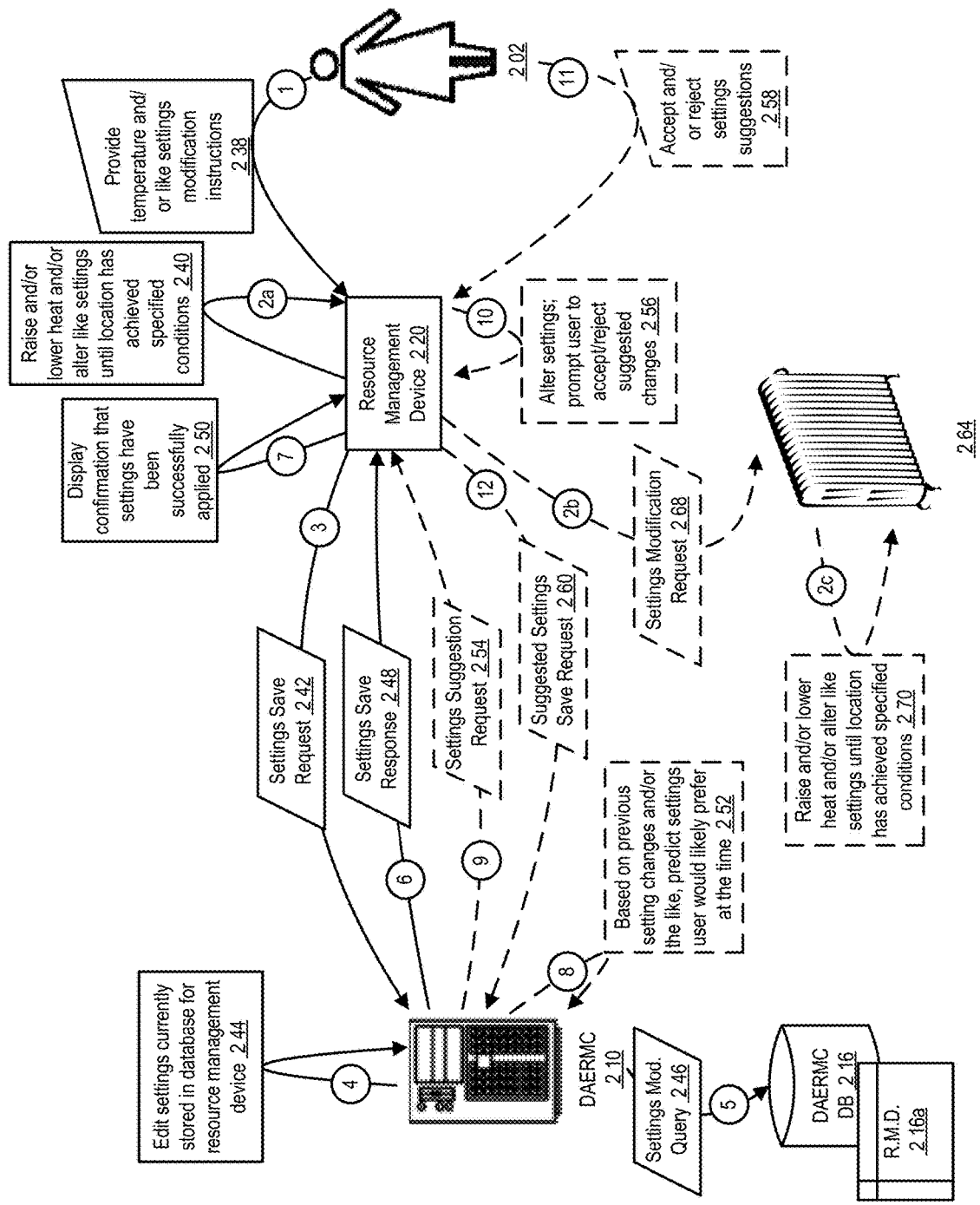
FIG. 2B shows a data flow diagram illustrating modifying settings via a resource management device in some embodiments of the DAERMC.

FIG. 2B shows a data flow diagram illustrating modifying settings via a resource management device in some embodiments of the DAERMC. In some implementations, the user 202 may provide temperature and/or like settings modification instructions 238 to her resource management device 220. In some implementations, the resource management device may raise and/or lower heat and/or alter similar resource settings 240 until an area has achieved the conditions specified by the user (e.g. temperature, humidity, and/or the like). In some implementations the resource management device 220 may also send a settings modification request 268 to at least one other resource management device 264, said settings modification request 268 taking a form similar to at least settings modification request 262. The at least one other resource management device 264 may also alter its settings and/or the like 270 (e.g. raise and/or lower heat, and/or alter like settings) in order to achieve conditions specified by the user for the area(s) the at least one other resource management device may have control over.

The resource management device 220 may also send a settings save request 242 to the DAERMC server 210, the settings save request comprising an XML-encoded HTTP(s) POST message which may take a form similar to the following:

```
POST /settings_save_request.php HTTP/1.1
Host: www.DAERMCproccess.com
Content-Type: Application/XML
Content-Length: 788
<?XML version = "1.0" encoding = "UTF-8"?>
<settings_save_request>
    <timestamp>2016-01-01 12:30:00</timestamp>
        <user_params>
            <user_name>example_name</user_name>
            <user_password>********</user_password>
        </user_params>
        <RMD_params>
            <RMD_ID>12345678</RMD_ID>
            <RMD_GPS>-73, 140</RMD_GPS>
            <RMD_action>save</RMD_action>
        </RMD_params>
        <settings>
            <electricity>
                <lights>
                    ...
                </lights>
```

```
            <temperature>
                <temp_current>72,F</temp_current>
                <temp_hight>80, F</temp_high>
                <temp_low>70,F</temp_low>
                <temp_home>68,F<temp_home>
                <temp_away>58,F<temp_away>
                <temp_sleep>65,F<temp_sleep>
                <temp_blast></temp_blast>
            </temperature>
            ...
        </electricity>
        <water>
            ...
        </water>
        <gas>
            ...
        </gas>
        ...
    </settings>
</settings_save_request>
```

In some implementations, the server may edit and/or replace 244 the settings currently stored for the resource management device in the DAERMC database, with the new settings provided by the user to the resource management device. In some implementations, the server may send a settings modification query 246 to the DAERMC database 216 in order save the data; in some implementations, the settings modification query 246 may take a form similar to that of settings modification query 214. In some implementations, the server may then send a settings save response 248 to the resource management device, the response at least comprising a confirmation that the settings have been successfully saved. The resource management device 220 may display the confirmation and/or any other information within the settings save response for the user 250.

Figure 8:
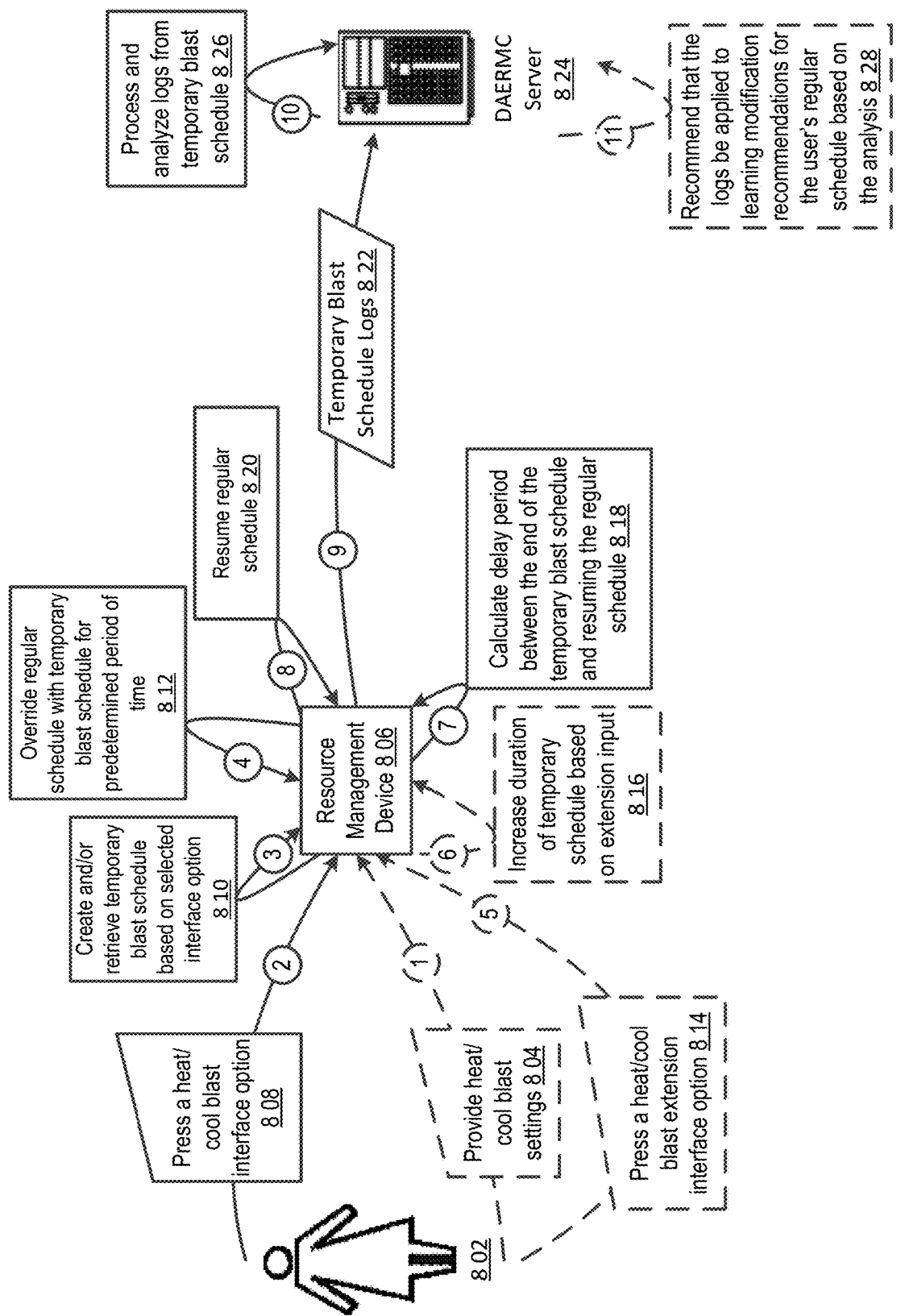
FIG. 8 shows a data flow diagram illustrating initiating a heat/cool blast in some embodiments of the DAERMC.

Periodically (e.g. based on a pre-determined schedule, as a response to new settings input, and/or the like), the DAERMC server may make predictions and/or the like 252 based on previous settings changes, previous weather and/or other external conditions, and/or the like (e.g., see FIG. 8 for further information). Once the server has created a recommendation to the user based on the server's predictions, the server may send a settings suggestion request 254 to the resource management device indicating suggested suggestions from the server based on the user's previous settings and/or the like, the settings suggestion request being an XML-encoded message taking a form similar to settings modification request 218. The resource management device may alter its settings based on the suggested settings, and/or may prompt the user to accept and/or reject the suggested settings 256 (e.g. before or after the settings have been altered on the resource management device). The user may accept and/or reject the suggested settings 258 (e.g. in aggregate or by accepting and/or rejecting each setting separately) via indicating via the resource management interface that the suggested settings should be maintained, that the suggested settings should be altered (e.g. reverted back to the original settings, changed further, and/or the like). The resource management device may then send a suggested settings save request 260 to the DAERMC server, in order to save the settings that were accepted and/or specified by the user. In some implementations the suggested settings save request 260 may take a form similar to settings modification request 208 and/or settings suggestion response 234.

Figure 3A:
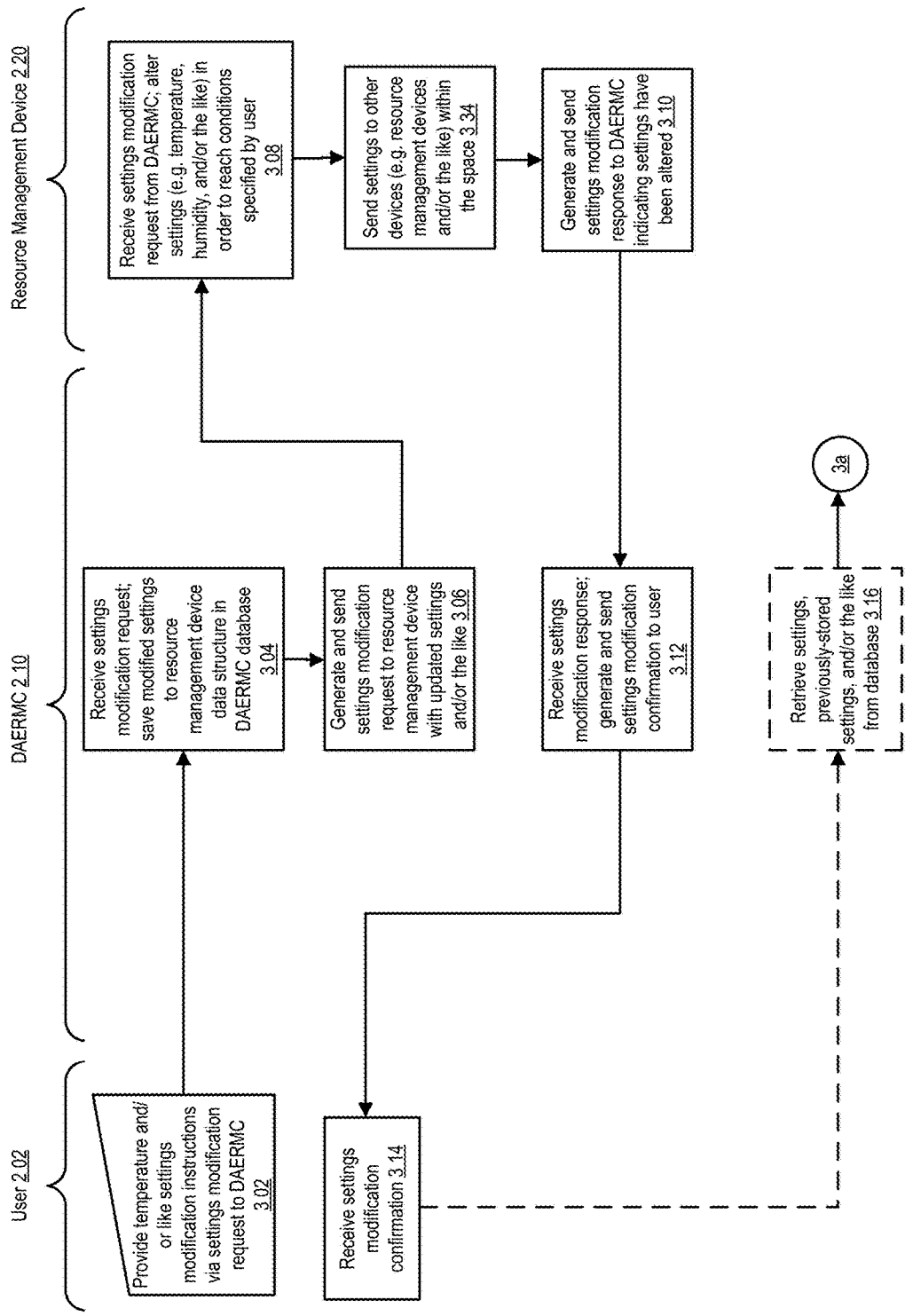
FIGS. 3A-B show logic flow diagrams illustrating remotely modifying settings in some embodiments of the DAERMC.
Figure 3B:
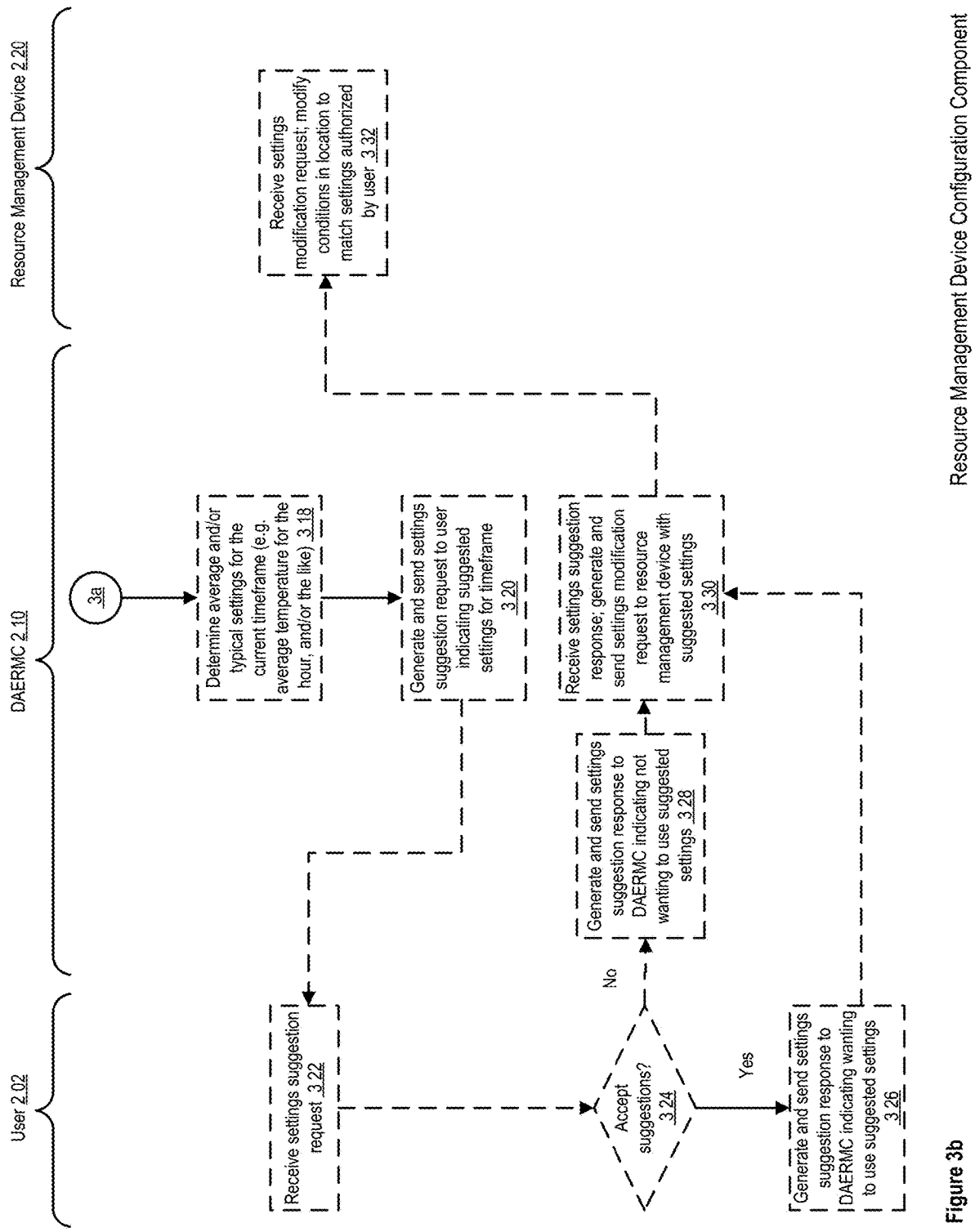

FIGS. 3A-B show logic flow diagrams illustrating remotely modifying settings in some embodiments of the DAERMC. In some implementations, the user may provide temperature, humidity, and or like settings and/or settings modification instructions 302 via sending a request to modify settings to the DAERMC. After receiving the settings, the DAERMC may save the modified settings to the resource management data structure in the database 304, and may generate and send a request to the resource management device 306 containing the updated settings, authentication data, and/or like information that may be used by the resource management device to modify its settings. In some implementations, after receiving the information, the resource management device may alter its settings in order to reach conditions specified by the user 308, and once said conditions have been met, may generate and send a settings modification response to the DAERMC indicating that the settings have been altered 310. In some implementations the resource management device may also send the settings received from the server to other devices (e.g., other resource management devices, and/or the like) within the user's resource management device network and/or the like. In some implementations the device may also send a response in light of other actions, e.g., after the device accepts the settings, and/or the like. The DAERMC may then, after receiving the settings, generate and send a confirmation 312 to the user indicating that the settings have been accepted and/or enacted by the resource management device, and/or the like. The user may receive 314 the confirmation and may be able to view it via her mobile electronic device, via the resource management device, and/or the like. In some implementations, the DAERMC may also periodically (e.g., on a specified and/or pre-determined schedule, based on receiving new settings, and/or the like) retrieve previously-stored settings, recently-received settings, and/or like information from the database 316, and may then determine an average and/or typical setting for a particular timeframe based on the previous and current settings data 318 (e.g., may determine the typical temperature the user specifies at noon on weekdays, and/or the like). The DAERMC may then generate and send a settings suggestion request to the user indicating that the 3 has determined suggested settings for the time frame based on its analysis 320 (e.g., has determined that the resource management device should be at a particular temperature at noon, and/or the like).

The user, after receiving the suggested settings 322, may determine whether she wishes to accept and/or reject the settings 324. If the user wishes to accept the settings, the user may, via her electronic mobile device, generate and send a settings suggestion response to the DAERMC 326 indicating that the user wishes to have the suggested settings adopted as the current settings. If the user wishes to reject at least some of the settings, the user may instead generate and send a response via her electronic mobile device indicating that at least some of the suggested settings should not be adopted as current settings 328. In some implementations, the user may reject all the suggested settings at once. The DAERMC may then generate and send a settings modification request to the resource management device 330 indicating the full set of settings the resource management device should set as its current set, based on the user's responses (e.g., all of the suggested settings if the user has accepted the suggestions, and/or at least some of the suggested settings and some of the original settings if the user has rejected at least some of the settings). The resource management device may, after receiving the settings modification request, modify its settings and/or the like in order to match the settings and/or conditions authorized by the user 332.

Figure 4A:
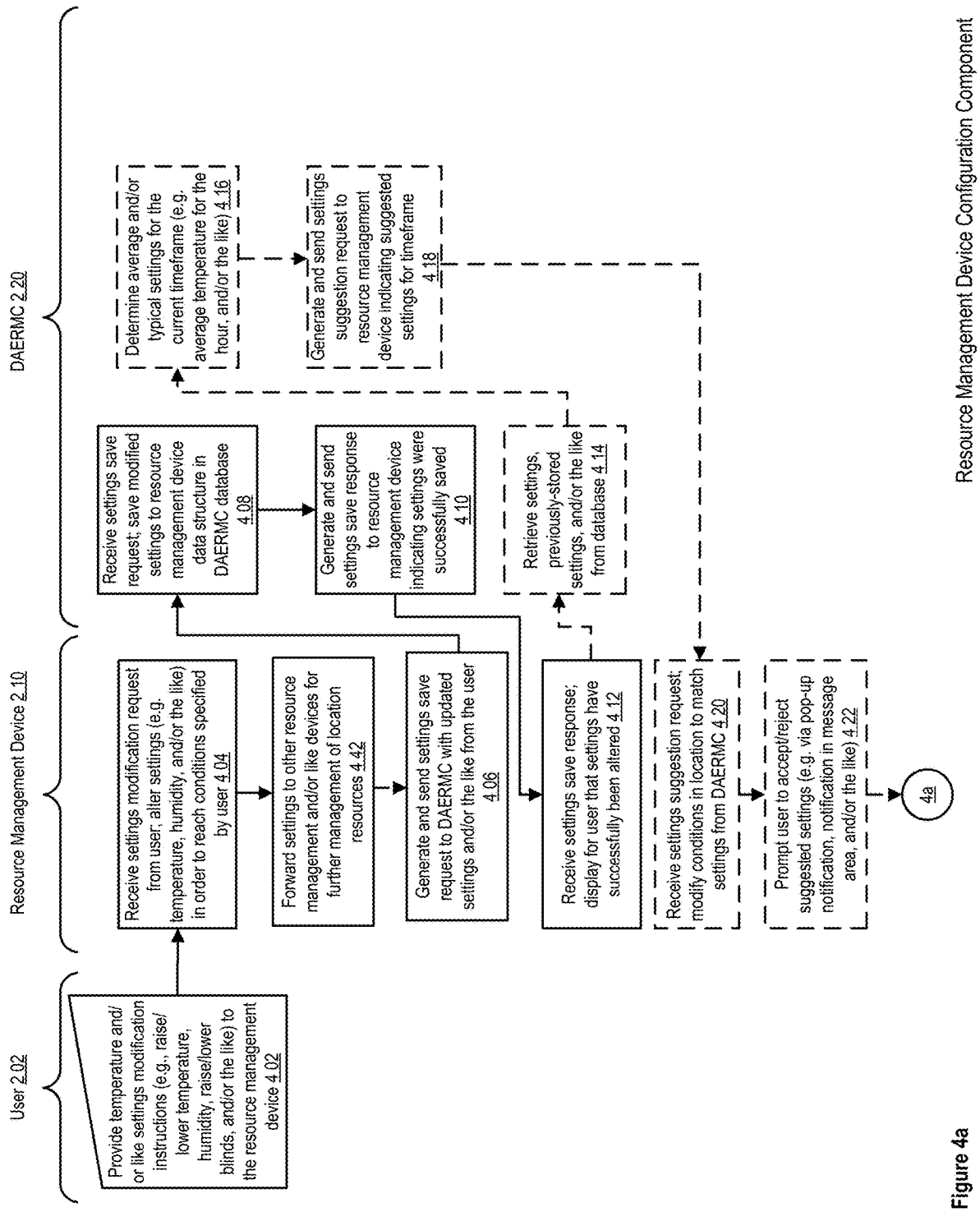
FIGS. 4A-B show logic flow diagrams illustrating modifying settings via a resource management device in some embodiments of the DAERMC
Figure 4B:
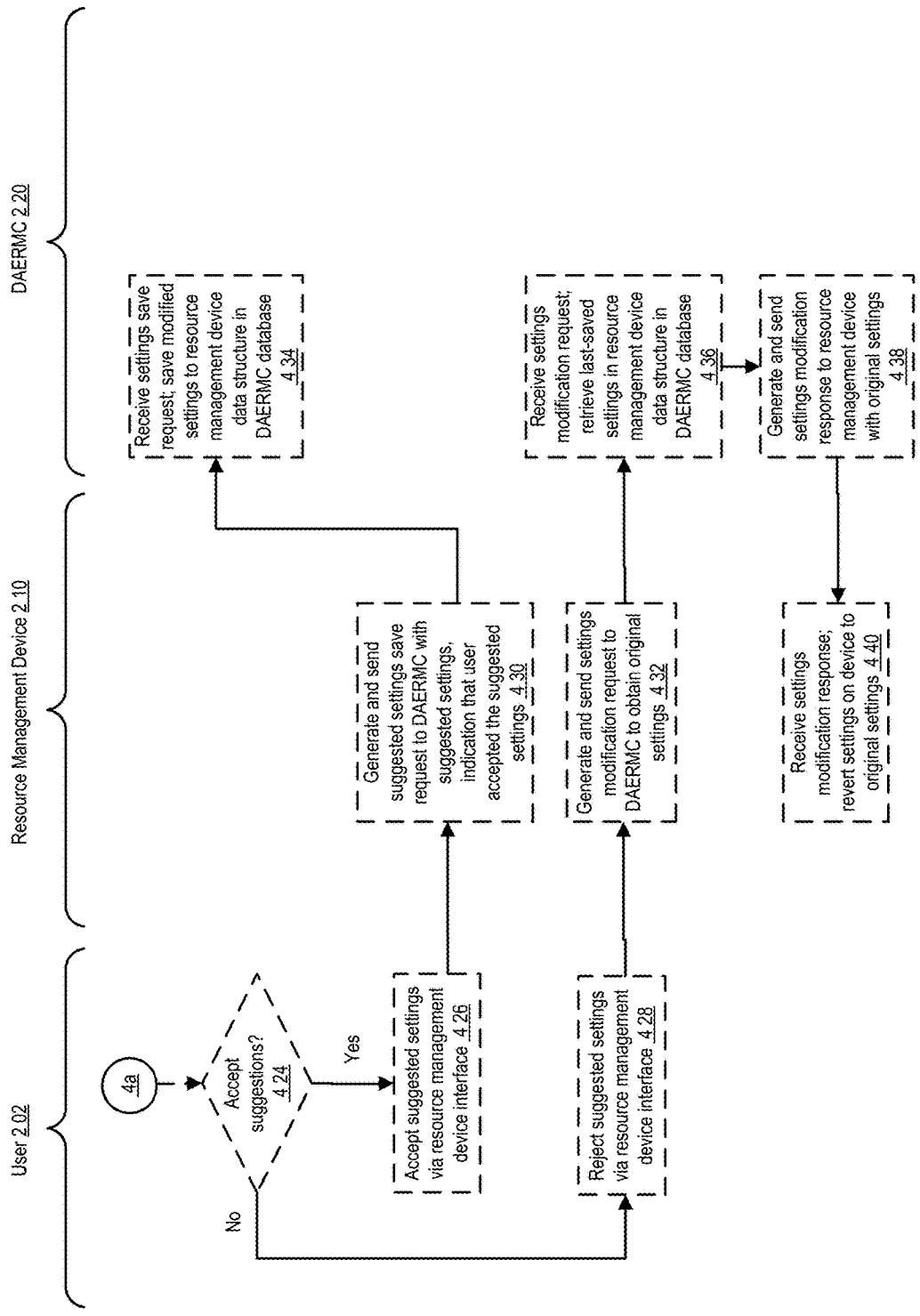

FIGS. 4A-B show logic flow diagrams illustrating modifying settings via a resource management device in some embodiments of the DAERMC. In some implementations, a user may provide settings modification instructions (e.g., pertaining to temperature, humidity, and/or like settings) to a resource management device 402, e.g., in order to raise and/or lower an area's temperature, humidity, raise and/or lower blinds in an area, and/or the like. In some implementations the resource management device may, after receiving the request to modify settings from the user, alter its settings and/or the like 404 in order to reach the conditions desired by the user (e.g. by altering temperature, humidity, and/or like settings). The resource management device may also forward the settings to other resource management devices and/or like devices in order to further management resources within an area and/or a specified user resource management network, and/or the like 442 (e.g., within different rooms, within the same large and/or partition-able space, within different buildings, and/or the like). The resource management device may then generate and send a settings save request 406 to DAERMC with the updated settings and/or the like which were received from the user.

In some implementations the DAERMC may save settings received in the settings save request in a resource management device data structure in the DAERMC database 408. In some implementations, the DAERMC may save the settings via storing the current settings associated with the resource management device in a settings history and/or like data structure, table, and/or the like, and replacing and/or modifying the current settings associated with the resource management device with the settings received from the resource management device. In some implementations, the DAERMC may generate and send a settings save response to the resource management device 410 indicating that the settings were successfully saved and/or updated in the database. The resource management device may, after receiving the response, display a confirmation and/or like notification to the user indicating that the settings have successfully changed 412.

In some implementations, the DAERMC may periodically retrieve settings and/or like data from its database 414, in order to make predictions about how the resource management device should change settings at particular times of the day, week, month, year, and/or the like. In some implementations the DAERMC may determine the average and/or typical settings and/or the like for particular timeframes (e.g., the average temperature the user sets via her resource management device and/or the like at noon on weekends, and/or the like) 416, and may then generate and send a settings suggestion request to the resource management device directly indicating that it has determined settings, conditions, and/or the like that the user is likely to want to adopt for a particular part of the schedule, and/or the like 418. In some implementations, the resource management device may, after receiving the request, modify conditions in the location it monitors and/or the like in order to match the suggested settings and/or the like received from the DAERMC 420. In some implementations the resource management device may prompt the user to accept and/or reject all or some of the suggested settings 422, e.g., via a pop-up notification, a notification in a message area, via an auditory notification, and/or the like.

In some implementations, the user may then determine whether she would like to keep the settings, or whether the user would like to reject any of the settings provided 424. If the user would like to accept any of the suggestions, the user may, via the resource management interface and/or the like, indicate that she would like to accept the suggested settings 426. The resource management device may then generate and send a suggested setting save request to the DAERMC with the suggested settings and a confirmation that the user approved the settings 430, indicating that the DAERMC can save the suggested settings to the DAERMC database as newly-updated settings in the resource management device data structure 434.

The user may also indicate that she would like to reject some or all of the suggested settings 428 via the resource management device interface. The resource management device may then generate and send a settings modification request to the DAERMC 432, e.g., in order to obtain the original settings for the resource management device if the resource management device has already executed the suggested settings. In some implementations the request may only request the original versions of settings for setting the user explicitly rejected (e.g., in some implementations if the user is okay with humidity settings but not temperature settings, the request may only ask for the original temperature settings, rather than the entire set of original settings, and/or the like). In some implementations the DAERMC may use the received request to retrieved the last-saved settings in the resource management data structure in the DAERMC database 436, in order to generate and send a settings modification response 438 which includes the original settings that the resource management device may need to revert to. In some implementations the resource management device may revert its settings to the original settings as appropriate, based on the settings provided in the response 440.

Figure 5A:
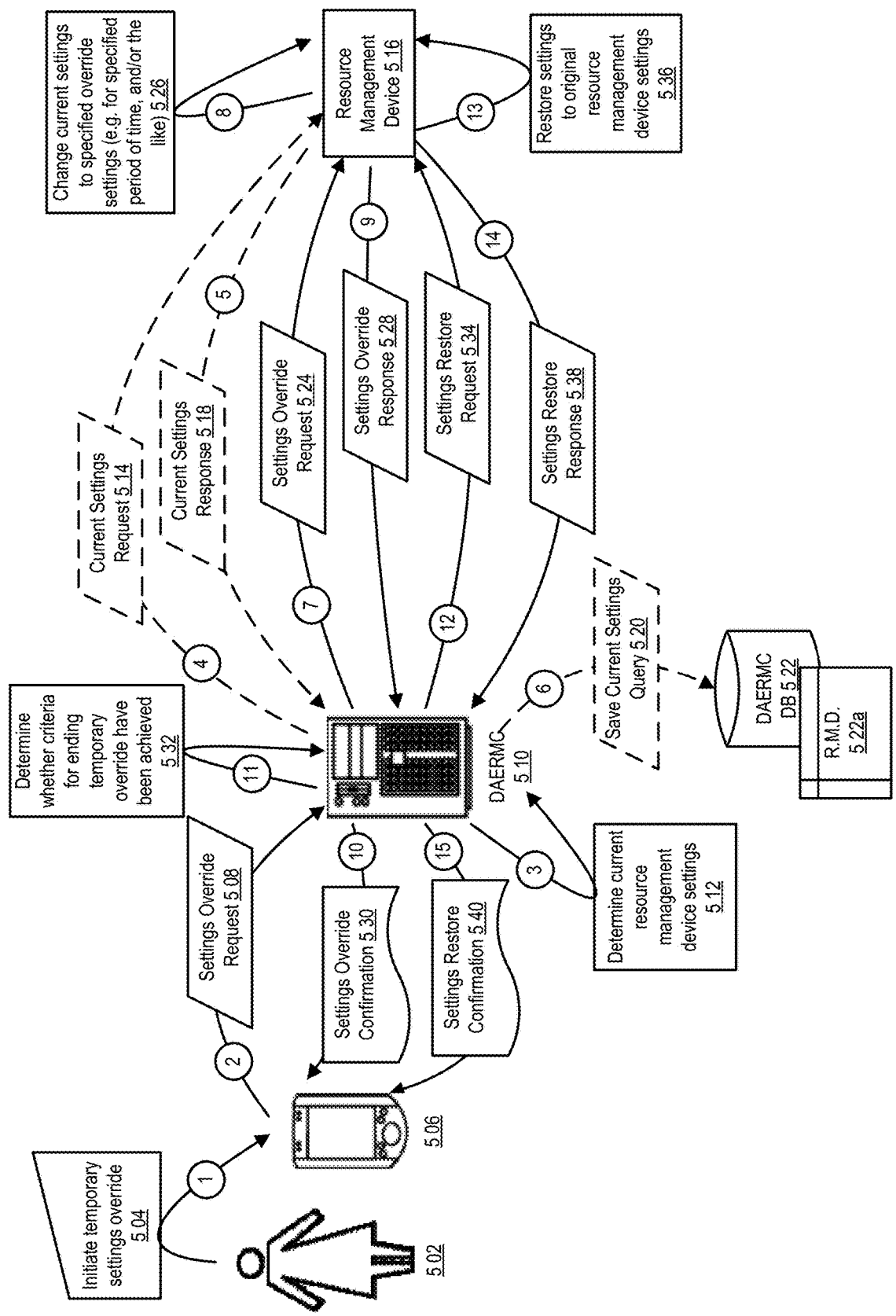
FIG. 5A shows a data flow diagram illustrating overriding settings remotely in some embodiments of the DAERMC.

FIG. 5A shows a data flow diagram illustrating overriding settings remotely in some embodiments of the DAERMC. In some implementations, the user 502 may wish to temporarily override settings, e.g., temporarily override scheduled settings, temporarily rapidly raising and/or cooling a space in order to quickly reach a certain condition within the space (e.g., "Heat Blasts" and/or "Cool Blasts" also referred to as comfort boosts), and/or the like. In some implementations, the user may initiate a temporary settings override 504, e.g., via indicating a desire to override current settings via her electronic mobile device 506. In some implementations the electronic mobile device may then send a settings override request 508 to the DAERMC server 510, which may be an XML-encoded HTTP(s) POST message which may take a form similar to the following:

```
POST /settings_override_request.php HTTP/1.1
Host: www.DAERMCproccess.com
Content-Type: Application/XML
Content-Length: 788
<?XML version = "1.0" encoding = UTF-8"?>
<settings_override_request>
<timestamp>2016-01-01 12:30:00</timestamp>
    <user_params>
        <user_name>example_name</user_name>
        <user_password>********</user_password>
    </user_params>
    <RMD_params>
        <RMD_ID>12345678</RMD_ID>
        <RMD_GPS>-73, 140</RMD_GPS>
        <RMD_action>override</RMD_action>
    </RMD_params>
    <settings>
        <electricity>
```

```
        <lights>
        ...
        </lights>
        <temperature>
            <temp_current></temp_current>
            <temp_hight></temp_high>
            <temp_low></temp_low>
            <temp_home><temp_home>
            <temp_away><temp_away>
            <temp_sleep><temp_sleep>
            <temp_blast>heat, (90, F), (15, minutes)</temp_blast>
        </temperature>
        ...
    </electricity>
    <water>
        ...
    </water>
    <gas>
        ...
    </gas>
    ...
</settings>
</settings_override_request>
```

In some implementations, the server may determine the current resource management settings 512, e.g., via retrieving recently-provided settings data from the resource management device 516, and/or obtaining the most current settings from the resource management device via a current settings request 514, which may be an XML-encoded HTTP(s) POST message which may take a form similar to the following:

```
POST /current_settings_request.php HTTP/1.1
Host: www.DAERMCproccess.com
Content-Type: Application/XML
Content-Length: 788
<?XML version = "1.0" encoding = UTF-8"?>
<current_settings_request>
    <timestamp>2016-01-01 12:30:00</timestamp>
    <user_params>
        <user_name>example_name</user_name>
        <user_password>********</user_password>
    </user_params>
    <RMD_params>
        <RMD_ID>12345678</RMD_ID>
        <RMD_GPS>-73, 140</RMD_GPS>
        <RMD_action>current_settings</RMD_action>
    </RMD_params>
</current_settings_request>
```

The resource management device may send a current settings response 518 which may take a form similar to settings save request 242. After saving the settings via a save current settings query 520 to the resource management device table 522a of the DAERMC database 522, which may take a form similar to settings modification request 246, the DAERMC server may send a settings override request 524 to the resource management device with the settings the user wished to override the original settings with. In some implementations, the settings override request 524 may be an XML-encoded HTTP(s) POST message which may take a form similar to settings override request 508.

In some implementations the resource management device may change its settings 526 based on the override settings (e.g., for a specified time period, until the a temperature is reached, and/or the like). The resource management device may send a settings override response 528 to the server indicating the override was successful. The DAERMC may also send the user a settings override confirmation 530, which may be a notification in a message portion of the electronic mobile device application's interface, a pop-up notification, an auditory notification, an electronic notification via email, text, and/or the like.

The DAERMC may then periodically determine whether or not the criteria specified by the user for ending the temporary override (e.g., a time limit and/or temperature and/or other condition criteria, and/or the like) has been achieved 532. Once the criteria has been achieved, the server may send a settings restore request 534, which may take a form similar to settings modification request 236, in order to restore settings on the resource management device. In some implementations the resource management device may restore the settings to the original settings specified in the restore request 536, and may send a settings restore response 538 to the DAERMC, which may include a confirmation that the original settings have been restored. In some implementations, the DAERMC may send a settings restore confirmation 540 to the user's electronic mobile device. In some implementations the confirmation may take a form similar to settings override confirmation 530, but notifying the user about the status of restoring the settings, rather than overriding them.

Figure 5B:
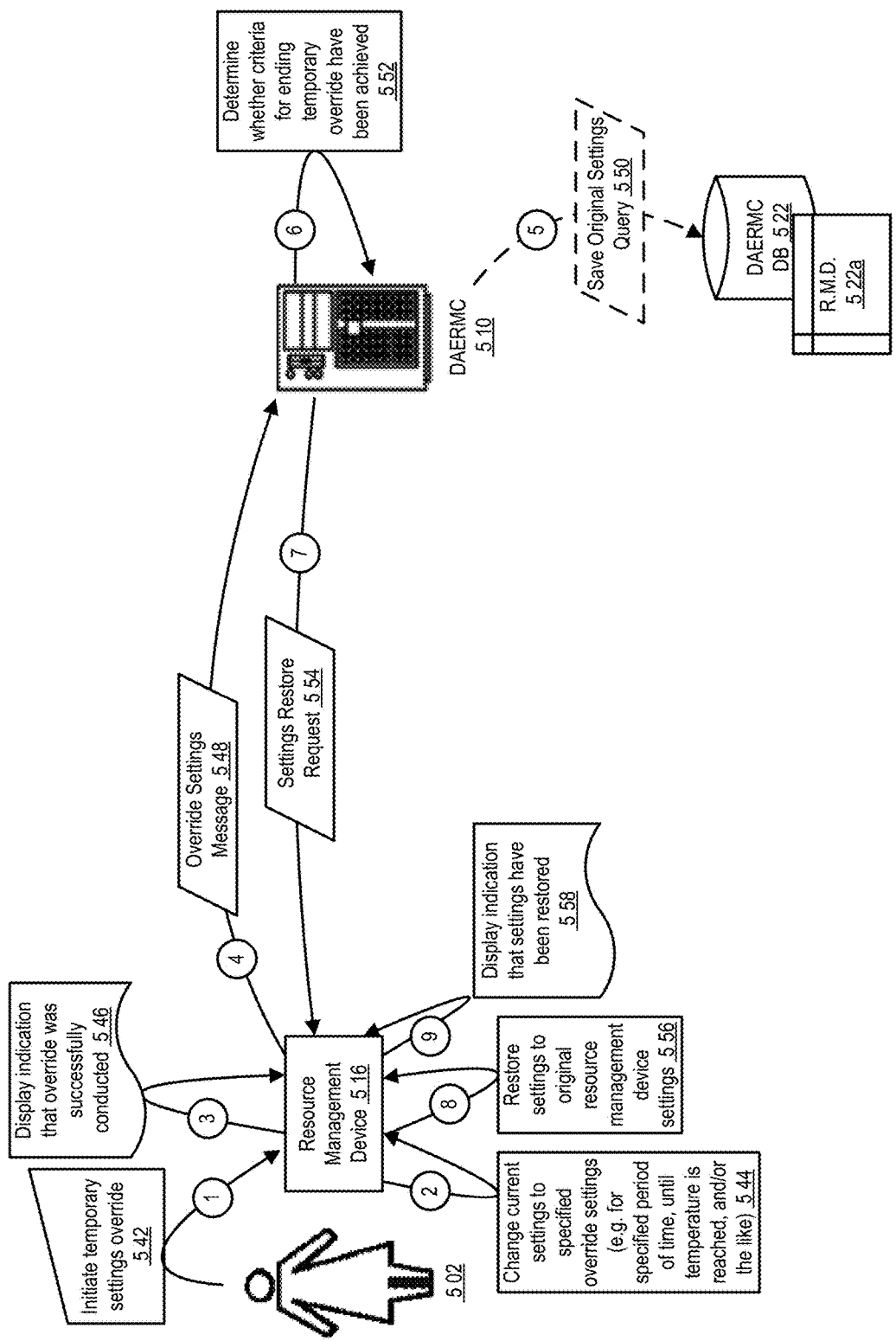
FIG. 5B shows a data flow diagram illustrating overriding settings via a resource management device in some embodiments of the DAERMC.

FIG. 5B shows a data flow diagram illustrating overriding settings via a resource management device in some embodiments of the DAERMC. In some implementations, the user 502 may initiate a temporary settings override 542 via the resource management device 516 rather than an electronic mobile device. In some implementations, the resource management device may change its current settings to the override settings specified by the user 544 (e.g., for a specified period of time, until a specified temperature has been reached, and/or the like). The resource management device may display a notification and/or other indication that the override was successfully conducted 546, and may send an override settings message 548 to the DAERMC server indicating that the settings have been temporarily been overridden. In some implementations override settings message 548 may take a form similar to settings override request 524, e.g., may comprise the settings to be overridden and an indication that they are to be temporarily enacted. In some implementations override settings message 548 may also comprise the original settings the resource management device had prior to the override. In some implementations, override settings message 548 may take a form similar to the following:

```
POST /override_settings_message.php HTTP/1.1
Host: www.DAERMCproccess.com
Content-Type: Application/XML
Content-Length: 788
<?XML version = "1.0" encoding = "UTF-8"?>
<override_settings_message>
<timestamp>2016-01-01 12:30:00</timestamp>
    <user_params>
        <user_name>example_name</user_name>
        <user_password>********</user_password>
    </user_params>
    <RMD_params>
        <RMD_ID>12345678</RMD_ID>
        <RMD_GPS>-73, 140</RMD_GPS>
        <RMD_action>override</RMD_action>
    </RMD_params>
    <original_settings>
        <electricity>
            <lights>
            ...
            </lights>
            <temperature>
                <temp_current>72,F</temp_current>
```

-continued

```
                <temp_hight>80, F</temp_high>
                <temp_low>70,F</temp_low>
                <temp_home>68,F<temp_home>
                <temp_away>58,F<temp_away>
                <temp_sleep>65,F<temp_sleep>
            <temp_blast></temp_blast>
        </temperature>
        ...
    </electricity>
    <water>
        ...
    </water>
    <gas>
        ...
    </gas>
    ...
</original_settings>
<original_settings>
    <electricity>
        <lights>
            ...
        </lights>
        <temperature>
            <temp_current></temp_current>
            <temp_hight></temp_high>
            <temp_low></temp_low>
            <temp_home><temp_home>
            <temp_away><temp_away>
            <temp_sleep><temp_sleep>
            <temp_blast>heat, (90, F), (15, minutes)
            </temp_blast>
        </temperature>
        ...
    </electricity>
    <water>
        ...
    </water>
    <gas>
        ...
    </gas>
    ...
</override_settings>
</override_settings_message>
```

In some implementations the DAERMC server may save the original settings, the override settings and criteria, and/or the like in the resource management device table 522*a* in the DAERMC database 522, via a save original settings query which may take a form similar to save current settings query 520. The DAERMC server may use the saved settings and/or other information obtained from the override settings message in order to determine whether or not the criteria for ending the temporary override have been achieved 552 (e.g. whether or not the time limit for the override and/or the temperature to be reached during the temporary override have been reached, and/or the like). Once the criteria has been achieved, the server may obtain the original settings from its database and may use the data to send a settings restore request 554 to the resource management device indicating that the resource management device should alter its settings to those in the request. In some implementations settings restore request 554 may take a form similar to settings restore request 534. The resource management device may then restore its settings to the original settings 556, and may notify the user that they have successfully been restored via the resource management device interface 558, e.g., via a message on the resource management device's message area, via a pop-up notification, via an auditory notification, and/or the like.

Figure 6A:
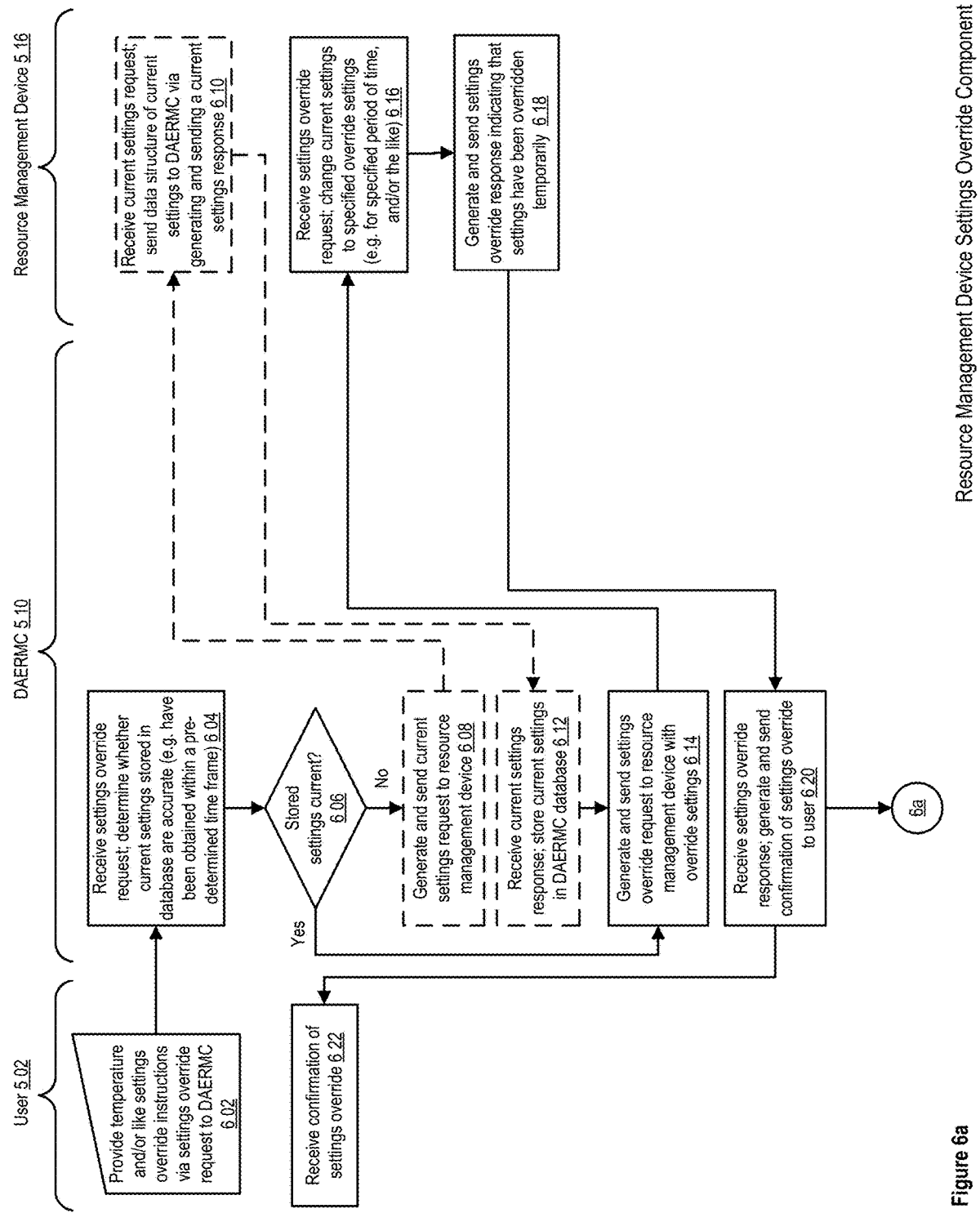
FIGS. 6A-B show logic flow diagrams illustrating overriding settings remotely in some embodiments of the DAERMC.
Figure 6B:
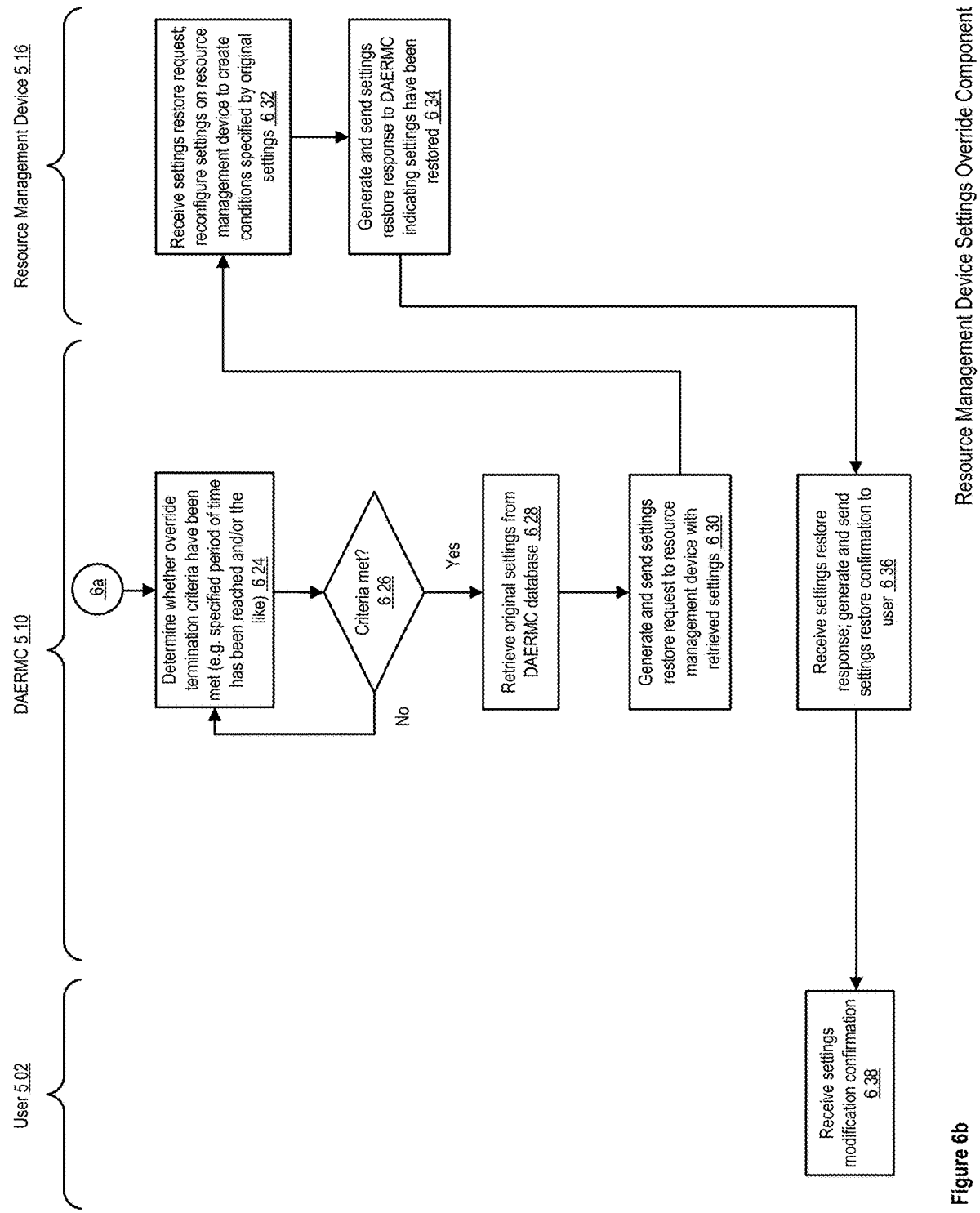

FIGS. 6A-B show logic flow diagrams illustrating overriding settings remotely in some embodiments of the DAERMC. In some implementations, the user may provide settings override instructions to the DAERMC 602, e.g., instructions to override the current temperature, the current humidity, and/or the like, via the user's electronic mobile device. The DAERMC may, after receiving the settings override request, may determine whether or not the settings stored in the DAERMC database are accurate and up-to-date 604 (e.g., whether the settings have been obtained recently, e.g., within a pre-determined threshold of time, and/or the like).

If the settings are not deemed current by the check 606, the DAERMC may generate and send a current settings request to the resource management device 608 in order to get the new settings. The resource management device may, after receiving the request, send the DAERMC the most recent data structure of settings stored on the resource management device 610, via a current settings response. The DAERMC may then store the settings in the response in the DAERMC database 612, and continue the override process.

If the settings are deemed current by the check 606, then the DAERMC may generate and send a settings override request to the resource management device 614 comprising at least the override settings. The resource management may, after receiving the request, use the settings in the request to change the current settings on the resource management device to the specified override settings 616, e.g., as a temporary change (e.g., until a specified period of time has elapsed, until a specified location condition has been attained, and/or the like). The resource management device may generate and send a settings override response to the DAERMC indicating that the resource management device has successfully overridden its settings temporarily 618. The DAERMC may, after receiving the override response, generate and send a confirmation to the user that the settings have successfully been overridden 620 (e.g. via the message portion of the electronic mobile device application interface, via an auditory notification, via a pop-up and/or like notification, and/or the like). The user may receive the confirmation 622 and may use it to monitor and/or keep track of the override.

In some implementations, the DAERMC may also determine intermittently whether or not the override termination criteria specified by the user (e.g., the period of time the override is meant to last for, the conditions and/or the like that may be achieved before the override expires, and/or the like) have been reached 624, and/or the like. For example, the DAERMC may compare the current timestamp with the timestamp of the override response, may intermittently poll the resource management device in order to determine whether condition criteria have been met, and/or the like. If the DAERMC determines the criteria has not been met yet 626, the DAERMC may continue to monitor the status of the termination criteria until it has been met. If the DAERMC determines that the criteria have been met 626, it may retrieve the original settings for the resource management device from the DAERMC database 628, and may generate and send a settings restore request comprising at least the original settings to the resource management device 630, indicating that it should restore its settings to those in the request.

In some implementations, after receiving the request, the resource management device may reconfigure its settings 632 based on the original settings, in order to maintain the conditions specified by the original settings, and/or the like. The resource management device may generate and send settings restore response to the DAERMC indicating that the settings have been restored 634. The DAERMC may receive the settings restore response and generate and send a settings restore confirmation for the user based on the success of the settings restore 636, and the user may receive the settings modification confirmation from the DAERMC 638.

Figure 7:
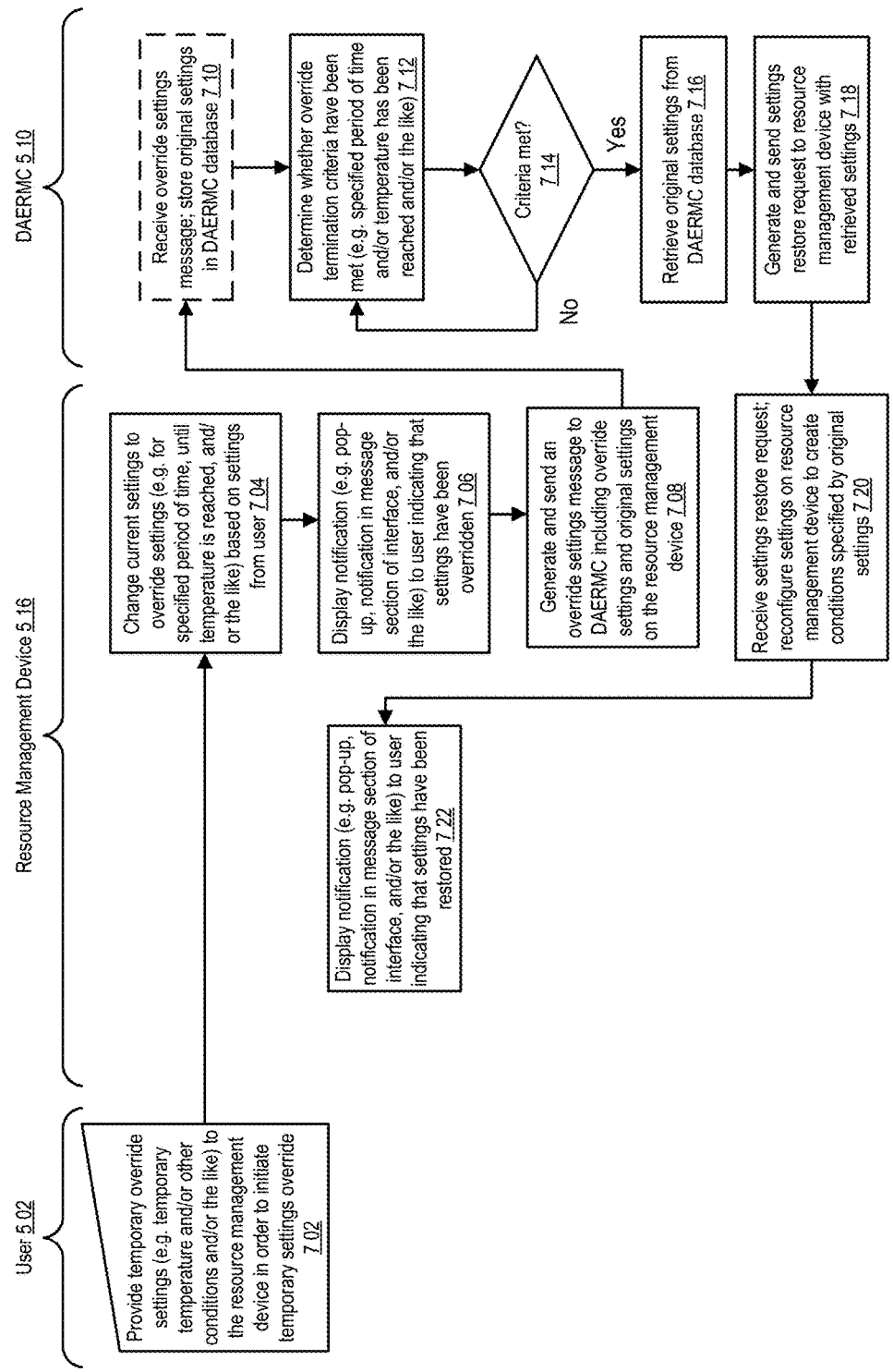
FIG. 7 shows a logic flow diagram illustrating overriding settings via a resource management device in some embodiments of the DAERMC.

FIG. 7 shows a logic flow diagram illustrating overriding settings via a resource management device in some embodiments of the DAERMC. In some implementations, the user may provide temporary override settings directly to the resource management device 702 (e.g. temporary temperature and/or other conditions, and/or the like). The resource management device may change its current settings to the override settings specified by the user 704, and may notify the user via its interface (e.g. by displaying a notification in a message portion of the interface, displaying a pop-up notification, and/or the like) that it has altered its settings based on the override instructions 706. The resource management device may also generate and send an override settings message to the DAERMC 708 indicating that the user has initiated a settings override, the override settings, the settings being overridden, and/or the like.

The DAERMC may receive the message and store the original settings if the DAERMC does not have recent records of the settings 710; the DAERMC may also intermittently determine whether the override termination criteria has been met for the override settings (e.g., whether or not a specified time period has expired, whether a specified temperature and/or other condition has been satisfied, and/or the like) 712. If the criteria has not been met 714, then the DAERMC may continue to monitor the resource management settings, current timestamps in comparison to the timestamp of the override request, and/or the like. If the criteria has been met 714, then the DAERMC may retrieve the original settings for the resource management device from the DAERMC database 716, and may generate and send a settings restore request to the resource management device 718 comprising at least the retrieved resource settings and/or the like. The resource management device may then receive the settings restore request and use it to reconfigure its settings to create the conditions specified by the original settings 720, and may display a notification to the user indicating that the settings on the resource management device has been restored 722 (e.g., via a pop-up notification, an auditory notification, a notification within a message section of the interface, and/or the like).

FIG. 8 shows a data flow diagram illustrating initiating a heat/cool blast in some embodiments of the DAERMC. For example, in some embodiments, a user 802 may provide heat/cool blast settings 804 to a resource management device 806. The settings can include a default duration for a heat blast and/or a cool blast, a default maximum temperature for the heat/cool blast, and/or other such settings. The user can then press a heat/cool blast interface option 808, e.g., using a touchscreen interface on the resource management device, in order to initiate a heat blast or a cool blast. The resource management device may create and/or retrieve 810 a temporary blast schedule, e.g., based on the user's heat/cool blast settings, based on the option the user selected (e.g., to perform a heat blast or a cool blast), and/or based on other information. The resource management device can either retrieve a temporary blast schedule pre-defined based on the user's entered settings, and/or can create a temporary blast schedule dynamically, e.g., based on system default temperature and/or duration settings. The resource management device can override 812 any currently running schedules with the temporary blast schedule, e.g., for the duration of the temporary blast schedule, and/or for another pre-determined period of time. While the temporary blast schedule is running, the user can press 814 a heat/cool blast extension interface option, e.g., in order to extend the duration of the temporary blast schedule (by pre-determined increments, by a user-defined amount, and/or the like). The resource management device may increase 816 the duration of the temporary blast schedule based on the user's input. In some implementations the temporary blast schedule may be limited to a pre-determined duration limit specified by the resource management device. The user may also be able to view a countdown timer for the heat/cool blast, e.g., via the resource management device's display, and may be able to cancel the heat/cool blast at any time during the duration of the temporary blast schedule.

Figure 9A:
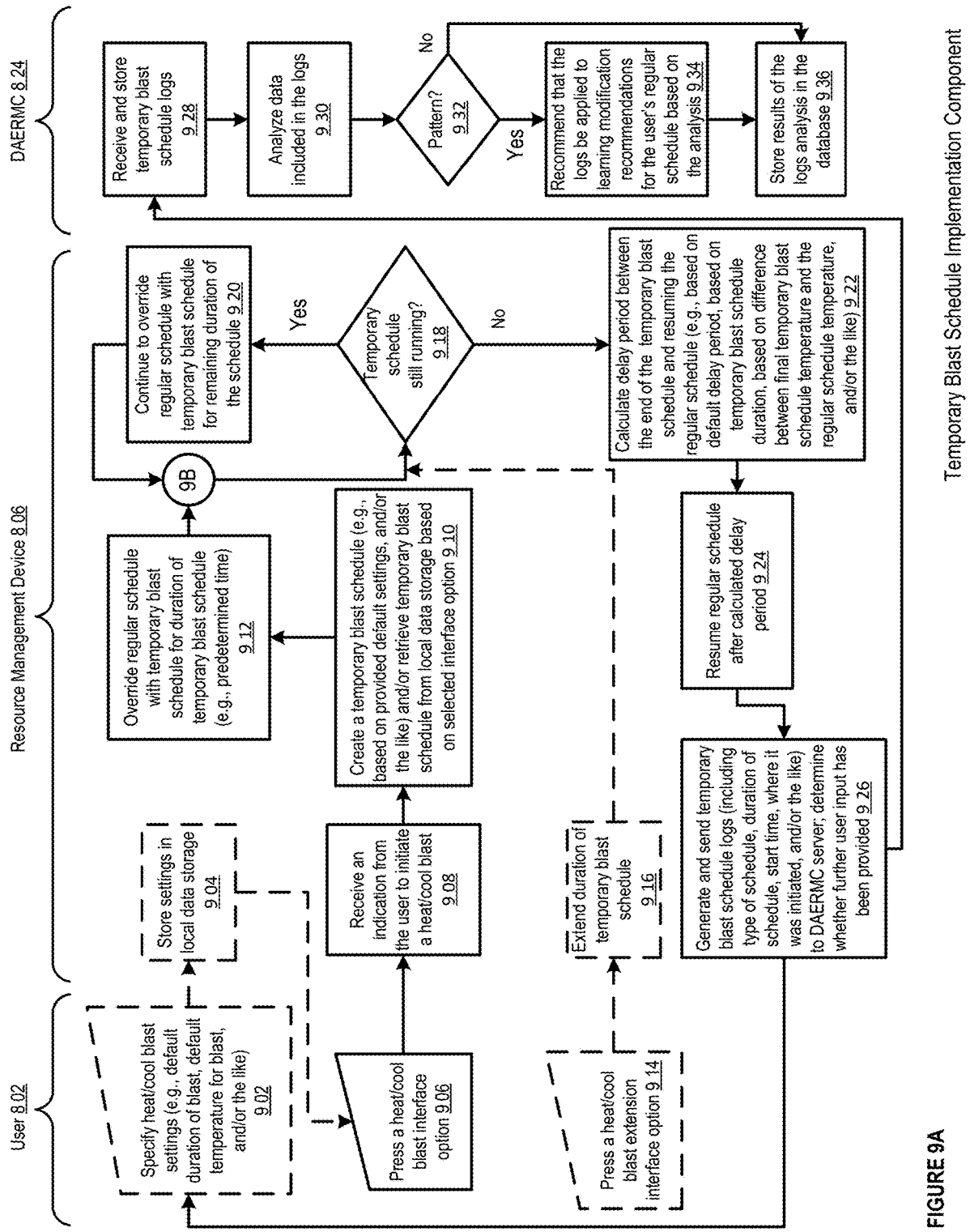
FIG. 9A-B show logic flow diagrams illustrating details of initiating a heat/cool blast in some embodiments of the DAERMC.
Figure 9B:
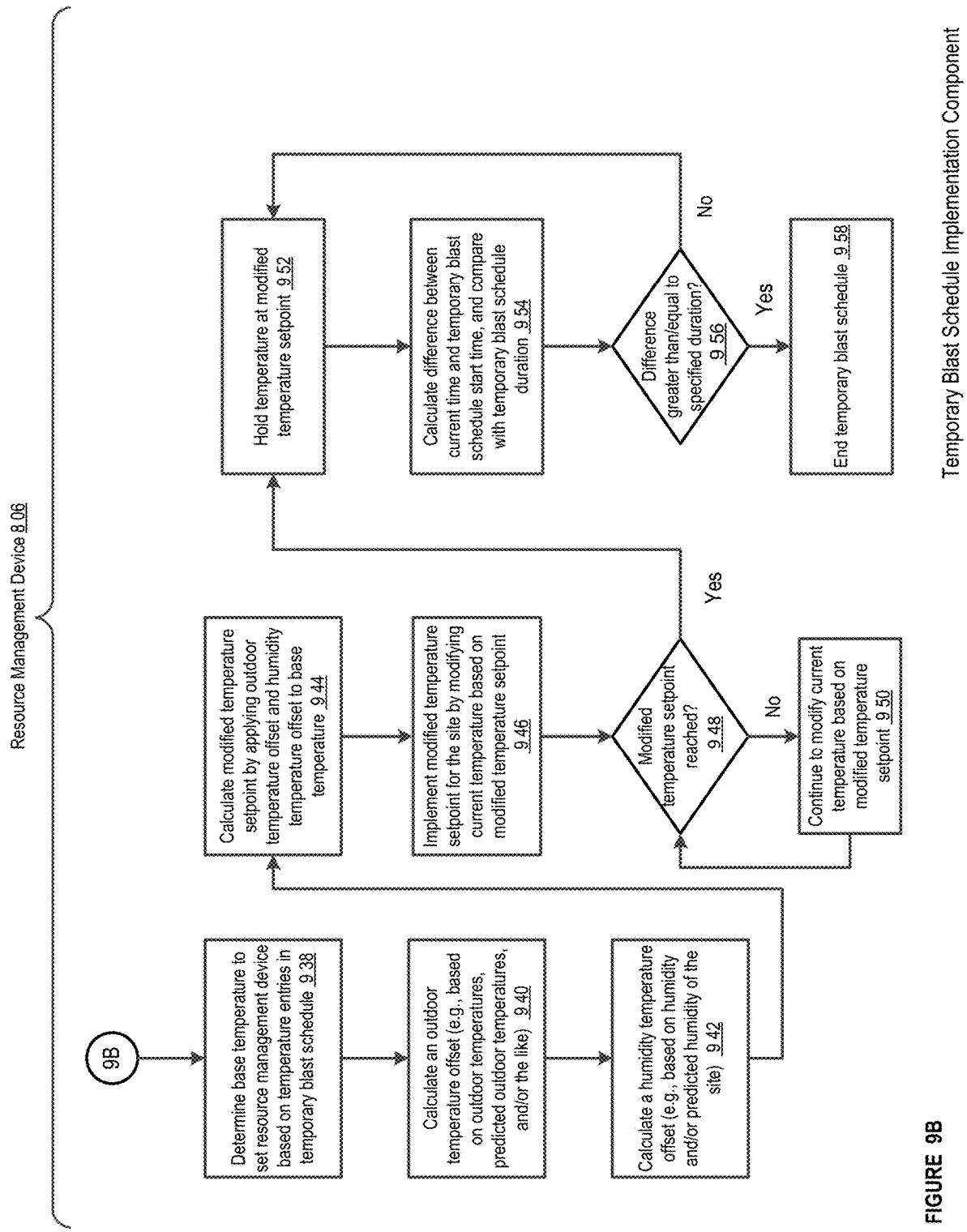

Once the temporary blast schedule has ended, the resource management device may calculate 818 a delay period between the end of the temporary blast schedule and resuming the regular schedule, e.g., in order to prevent drastic changes in temperature (see at least FIGS. 9A-B for more details). In some implementations, the resource management device can skip a delay period, and/or can display a countdown timer of the delay period and can allow a user to cancel the delay period at any time during the duration of the delay period (e.g., by pressing a cancel button, and/or the like). After the delay period has elapsed, the resource management device may resume 820 running the regular schedule which would normally be running at the time the delay period ended. The resource management device may, at some time after the temporary blast schedule is enacted, send temporary blast schedule logs 822 to the DAERMC server 824, including but not limited to information identifying the type of schedule enacted, the duration of the schedule, when the schedule began, temperature settings during the schedule, how many times (if any) the user extended the duration of the temporary blast schedule, and/or other information. In some implementations, an example log entry may take a form similar to the following:

```
<str href="https://wiser.se-ssl-cloud.com/controllers-
  proxy/(UUID)/obix/network/ME/DEV100/Log/Event Next/"
    is="c2g:Property"
    name="Event_Next"
    val="{
        "event_id":"24325",
        "start_time":"02-22-2015T16:00:00Z",
        "duration":"PT60M",
        "cooling_value_setpoint":77.3,
        "is_viewed":false,
    }"
/>
```

The DAERMC server may then process and analyze 826 the logs sent by the temporary blast schedule, and may, if it determines there are patterns in the user's utilization of temporary blast schedules, recommend 828 that the user allow an artificial intelligence module to apply the data from the logs to learning modification recommendations for the user's regular schedule (e.g., based on the server's analysis of the heat/cool blast data). However, in some embodiments, the data received/acquired during temporary blast schedule may be tagged or identified for, or such information otherwise communicated to, an intelligence module and/or other "smart" learning module or program such that temporary overrides or blasts do not change or alter the learning or adaptive schedule(s). That is, although data may be collected during a heat/cool blast, that data can be identified or separated such that it is not utilized when determining a heating/cooling schedule for the user. This can provide the advantage a user can temporarily adjust their heating or cooling without having to worry about such an adjustment causing a change in their overall heating or cooling schedule. Similarly, in some embodiments, the data collected for a specified time after the end of heat or cool blast may similarly be collected but not incorporated into a learning module or the like. For example, a user could request a heat blast override that raises the temperature from 70 to 80 for 20 min, and the temperature data collected during the 20 minutes identified such that it is not utilized in calculations for the user's smart schedule or profile, but also so that data collected during a specified time (e.g., 10 minutes) after the initial 20 minutes is also not utilized in determining the user's smart schedule or profile.

In some implementations, the output of a heat/cool blast, may be the effective heating or cooling setpoint for the resource management device. The effective heating or cooling setpoint can be used in the control logic of the resource management device to calculate the heating or cooling demand on the output terminals of the resource management device, and/or to regulate temperature.

After the heat/cool blast duration is complete, the schedule logic may restart as in the above resource management device control. The delay can be from 1 to 5 minutes, and/or a similar pre-determined value. The goal of this delay may be to ensure that the system does not change from cooling to heating mode abruptly, and makes maintaining the user's comfort more efficient.

The heat/cool blast may also include internal control limits to ensure the system is effective and safe. For example, the blast may have a maximum duration of 60 minutes, and the duration of the temporary blast schedule may be incremented in amounts of 15 minutes. The maximum heat and minimum cool temperatures may be monitored so the blast does not go over comfortable values of the control environments.

FIG. 9A-B show logic flow diagrams illustrating initiating a heat/cool blast in some embodiments of the DAERMC. For example, a user may specify heat/cool blast settings 902 to a resource management device. The settings can include a default duration for a heat blast and/or a cool blast, a default maximum temperature for the heat/cool blast, and/or other such settings. The resource management device may store 904 the settings, e.g., in local data storage, and/or in a cloud server database. The user can then press a heat/cool blast interface option 906, e.g., using a touchscreen interface on the resource management device, in order to initiate a heat blast or a cool blast. The resource management device may receive 908 an indication from the user that the user wishes to initiate a heat/cool blast, and may either create 910 a temporary blast schedule (e.g., based on the user-provided default settings, and/or may retrieve a pre-defined temporary blast schedule stored in local data storage (and/or in the cloud server database), e.g., based on the option the user selects. The resource management device may then override 912 a currently-running regular schedule with the temporary blast schedule, e.g., for the duration of the temporary blast schedule (the duration being for a pre-determined amount of time which can be extended to an extent by the user).

Referring to FIG. 9B, the temporary blast schedule may be implemented by managing a temporary blast schedule temperature setpoint against external factors. For example, the resource management device may determine 938 a base temperature to set the resource management device to, e.g., based on the temperature entries and/or setpoints in the temporary blast schedules. The resource management device may also calculate 940 an outdoor temperature offset (e.g., based on outdoor temperatures, predicted outdoor temperatures, and/or other information) and calculate 942 a humidity temperature offset (e.g., based on the indoor and/or outdoor humidity, based on predicted humidity for the site, and/or other such information). The resource management device may calculate 944 a modified temperature setpoint by applying the outdoor temperature offset and the humidity temperature offset to the base temperature, such that the modified temperature setpoint will cause the site to reach the base temperature even with external factors affecting how the temperature rises and/or falls.

The resource management device may then implement 946 the modified temperature setpoint for the site by modifying the current temperature to become the modified temperature setpoint. The resource management device may monitor the temperature to determine when the modified temperature setpoint has been reached 948; if it has not been reached, the resource management device may continue to modify 950 the current temperature based on the modified temperature setpoint. Once the modified temperature setpoint has been reached, the resource management device may hold 952 the current temperature at the modified temperature setpoint, and may hold it there for the duration of the schedule. The resource management device may calculate 954 the difference between the current time and the temporary blast schedule start time, and may compare the calculated span of time with the temporary blast schedule duration. If the calculated difference is greater than or equal to that of the schedule duration 956, the resource management device may end 958 the temporary blast schedule. If not, the resource management device may continue to hold the temperature at the modified temperature setpoint, and to monitor the status of the schedule.

In some implementations, the process as described in FIG. 9B may be simplified. For example, in some implementations, the temperature setpoint the resource management device uses for the temporary blast schedule may be a maximum temperature allowed for a heat blast, and/or a minimum temperature allowed for a cool blast. The resource management device, therefore, can choose whether to incorporate external factors into the calculation of the heat or cool blast temperature.

Returning to FIG. 9A, the resource management may determine whether the temporary blast schedule is still running 918, and may continue 920 to override the regular schedule with the temporary blast schedule for the remaining duration of the schedule. When the temporary blast schedule has ended, the resource management device may calculate 922 a duration of a delay period between the end of temporary blast schedule and the resumption of the regular schedule. The calculation may be based on a default delay period between schedules, based on the duration of the temporary blast schedule, based on a difference between the final temporary blast schedule temperature and the regular schedule temperature, and/or the like. The resource management device may then resume 924 the regular schedule after the calculated delay period has ended. In some implementations, the resource management device can skip a delay period, and/or can display a countdown timer of the delay period and can allow a user to cancel the delay period at any time during the duration of the delay period (e.g., by pressing a cancel button, and/or the like). The resource management could therefore, for example, provide timer information to the user, and would monitor user input to determine whether the user has cancelled the delay period. The resource management device may eventually generate and send 926 temporary blast schedule logs to the DAERMC server, including the type of schedule the logs are for, the duration of the temporary schedule, the start time for the schedule, where the schedule was initiated (e.g., on-site and/or remotely), and/or other such information. The DAERMC server may receive and store 928 the temporary blast schedule logs, and may analyze the data included in the logs 930. If the DAERMC server detects 932 any patterns and/or other interesting information in the stored logs, it may recommend 934 to the user that the logs be applied to learning modification recommendations for the user's regular schedule (e.g., that the frequency and/or duration of heat/cool blasts should be used to determine modified regular schedules, to calculate built-in delay periods into regular schedules, and/or the like). The server may store 936 the results of the logs analysis in the DAERMC database, regardless of whether a pattern is found or not. The resource management device, meanwhile, can continue to monitor user input to determine whether the user has provided further heat/cool blast input.

In some embodiments, the DAERMC may be implemented on or as a resource management device. The DAERMC can comprise different components and/or software modules, working as a control device and internet server with a database. The data in the database can be used to control the resource management device/device logic and electronics. A schedule can be used with the database to order the events in time. Control logic needed to control the temperature and/or other environmental features in the house/building can be kept in the database as a schedule event. In this way, a daily automated schedule, a DR event and/or a Heat/Cool blast may all be considered scheduled events, having the following parameters: time of the event, duration, setpoint, and/or duty cycle. A H/C blast requested remotely (e.g., via a mobile application on a smart phone) can include the same data in the object schedule as if it was requested locally, and this object can be kept in the resource management device database. The H/C blast can be kept in the schedule the whole duration. At the end, the local event log of the resource management device can be queried to retrieve the H/C blast event.

In some embodiments, the DAERMC may utilize a control algorithm (e.g., resource management device control algorithm) that utilizes the schedule object to select the effective setpoint values to be used for the control of the outputs, and thus imply a logical network of parameters. An example resource management device control may have a logic flow related to the schedule and manual and/or automatic changes to a setpoint. This can be a low priority process that can be overridden by the DR and the heat/cool blast events. In an example embodiment, the heat/cool blast can follow the same logic as a DR event, and/or a general temporary override event. The DR event can override a heat/cool blast event, in some embodiments of the DAERMC. In some implementations, the output of the heat/cool blast, as in the DR event, may be the effective heating or cooling setpoint. The effective heating or cooling setpoint can be used in the control logic of the resource management device for temperature regulation, e.g., to calculate the heating or cooling demand on the output terminals of the resource management device. In some embodiments, after the heat/cool blast duration is complete, a delay can be applied for recovery of the next setpoint in the regular schedule being resumed. The schedule logic can then restart the regular schedule as in the above-described resource management device control. The delay can run for a default duration (e.g., from 1 to 5 minutes), or can be dynamically determined based on characteristics of the event (e.g., a longer delay for a longer heat/cool blast). The delay can also be configurable in various other ways. The delay can ensure that the system does not change from cooling to heating mode too abruptly, making the temperature modifications more energy efficient. Some embodiments may provide a delay period for one of a heating event or a cooling event only (depending on whether the blast was heat or cool blast), while other embodiments may calculate delay periods for both heating and cooling events. The heat/cool blast can also include control limits to ensure the system is effective and safe. For example, the heat/cool blast may have a maximum duration of 60 minutes, wherein the base duration can be augmented or decremented by 15 minute increments up to 3 times. In other implementations, the base duration can be augmented or decremented in 5 minute increments up to the 60 minute limit. The maximum heat temperature and minimum cool temperature can be monitored so the heat/cool blast does not go over comfortable values of the control environments.

Figure 10:
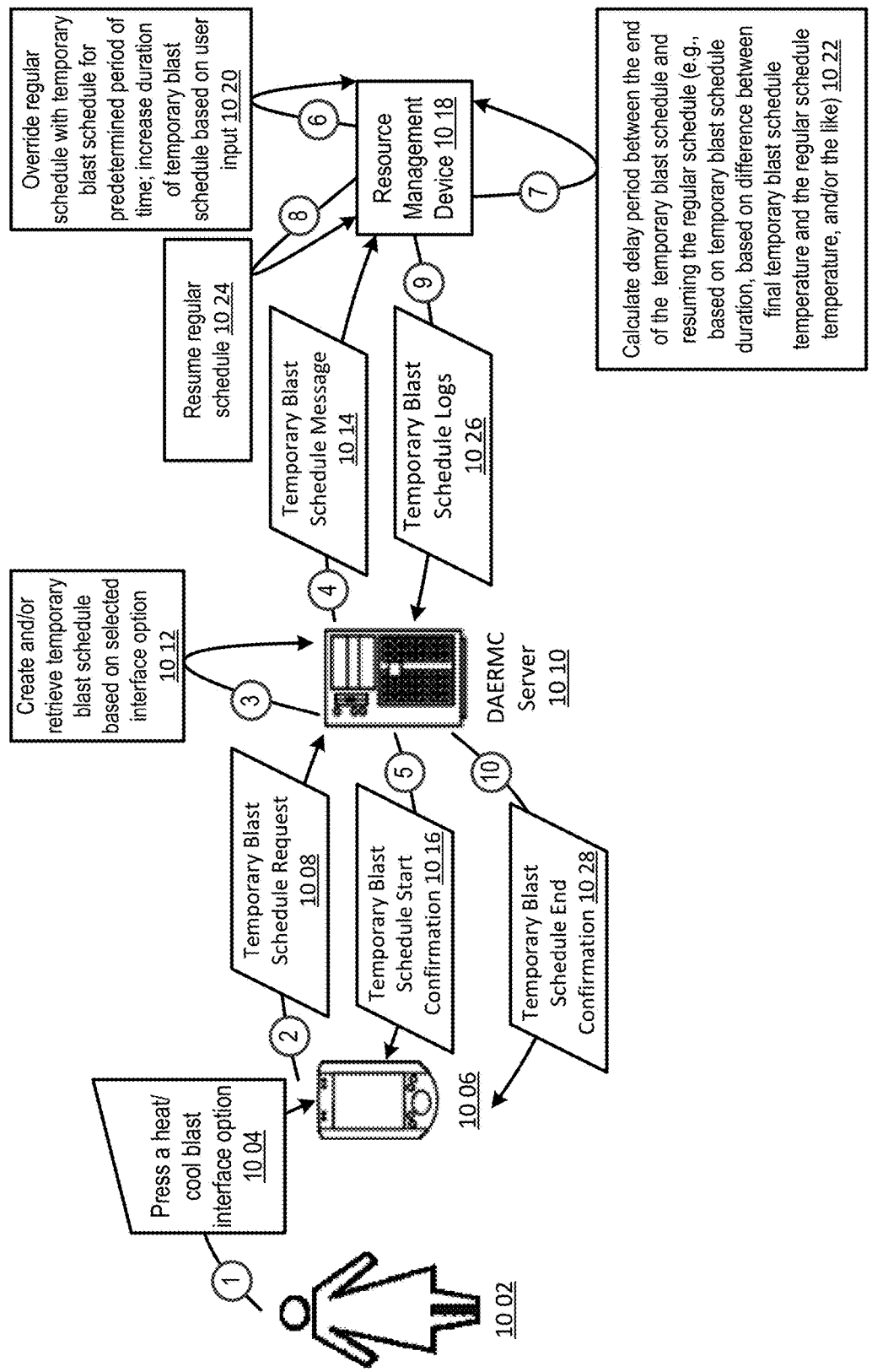
FIG. 10 shows a data flow diagram illustrating initiating a heat/cool blast via a mobile device in some embodiments of the DAERMC.

FIG. 10 shows a data flow diagram illustrating initiating a heat/cool blast via a mobile device in some embodiments of the DAERMC. For example, in some implementations, a user 1002 may press a heat/cool blast option 1004, e.g., on a mobile device 1006. The option can allow for a user to remotely initiate a heat blast or a cool blast, and/or to remotely extend the duration of a heat/cool blast. When the mobile device receives the user input, the mobile device can generate and send a temporary blast schedule request 1008 to the DAERMC server 1010. The DAERMC server can create and/or retrieve 1012 a temporary blast schedule, e.g., based on whether the user has selected a heat blast or a cool blast, and can generate and send a temporary blast schedule message 1014 to the resource management device 1018. The temporary blast schedule message can include the retrieved and/or created temporary blast schedule, the type of blast being initiated, and/or other related information. In some implementations, the DAERMC server can send the temporary blast schedule message to the resource management device without including a temporary blast schedule (e.g., including only the type of blast to be initiated), and the resource management device can create and/or retrieve a temporary blast schedule itself, e.g., using the blast type from the temporary blast schedule message. The DAERMC server may also generate and send a temporary blast schedule start confirmation 1016 to the user, e.g., via her mobile device, such that the user is informed remotely of when the heat/cool blast has been initiated. The user may be able to view a countdown timer for the heat/cool blast, and may be able to cancel the heat/cool blast at any time during the duration of the temporary blast schedule.

Once the resource management device has a temporary blast schedule to implement, the resource management device can override 1020 its currently-running regular schedule with the temporary blast schedule, e.g., for a predetermined period of time. The user can also provide subsequent input to the mobile device to increase the duration of the temporary blast schedule. The resource management device may then increase the duration of the temporary blast schedule, e.g., up to a pre-determined temporary schedule limit. The resource management device may also calculate a delay period after the temporary blast schedule has ended 1022, e.g., based on the temporary blast schedule duration, the difference between the final temporary blast schedule temperature and the regular schedule temperature, and/or other such criteria. In some implementations, the resource management device can skip a delay period, and/or can display a countdown timer of the delay period and can allow a user to cancel the delay period at any time during the duration of the delay period (e.g., by pressing a cancel button, and/or the like). The resource management device may then resume its regular schedule 1024, and may send temporary blast schedule logs 1026 to the DAERMC server, including data about when the schedule started, how long it was implemented, the temperatures within the schedule, and/or other such information. The DAERMC server may send a temporary blast schedule end confirmation message 1028 to the user's mobile device, and can also process the temporary blast schedule logs in a manner similar to that described in FIGS. 9A-B.

Figure 11:
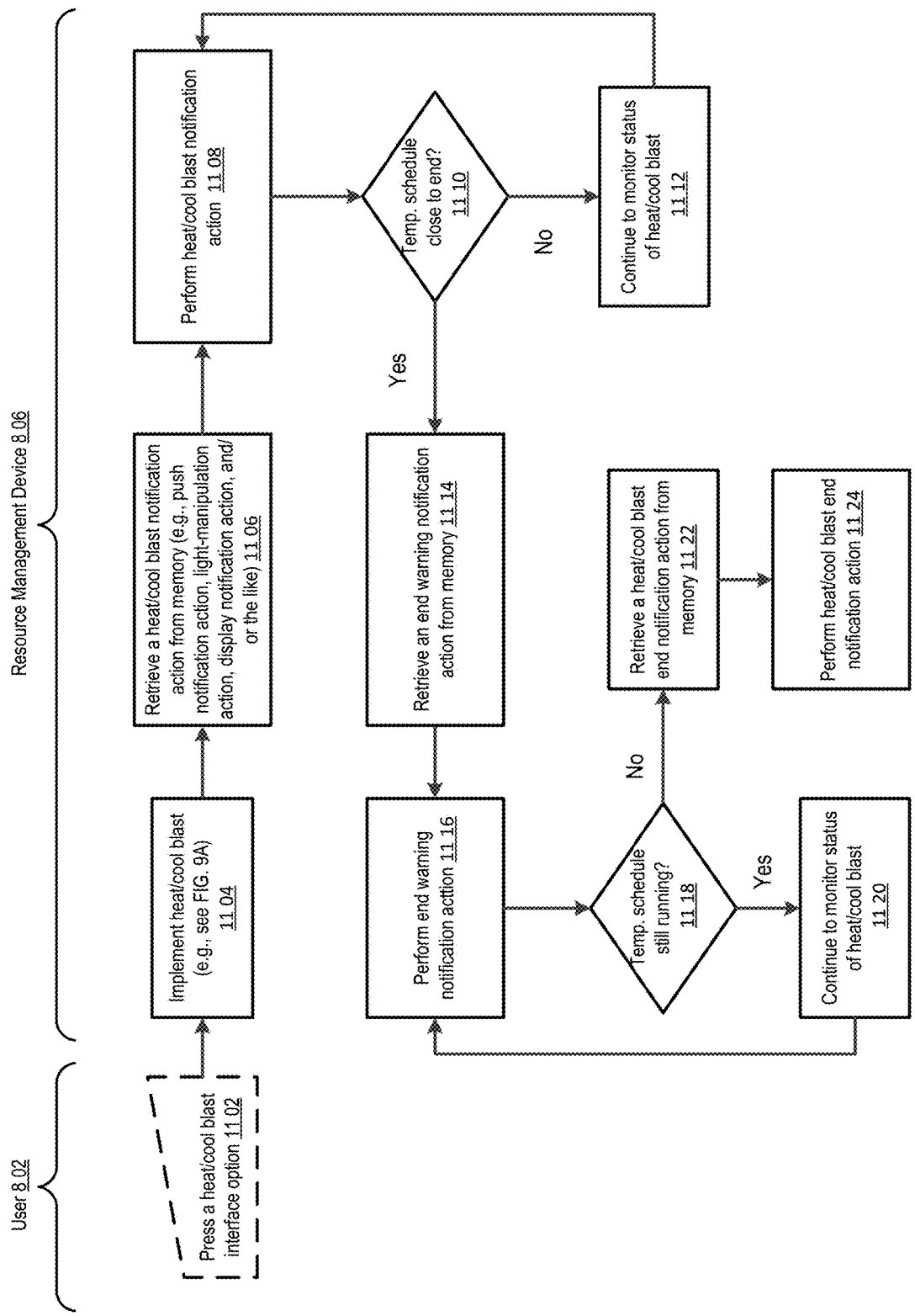
FIG. 11 shows a data flow diagram illustrating notifications for resource management device settings in some embodiments of the DAERMC.

FIG. 11 shows a data flow diagram illustrating notifications for resource management device settings in some embodiments of the DAERMC. For example, in some implementations, a user can press a heat/cool blast interface option 1102, and a resource management device may implement the heat/cool blast 1104 (e.g., see FIG. 9A-B for more details). The resource management device can retrieve 1106 heat/cool blast notification action(s) from memory (e.g., push notification actions, light-manipulation actions (e.g., Halo and/or Pulse), display notification actions, play auditory notification sounds, and/or similar actions), which can represent actions the resource management device can take to notify the user visually that a particular option and/or routine is being implemented. The resource management device can then perform 1108 the heat/cool blast notification action. For example, the resource management device may have a light-manipulation action that causes ambient lights within the case of the resource management device, and/or the backlight on the display of the resource management device, to flash and/or brighten when the heat/cool blast is implemented. The resource management device may have blue lights flash and/or remain on when a cool blast is implemented, and/or may have red lights flash and/or remain on when a heat blast is implemented. The resource management device may also check to determine 1110 how close the temporary blast schedule (described above) is to ending; if the schedule is not close to ending, the resource management device may continue to monitor 1112 the status of the heat/cool blast. When the temporary blast schedule is close to ending, the resource management device may retrieve 1114 an end warning notification action from memory, and may perform 1116 the end warning notification action. Continuing with the example above, for example, the resource management device may determine that flickering the lights and/or the backlight for the screen may be an end warning notification action, and may flicker the blue lights when the cool blast is implemented, or flicker the red lights when the heat blast is implemented, to warn the user that the heat/cool blast is close to ending.

Similarly, when the temporary blast schedule has ended 1118, the resource management device may retrieve 1122 a heat/cool blast end notification action from memory, and may perform 1124 the heat/cool blast end notification action. For example, the resource management device may turn off the blue or red lights once the cool blast or heat blast (respectively), and/or display an end notification on the resource management device's display, and/or perform a like action. If the temporary schedule is still running, the resource management device may continue to monitor 1120 the status of the heat/cool blast.

Figure 12:
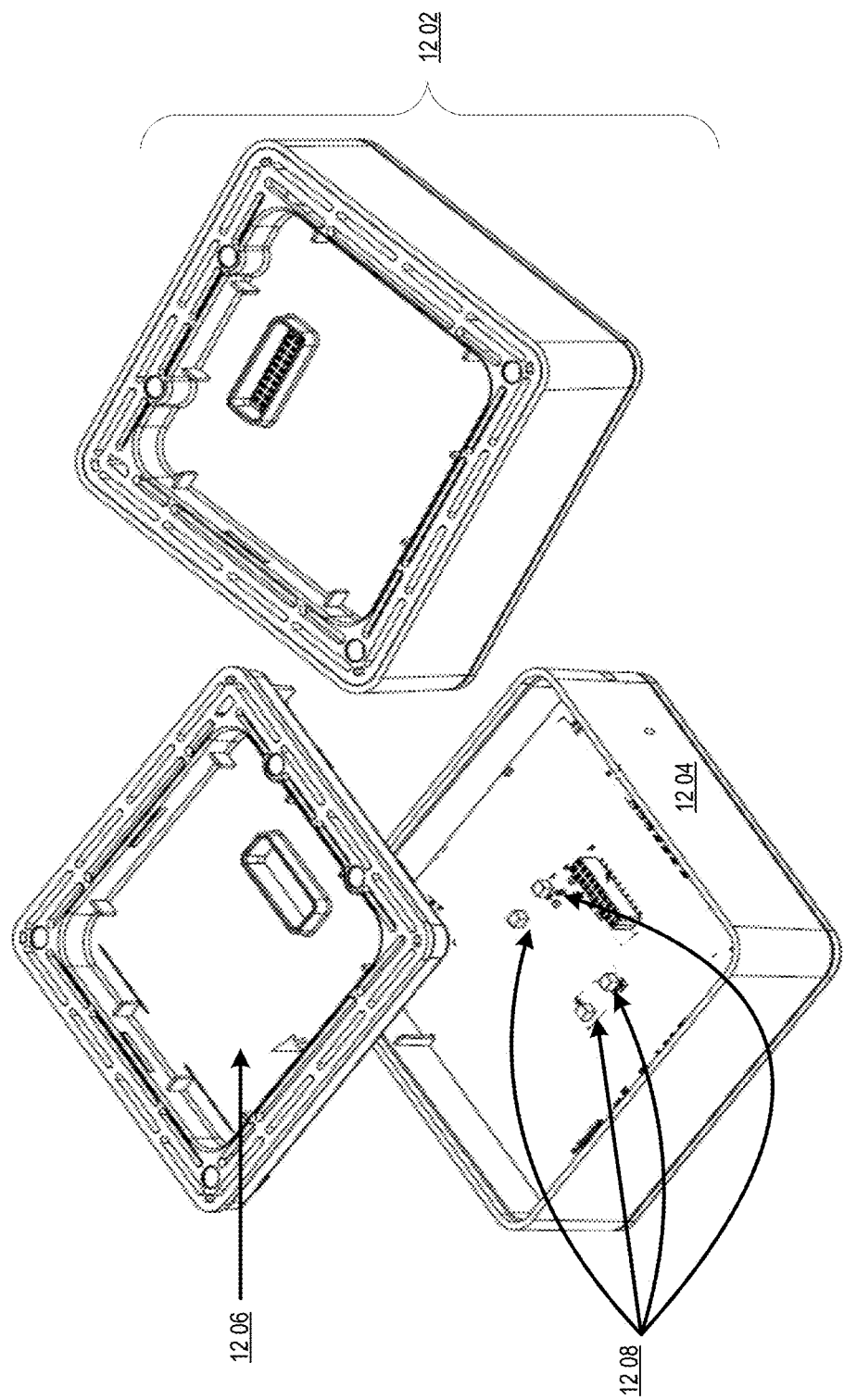
FIG. 12 shows a diagram illustrating a housing for a resource management device in some embodiments of the DAERMC.

FIG. 12 shows a diagram illustrating a housing 1202 for a resource management device according to some embodiments of the DAERMC. The housing may comprise a main body 1204 and a backing plate 1206 (though it is to be understood that the housing could, in some embodiments, be unitary and/or monolithically formed). In some implementations, a resource management device housing may include a plurality of lighting elements/devices 1208 (e.g., LEDs and/or the like). The LEDs can be positioned centrally and/or radially inward (e.g., in the center or central region of the housing or main body, instead of along the border or perimeter of the housing or main body). Such a configuration can be utilized to increase efficiency by reducing the number of LEDs (or other lighting elements) used to create/provide light-manipulation actions. A transparent and/or translucent plate 1206 can be attached to the back of the main body 1204 and/or the resource management device housing can include transparent or translucent portion thereon or therein. The transparent or translucent plate or portion is configured to diffuse light from the LEDs or other lighting devices (acting as a "light-pipe"), such that, for example, the emitted light forms a halo-like effect on a wall and/or other surface behind a resource management device and/or on which the resource management device is mounted (e.g., as discussed above with reference to the light-manipulation action feature of the DAERMC).

Figure 13:
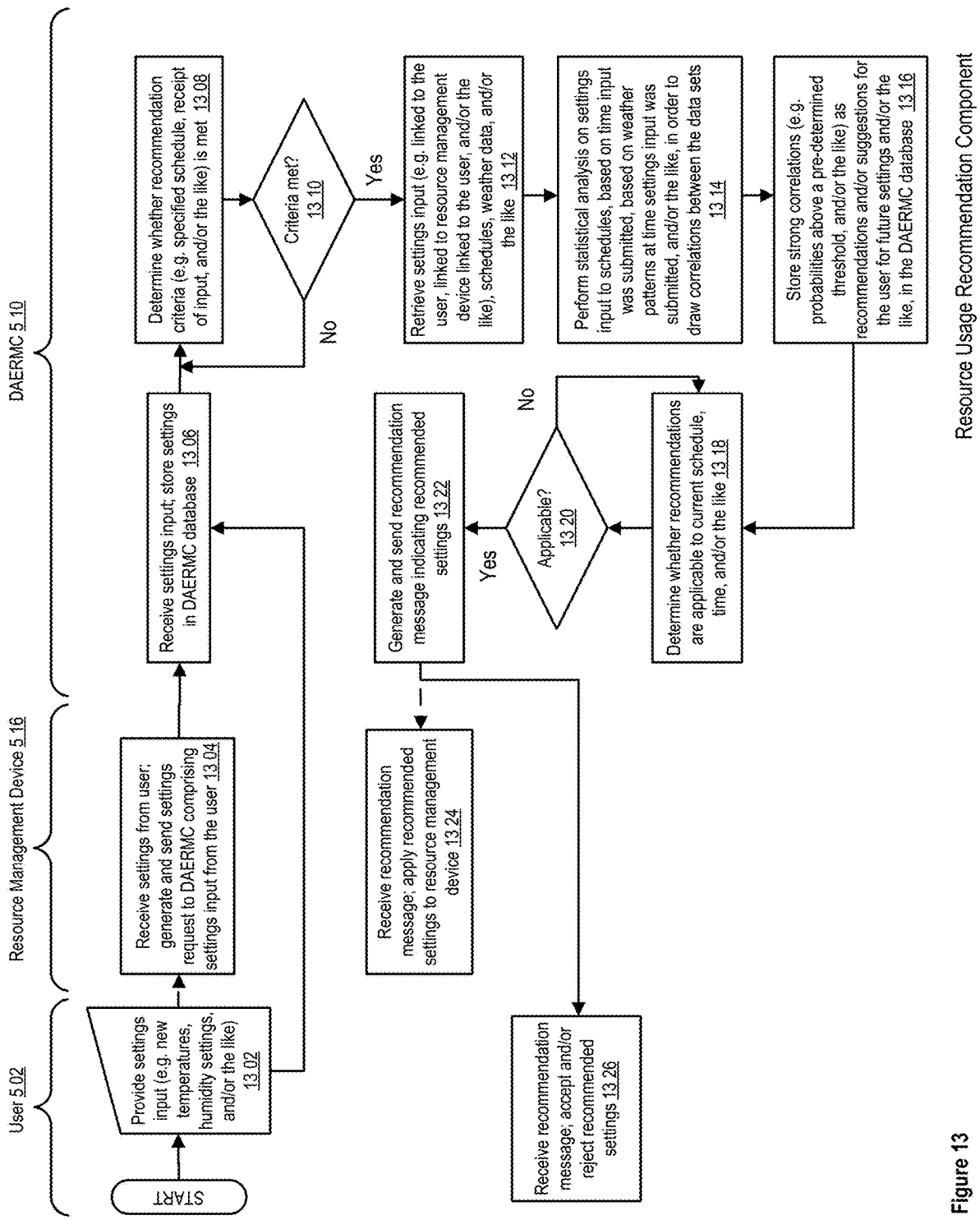
FIG. 13 shows a logic flow diagram illustrating recommending resource usage in some embodiments of the DAERMC.

FIG. 13 shows a logic flow diagram illustrating recommending resource usage in some embodiments of the DAERMC. In some implementations, the recommendation process is a repetitive process involving frequently making inferences and predictions about how users may utilize and/or wish to utilize their resources, based on how they have previously managed settings during particular times, under particular conditions, and/or the like. In some implementations, a user may provide settings input to a resource management device 1302, e.g., new temperature and/or humidity settings, and/or like settings. In some implementations input may also comprise temporary override input and/or any like input the user may provide to the resource management device. In some implementations the user may also provide the input to an application on an electronic mobile device which may relay the information to the resource management device and/or the DAERMC. In some implementations, the resource management device may generate and send a settings request to the DAERMC comprising the user's setting input 1304; in some implementations the DAERMC may receive the settings input and store it in the DAERMC database 1306. In some implementations, the settings input may be directly sent to the DAERMC, where it may be stored in the DAERMC database. The DAERMC may, in some implementations, determine whether the criteria for determining whether or not a recommendation should be developed has been met 1308. In some implementations, recommendations may be developed whenever new settings input is provided to the DAERMC, based on a pre-determined update schedule for developing updated recommendations, and/or the like. In some implementations, if the criteria has not been met 1310, the DAERMC may continue to monitor input and/or the like to determine when to update its recommendations. If the criteria has been met 1310, the DAERMC may retrieve settings input 1312 (e.g., all settings input, current and previous, linked to the user in the DAERMC database; all settings input, current and previous, linked to the resource management device linked to the user, and/or any other resource management devices on the same network as the resource management device; and/or the like), as well as schedule data, weather data (e.g., outdoor temperature and humidity data, storm data, and/or the like), settings from other users within the same location, and/or the like. In some implementations, the DAERMC may perform statistical analysis on the settings input 1314 relative to the user's schedules, based on weather pattern data juxtaposed with the schedule data, the settings data, and the timestamps of the submitted settings, based on the settings input relative to other users' settings, and/or the like.

The DAERMC may draw correlations between the data sets using statistical analysis, and/or like algorithms. In other implementations, the DAERMC may utilize a neural network and/or like machine learning algorithm using the data sets as input and outputting a likelihood that a user may wish to alter its resource management device to adopt a particular set of settings at a particular point in time. In some implementations, the DAERMC may store strong correlations and/or predictions in a recommendations and/or suggestions table in the DAERMC database 1316; in some implementations strong correlations and/or predictions may be determined such by being above a pre-determined threshold of probability, and/or the like. In some implementations the DAERMC may store the function, neural network, and/or like mechanism for determining correlations and/or predictions, rather than the predictions themselves. The DAERMC may also determine whether the new recommendations and/or old recommendations are applicable to a current schedule, time frame, and/or the like 1318, via determining the current time, weather, and/or the like conditions and utilizing them to search recommendations and determine which settings the user might prefer (and/or via providing the conditions as input to a statistical analysis and/or machine learning algorithm stored in the database, and/or the like). If a recommendation and/or the like is applicable to the user's current circumstances 1320, the DAERMC may generate and send a recommendation message to the resource management device indicating the recommended settings 1322. The resource management device may receive the recommendation message and apply the recommended settings to the resource management device 1324, and/or may forward them to the user for approval prior to altering its current settings. In some implementations the user may receive the recommendation message from the DAERMC and may be able to accept and/or reject all or portions of the recommended settings 1326. In some implementations the resource management device and/or the user's electronic mobile device may inform the DAERMC that the settings have been accepted or rejected, and may provide an updated version of the current settings to the DAERMC for its records, so it may use the settings to further refine recommendations and/or the like.

Figure 14:
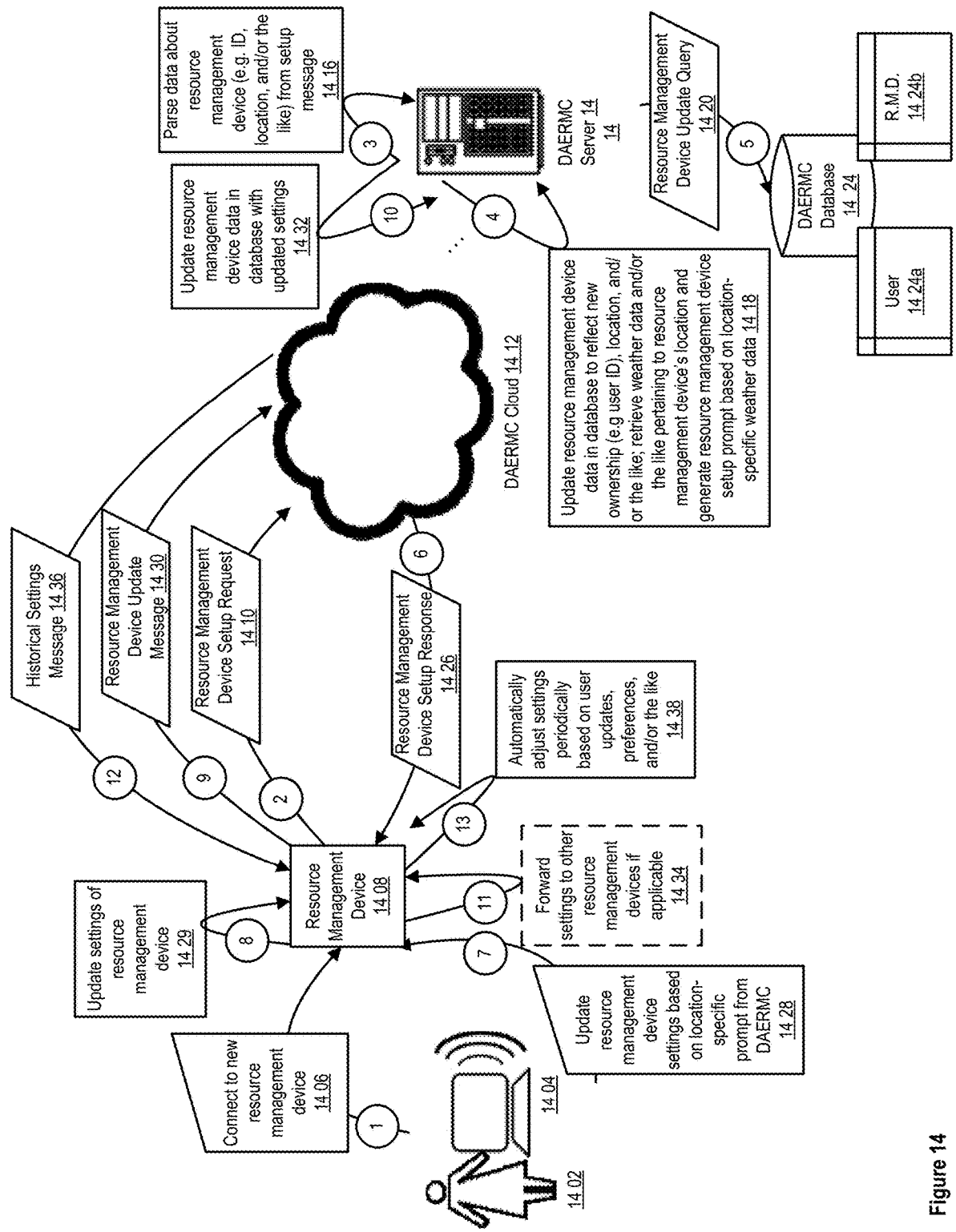
FIG. 14 shows a data flow diagram illustrating initiating a new resource management device in some embodiments of the DAERMC.

FIG. 14 shows a data flow diagram illustrating initiating a new resource management device in some embodiments of the DAERMC. In some implementations, a user 1402 may utilize an electronic device 1404 to connect 1406 to a new DAERMC resource management device 1408 that has been installed in a home, and/or the like. In some implementations, the electronic device itself may act as a resource management device, and may instead be connecting via a webpage, application, and/or the like to DAERMC cloud 1412 for initialization.

In some implementations, the resource management device may send a resource management device setup request 1410 to the DAERMC cloud. In some implementations, said request may be an XML-encoded HTTP(S) POST message, which may take a form similar to the following:

```
POST /RMD_setup_message.php HTTP/1.1
Host: www.DAERMCproccess.com
Content-Type: Application/XML
Content-Length: 788
<?XML version = "1.0" encoding = "UTF-8"?>
<RMD_setup_message>
<timestamp>2016-01-01 12:30:00</timestamp>
    <user_params>
```

```
        <user_username>example_name</user_username>
        <user_password>********</user_password>
        <user_new>true</user_new>
        <user_name>Jane Smith</user_name>
        <user_address>123 Main Street, Anytown, Anytown 12345</user_address>
        <user_email>example_email@example.com</user_email>
        <user_phone>1111111111</user_phone>
        <user_map></user_map>
    </user_params>
    <RMD_params>
        <RMD_ID>12345678</RMD_ID>
        <RMD_GPS>-73, 140</RMD_GPS>
    </RMD_params>
</RMD_setup_message>
```

In some implementations, a DAERMC server 1414 in the cloud may parse 1416 resource management device, user, and/or like data from the resource management device setup request. The server may also update the resource management device's data to indicate new ownership, create or update a user record for the user initializing the resource management device, and/or the like 1418. In some implementations such data may be stored and/or updated in the user 1424*a* and/or resource management device 1424*b* tables of the DAERMC database 1424. In some implementations, the user's ID, the resource management device's new location, and/or the like, may all be used to update records in the database. In some implementations the server may perform these actions via a resource management device update query 1420 to the database, which may be a PHP-encoded MYSQL message similar to the following:

```
<?php
    ...
        $user = $_POST["user_username"];
        $user_password = $_POST["user_password"];
        $RMD = $_POST["RMD_ID"];
    ...
        if(mysql_num_rows(mysql_query("SELECT user_username, user_password FROM users WHERE user_username = '$user' AND user_password = '$user_password'"))){
            $result= mysql_query (UPDATE users SET user_address=$user_address WHERE user_id='$user');
            $user_id = mysql_result($result, 0, "user_ID");
            $result= mysql_query (UPDATE RMD SET user_ID='$user_ID' WHERE user_id='$user_ID');
    ...
}
>
```

In some implementations, the cloud may use the data obtained in the resource management device setup request (e.g. the location of the resource management device, and/or the like) in order to determine location-specific weather data in the area where the resource management device is being initiated, for the purpose of generating a setup prompt tailored to the user's specific needs for her weather in her area at the time of setup. In some implementations, the cloud may send a resource management device setup response 1426 back to the resource management device, indicating that the database has successfully initialized the new user-resource management device relationship in the cloud, and including the location-specific setup prompt for the user. In some implementations, the user may then start to provide resource management device settings, instructions, restrictions, controls, and/or the like 1428 to the resource management device using the location-specific setup prompt provided by the response. The resource management device may update itself with those settings 1429, and may also send a resource management device update message 1430 to the cloud in order to indicate that a change in settings has been made to the resource management device. In some implementations, the resource management device update message may be an XML-encoded HTTP(S) POST message that may take a form similar to the following:

```
POST /RMD_update_message.php HTTP/1.1
Host: www.DAERMCproccess.com
Content-Type: Application/XML
Content-Length: 788
<?XML version = "1.0" encoding = "UTF-8"?>
<RMD_update_message>
<timestamp>2016-01-01 12:30:00</timestamp>
    <user_params>
        <user_name>example_name</user_name>
        <user_password>********</user_password>
    </user_params>
    <RMD_params>
        <RMD_ID>12345678</RMD_ID>
        <RMD_GPS>-73, 140</RMD_GPS>
    </RMD_params>
    <settings>
        <electricity>
            <lights>
                <lights_limit>12, hours</lights_limit>
                <lights_limit>10, kWh</lights_limit>
                <lights_Sunday>1800, 0000
                </lights_Sunday>
                <lights_Monday>2000, 0000
                </lights_Monday>
                ...
                <lights_Saturday>1900, 0500
                </lights_Saturday>
            </lights>
            <temperature>
                <temp_current>72,F</temp_current>
                <temp_hight>80, F</temp_high>
                <temp_low>70,F</temp_low>
                <temp_home>68,F<temp_home>
                <temp_away>58,F<temp_away>
                <temp_sleep>65,F<temp_sleep>
                <temp_blast></temp_blast>
            </temperature>
            ...
        </electricity>
        <water>
            <water_gallons>20</water_gallons>
            ...
        </water>
        <gas>
        ...
        </gas>
        ...
    </settings>
</RMD_update_message>
```

The cloud may then update the resource management device data in the resource management device's record in the database to incorporate the new settings. In some implementations, the cloud may keep track of all changes in settings in order to determine historical usage statistics, historical tendencies towards certain resource settings, schedules, and/or the like, and/or for a like purpose. In some implementations the cloud may also authenticate any request from a user to change the settings of the resource management device, and may then send a confirmation to the resource management device before it changes its settings.

In some implementations, the resource management device may forward the settings received either from the user or from the confirmation from the cloud to other resource management devices at the site 1434. Additionally, whenever the resource management device receives historical settings data via a historical settings message 1436, the resource management device may automatically adjust its settings and/or its algorithm for automatically maintaining settings in the absence of user input 1438, based on the historical setting data received. In some implementations, historical settings message 1436 may be an XML-encoded HTTP(S) POST message which may take a form similar to the following:

```
POST /RMD_update_message.php HTTP/1.1
Host: www.DAERMCproccess.com
Content-Type: Application/XML
Content-Length: 788
<?XML version = "1.0" encoding = "UTF-8"?>
<RMD_update_message>
<timestamp>2036-01-01 12:30:00</timestamp>
    <user_params>
        <user_name>example_name</user_name>
        <user_password>********</user_password>
    </user_params>
    <RMD_params>
        <RMD_ID>12345678</RMD_ID>
        <RMD_GPS>-73, 140</RMD_GPS>
    </RMD_params>
    <settings_history>
        <settings_1>
            <settings_date>2036-01-01 12:30:00
            </settings_date>
            <electricity>
            ...
            </electricity>
            <water>
            ...
            </water>
            <gas>
            ...
            </gas>
            ...
        </settings_1>
        <settings_2>
            <settings_date>2036-05-06 12:30:00
            </settings_date>
            <electricity>
            ...
            </electricity>
            <water>
            ...
            </water>
            <gas>
            ...
            </gas>
            ...
        </settings_2>
        ...
    </settings_history>
</RMD_update_message>
```

In some implementations, the resource management device may automatically adjust settings by aggregating the historical data it possesses and determining average resource use schedules and/or the like based on the averages of the historical data. In other implementations, the user of the resource management device and/or a control device may be able to specify which settings, controls, and/or the like the local user has priority over setting, and which the resource management device and/or control device has priority over (e.g. in some implementations, the local user's temperature settings may be set as being a priority over temperature settings sent from the master resource management device, and/or the like). In further implementations, settings from the resource management device may override the user's local settings under certain circumstances (e.g., the resource management device's settings may override the other resource management device's settings when the other resource management device detects no one is in the room and/or using the appliance, resource, device, and/or the like connected with the other resource management device, and/or the like).

Figure 15:
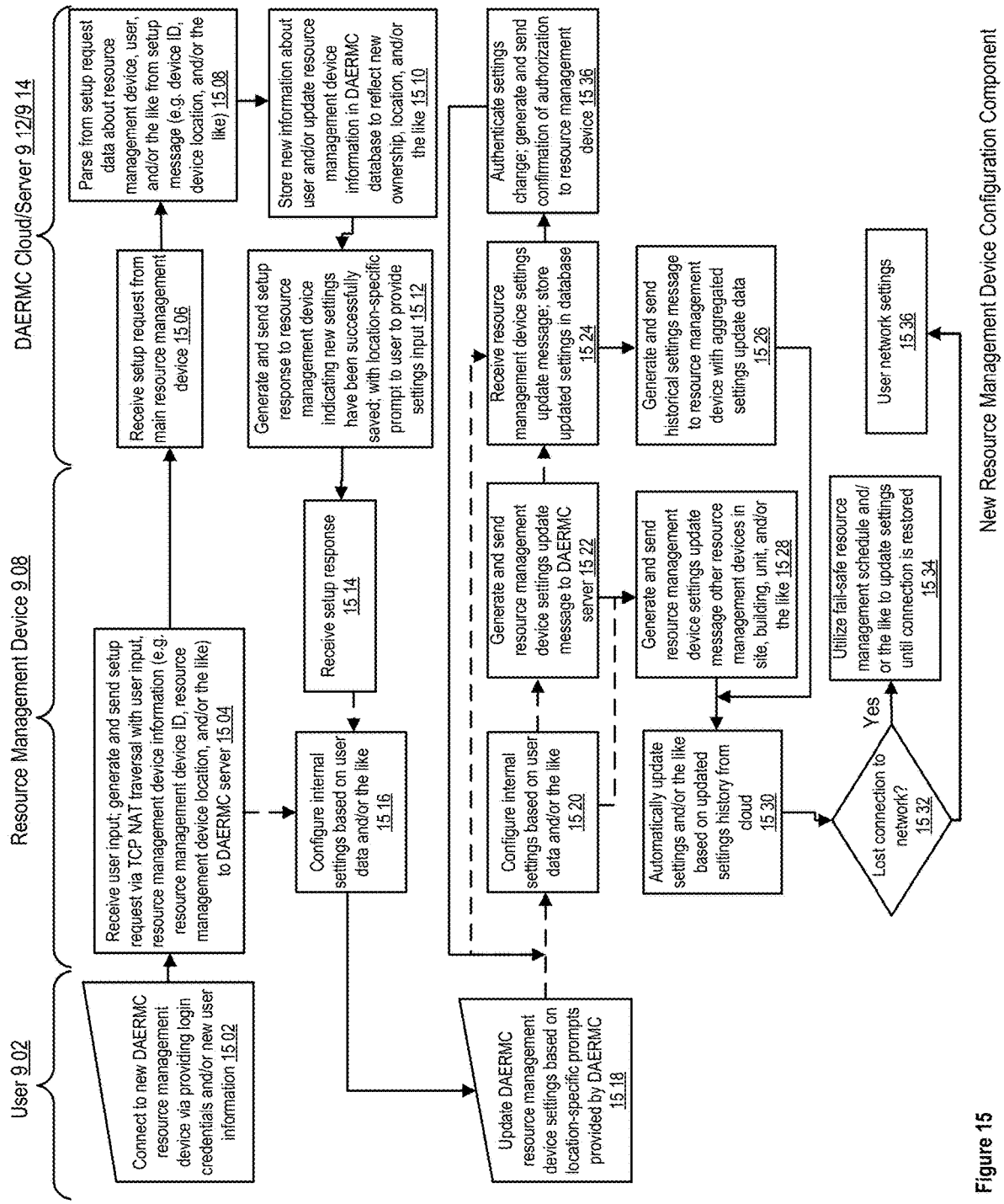
FIG. 15 shows a logic flow diagram illustrating initiating a new resource management device in some embodiments of the DAERMC.

FIG. 15 shows a logic flow diagram illustrating initiating a new resource management device in some embodiments of the DAERMC. In some implementations, the user may connect 1402 to the new DAERMC resource management device, or may connect to a resource management device interface via her electronic device, and may provide user login credentials (e.g. a username and passport), new user information (e.g. name, address, username, password, email, phone number, map of home, office/and or the like layout, and/or the like), and/or like information. In some implementations, the resource management device may receive the user's input and generate a setup request 1504 to the cloud containing the user input, resource management device information (e.g. the resource management device ID, the resource management device location, and/or the like), and/or like information. In some implementations, the resource management device and the cloud may connect via a TCP or UDP NAT traversal-based connection (e.g. TCP/UDP hole punching).

In some implementations, the cloud may receive 1506 the setup request from the resource management device and parse from the data provided therein user data, resource management device data, and/or the like 1508 from the request. The cloud may store any new user information in a new user record, in the DAERMC database 1510, may update the user's existing record with any new information provided in the request, and/or may update resource management device information stored in the database with the information in the request (e.g., the resource management device may be updated to reflect new ownership, a new address and/or location in a building, and/or the like). In some implementations, once the database has been updated, the cloud may generate and send a setup response 1512 to send to the resource management device, indicating that the new settings have successfully been saved to the system. After receiving 1514 the setup response, the resource management device may configure itself based on the user-provided settings 1516 (e.g., may initialize living room defaults if the user indicated the resource management device is situated in the living room, may initialize summer office defaults if the user indicated the date of initialization, and/or the like).

In some implementations, a user may subsequently update 1518 the resource management device's settings. The resource management device may configure its internal settings 1520 based on the user-provided settings data, and then may generate and send a resource management device setting update message 1522 to the DAERMC cloud. In some implementations, the user may instead provide the settings information (e.g., to the resource management device and/or directly to the cloud), and the cloud, after receiving the resource management device settings 1524 and storing the updated settings in the resource management device's update history, may authenticate 1536 the actual instantiation of the updated settings on the resource management device. After configuring its internal settings, the resource management device may generate and send resource management device settings update messages 1528 to other resource management devices in the site, building, unit, and/or the like.

Upon receiving historical settings data via a historical settings message generated by the cloud 1526 and containing aggregate settings update and/or like data, the resource management device may automatically update its settings and/or the like 1530 based on the history that it obtains from the cloud. Should the resource management device lose its connection to the cloud 1532, the resource management device may use a fail-safe resource management schedule 1534, may keep its own historical record of settings updates, and/or the like until its connection with the cloud has been restored.

Figure 16:
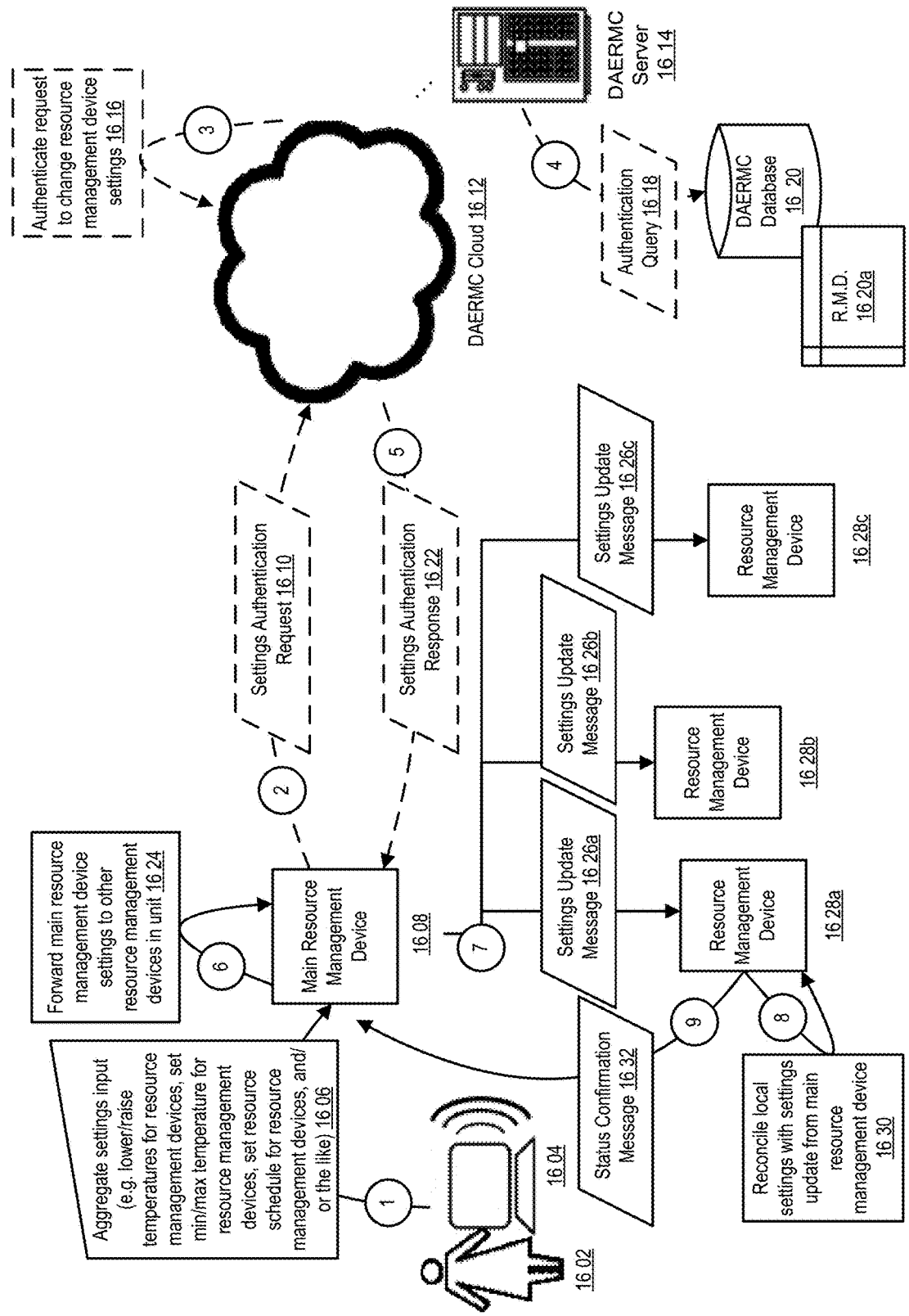
FIG. 16 shows a data flow diagram illustrating updating resource management device settings in some embodiments of the DAERMC.

FIG. 16 shows a data flow diagram illustrating updating resource management device settings in some embodiments of the DAERMC. In some implementations, a user 1602 may user her electronic device 1604 in order to provide settings input 1606 to a DAERMC resource management device 1608. In some implementations, the settings input may include aggregate settings for a plurality of other resource management devices and/or like devices. The resource management device may send these settings and authentication information to the DAERMC cloud via a settings authentication request 1610. In some implementations, settings authentication request 1610 may be an XML-encoded HTTP(S) POST message that may take a form similar to the following:

```
POST /settings_auth_message.php HTTP/1.1
Host: www.DAERMCproccess.com
Content-Type: Application/XML
Content-Length: 788
<?XML version = "1.0" encoding = "UTF-8"?>
<settings_authentication_request>
<timestamp>2016-01-01 12:30:00</timestamp>
    <user_params>
        <user_name>example_name</user_name>
        <user_password>********</user_password>
    </user_params>
    <RMD_params_a>
        <RMD_ID>12345678</RMD_ID>
        <RMD_GPS>-73, 140</RMD_GPS>
        <RMD_new_settings>
            <electricity>
                <lights>
                    <lights_limit>12, hours</lights_limit>
                    <lights_limit>10, kWh</lights_limit>
                    <lights_Sunday>1800, 0000</lights_Sunday>
                    <lights_Monday>2000, 0000</lights_Monday>
                    ...
                    <lights_Saturday>1900, 0500</lights_Saturday>
                </lights>
                <temperature>
                    <temp_current>72,F</temp_current>
                    <temp_hight>80, F</temp_high>
                    <temp_low>70,F</temp_low>
                    <temp_home>68,F<temp_home>
                    <temp_away>58,F<temp_away>
                    <temp_sleep>65,F<temp_sleep>
                    <temp_blast></temp_blast>
                </temperature>
                ...
            </electricity>
            <water>
                <water_gallons>20</water_gallons>
                ...
            </water>
            <gas>
                ...
            </gas>
            ...
        </RMD_new_settings>
    </RMD_params_a>
    <RMD_params_b>
        <RMD_ID>0987654</RMD_ID>
        <RMD_GPS>57, -80</RMD_GPS>
        <RMD_new_settings>
            <electricity>
                ...
            </electricity>
```

```
            <water>
                ...
            </water>
            <gas>
                ...
            </gas>
            ...
        </RMD_new_settings>
    </RMD_params_b>
    <RMD_params_c>
        <RMD_ID>246810</RMD_ID>
        <RMD_GPS>50, 50</RMD_GPS>
        <RMD_new_settings>
            <electricity>
                ...
            </electricity>
        </RMD_new_settings>
    </RMD_params_c>
    <RMD_params_d>
        <RMD_ID>975311</RMD_ID>
        <RMD_GPS>-100, -160</RMD_GPS>
        <RMD_new_settings>
            <water>
                ...
            </water>
            <gas>
                ...
            </gas>
        </RMD_new_settings>
    </RMD_params_d>
</settings_authetication_request>
```

In some implementations, the cloud may authenticate 1616 the request to change resource management device settings via querying 1618 the database 1620 to ensure the user provided the correct credentials for the resource management device and for the other resource management devices. If the user is authenticated, the cloud may send a settings authentication response 1622 to the resource management device indicating that it has permission to forward 1624 the settings to the other resource management devices. In some implementations the settings may be sent via settings update messages 1626a-b. In some implementations, the settings update messages 1626a-c may be XML-encoded HTTP(S) POST messages that may take a form similar to the following:

```
POST /settings_update_message.php HTTP/1.1
Host: www.DAERMCproccess.com
Content-Type: Application/XML
Content-Length: 788
<?XML version = "1.0" encoding = "UTF-8"?>
<settings_update_request>
    <timestamp>2016-01-01 12:30:00</timestamp>
    <user_params>
        <user_name>example_name</user_name>
        <user_password>********</user_password>
    </user_params>
    <RMD_params_b>
        <RMD_ID>0987654</RMD_ID>
        <RMD_GPS>57, -80</RMD_GPS>
        <RMD_new_settings>
            <electricity>
                ...
            </electricity>
            <water>
                ...
            </water>
            <gas>
                ...
            </gas>
        </RMD_new_settings>
    </RMD_params_b>
</settings_update_request>
POST /settings_update_message.php HTTP/1.1
Host: www.DAERMCproccess.com
Content-Type: Application/XML
Content-Length: 788
<?XML version = "1.0" encoding = "UTF-8"?>
<settings_update_request>
    <timestamp>2016-01-01 12:30:00</timestamp>
    <user_params>
        <user_name>example_name</user_name>
        <user_password>********</user_password>
    </user_params>
    <RMD_params_c>
        <RMD_ID>246810</RMD_ID>
        <RMD_GPS>50, 50</RMD_GPS>
        <RMD_new_settings>
            <electricity>
                ...
            </electricity>
        </RMD_new_settings>
    </RMD_params_c>
</settings_update_request>
POST /settings_update_message.php HTTP/1.1
Host: www.DAERMCproccess.com
Content-Type: Application/XML
Content-Length: 788
<?XML version = "1.0" encoding = "UTF-8"?>
<settings_update_request>
    <timestamp>2016-01-01 12:30:00</timestamp>
    <user_params>
        <user_name>example_name</user_name>
        <user_password>********</user_password>
    </user_params>
    <RMD_params_d>
        <RMD_ID>975311</RMD_ID>
        <RMD_GPS>-100, -160</RMD_GPS>
        <RMD_new_settings>
            <water>
                ...
            </water>
            <gas>
                ...
            </gas>
        </RMD_new_settings>
    </RMD_params_d>
</settings_update_request>
```

In some implementations, the other resource management devices may need to reconcile their local settings 1630 with those issued from the resource management device. In some implementations the other resource management devices may send 1632 a status confirmation message to the resource management device indicating that the settings have successfully been sent and instantiated and/or incorporated on the other resource management devices.

Figure 17:
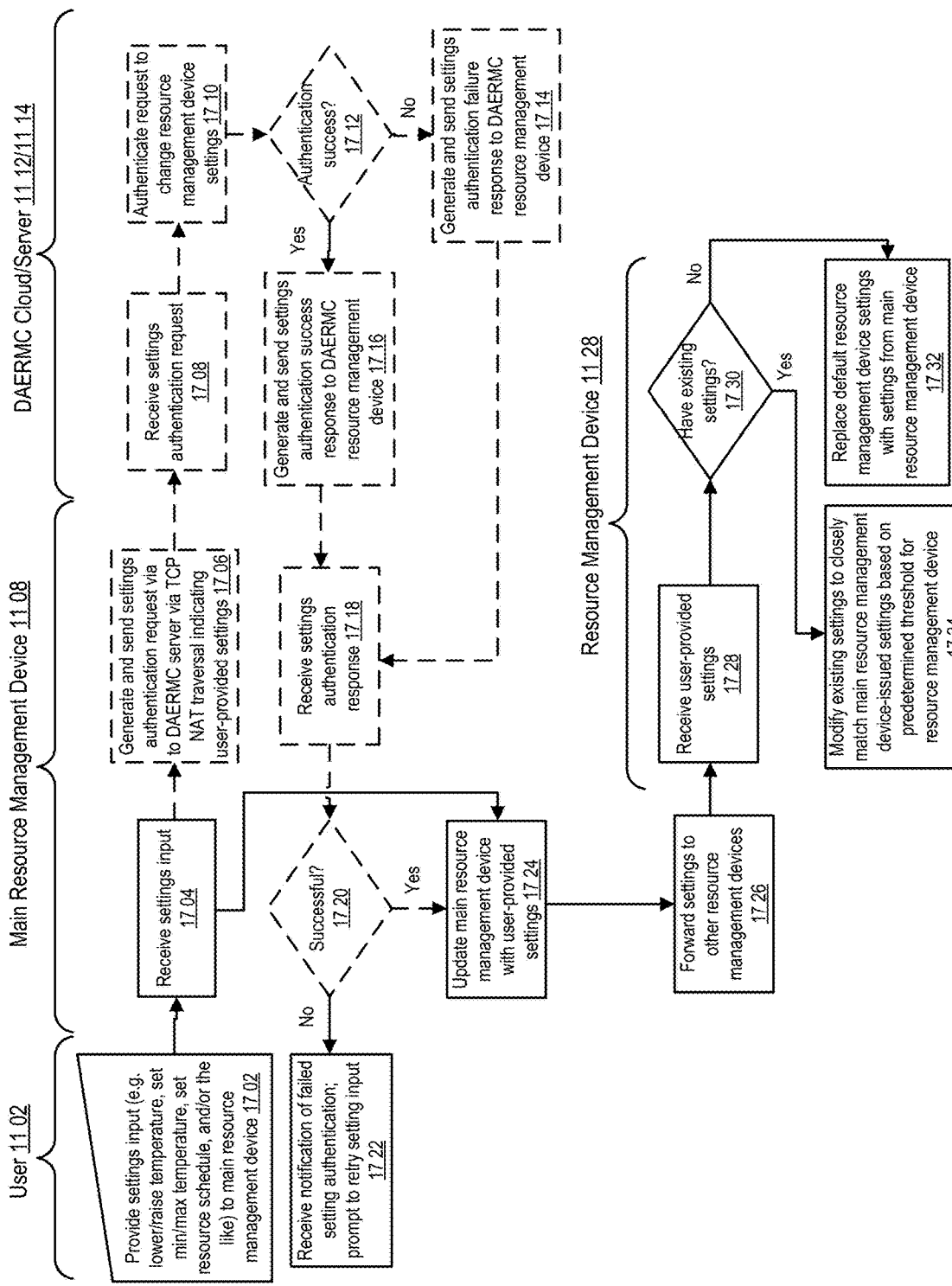
FIG. 17 shows a logic flow diagram illustrating updating resource management device settings in some embodiments of the DAERMC.

FIG. 17 shows a logic flow diagram illustrating updating resource management device settings in some embodiments of the DAERMC. In some implementations, a user may provide resource management device settings 1702 to her resource management device. Said settings may include temperature changes (e.g. lowering/raising temperatures, setting minimum/maximum temperatures, and/or the like), setting resource schedules, and/or like settings. Once the resource management device receives the settings 1704 from the user, the resource management device may generate and send a settings authentication request to the DAERMC cloud 1706 via a TCP or UDP NAT traversal connection (e.g. TCP/UDP hole punching). The cloud, after receiving 1708 the settings authentication request, may authenticate the user's request to change her resource management device settings 1710 based on the user's provided credentials and based on which of the resource management devices the user wishes to update have records which are linked to her account. If the authentication is successful 1712, then the cloud may generate and send an authentication response to the resource management device 1716 indicating that the authentication was successful. If the authentication is not a success 1712, then the cloud may generate and send an authentication failure response to the resource management device 1714. Once the resource management device has received a settings authentication response 1718, it may determine whether or not it received a notification of success or failure 1720. If authentication was successful, then the resource management device may update itself 1724 with the user-provided settings, and may forward 1726 the applicable settings to the user's other resource management devices. If the authentication was not successful, the user may receive a notification indicating that her settings authentication process failed 1722 (e.g. the user provided the wrong credentials, tried to send settings to a resource management device she does not own, and/or the like), and may be prompted to retry submitting her settings input.

Once settings have been received by the other resource management devices 1728, the resource management devices may determine whether or not there are previously-submitted settings on the other resource management devices 1730, or whether the other resource management devices are using default (e.g., factory-default, the exact settings last sent to the other resource management device by the resource management device, and/or the like) settings. If a other resource management device does not have existing custom settings, the other resource management device may replace its default settings with the settings received from the resource management device 1732. If a other resource management device has existing custom settings (e.g. settings from the user or a user who only has control over the other resource management device, and/or the like), then the other resource management device may need to modify its existing settings to reconcile them with the settings provided by the resource management device. For example, in some implementations, the other resource management device may modify its locally-provided settings to closely match those from the resource management device, but may have a predetermined threshold that allows the other resource management device to modify its settings without needing to completely override the settings already on the other resource management device. For example, another resource management device serving as a thermostat may be allowed to have settings that vary from those from the resource management device by 5° F., a other resource management device which controls lights may be able to leave lights on for an extra two hours in comparison with the resource management device schedule each day, and/or the like.

Figure 18:
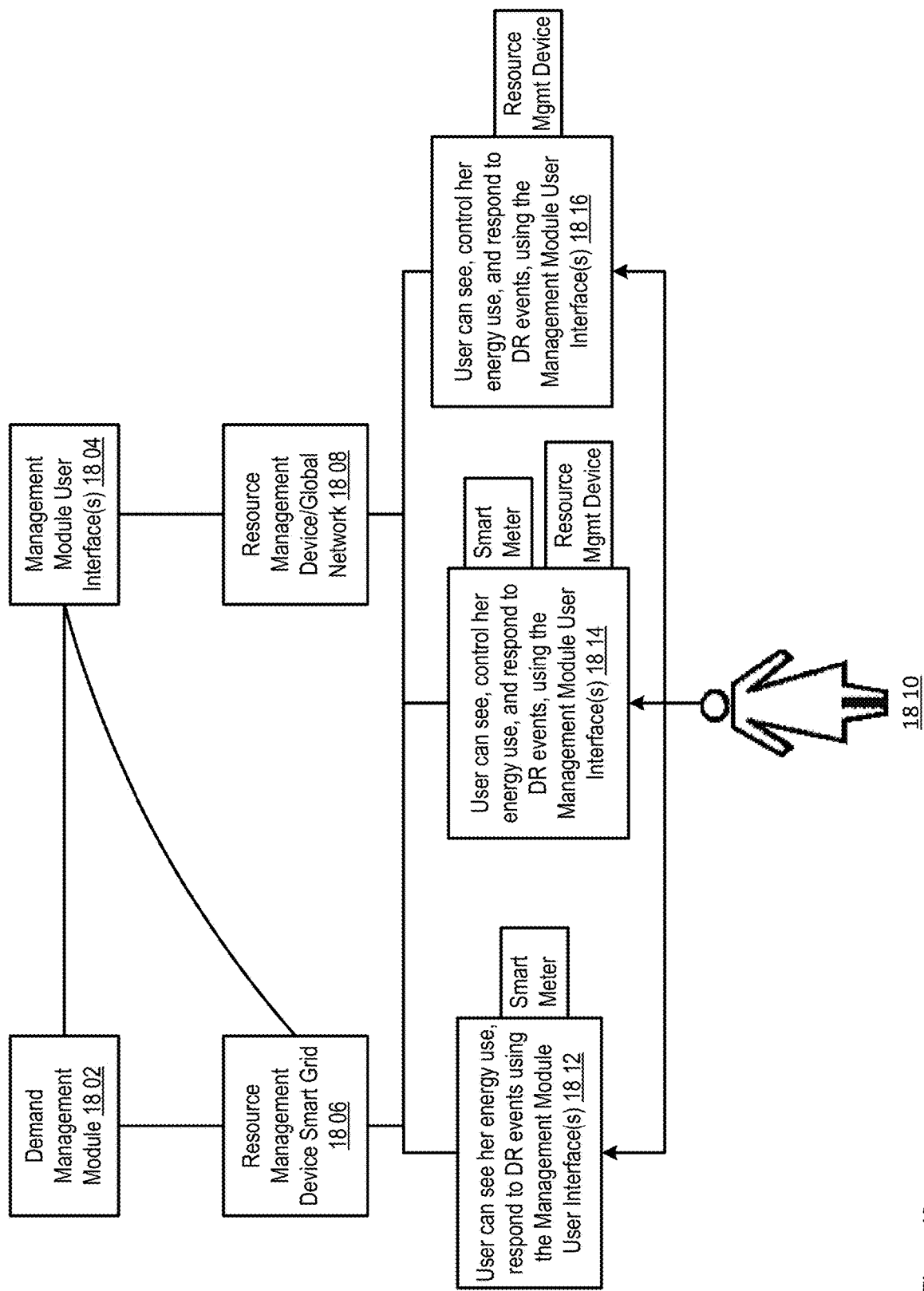
FIG. 18 shows a block diagram illustrating data users can access in some embodiments of the DAERMC.

FIG. 18 shows a block diagram illustrating data users can access in some embodiments of the DAERMC. In some implementations, a demand management module 1802 and management module user interfaces 1804 can be implemented in order to define a resource management device smart grid 1806 and a resource management device network 1808, e.g., operating on a global and/or local network. With just a smart meter 1812, a user 1810 may only be able to see her energy use, or respond to DR events, e.g., using the management module user interface(s) With a resource management device and a smart meter 1814, the user may be able to see and control her energy use, and respond to DR events, e.g., using the management module user interface(s). Similarly, using just the resource management device 1816, the user may also be able to see and control her energy use, and respond to DR events, e.g., using the Management Module User Interface(s). Thus, the user may be able to do more with a resource management device than she may be able to do with only a smart meter.

Figure 19:
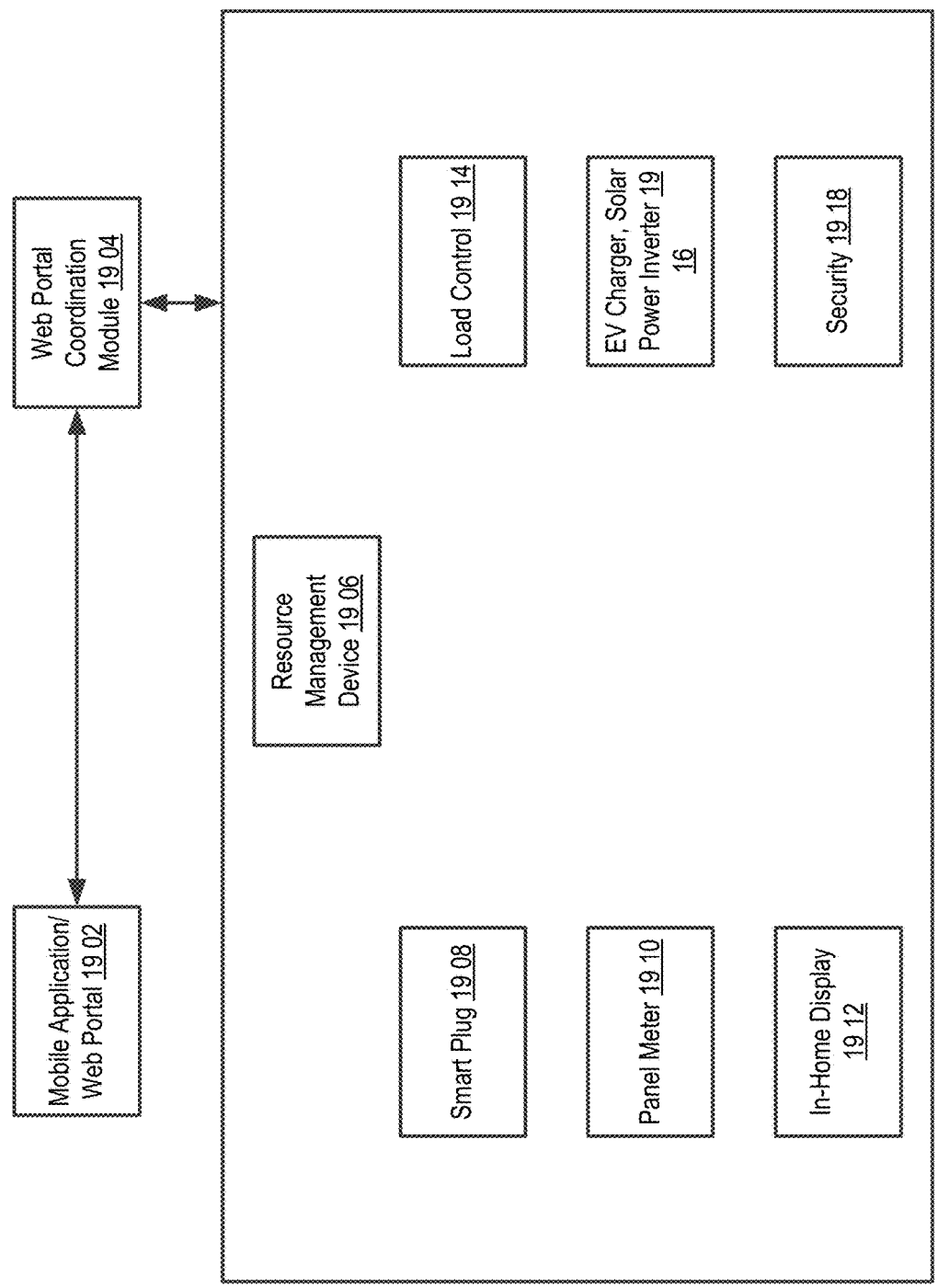
FIG. 19 shows a block diagram illustrating resource management device modification devices in some embodiments of the DAERMC.

FIG. 19 shows a block diagram illustrating resource management device modification devices and/or features in some embodiments of the DAERMC. For example, in some implementations, the user can use a mobile application and/or web portal 1902 to activate a resource management device, and/or to view and/or control energy use. The web portal coordination module 1904 can allow information from resource management devices to be uploaded to a cloud server, such that the information is accessible from the mobile application and/or web portal, and such that the cloud server can analyze the data to determine more information to provide to the user. Resource management devices 1906 can make automatic temperature adjustments, e.g., according to user input, sensor data, and/or other feedback. The smart plug 1908 can be plugged into power outlets and connected to electrical plugs for various electronics and/or appliances, such that the smart plug can track and/or control energy usage for electronics and/or appliances (such as lamps, computers, televisions, air conditioning units, microwaves, and/or the like). The panel meter 1910 can be used to monitor energy use throughout a site, and can relay this data to the cloud server, e.g., to provide to the user through the mobile application and/or web portal. The in-home display 1912 can be a display separate from a resource management device, and can be used to view energy use, to program and/or control the resource management device, electronics, appliances, and/or the like. The load control 1914 can monitor, control, and schedule large energy loads such as HVAC, pool pumps, and/or electric hot water heaters. The EV charger and solar power converter 1916 may be able to manage EV chargers and/or solar-powered products. Finally, security modules 1918 can be used to upgrade and/or augment existing security systems within the site, e.g., to monitor and/or control the existing security systems, locks, and/or other such security features.

DAERMC Controller

Figure 20:
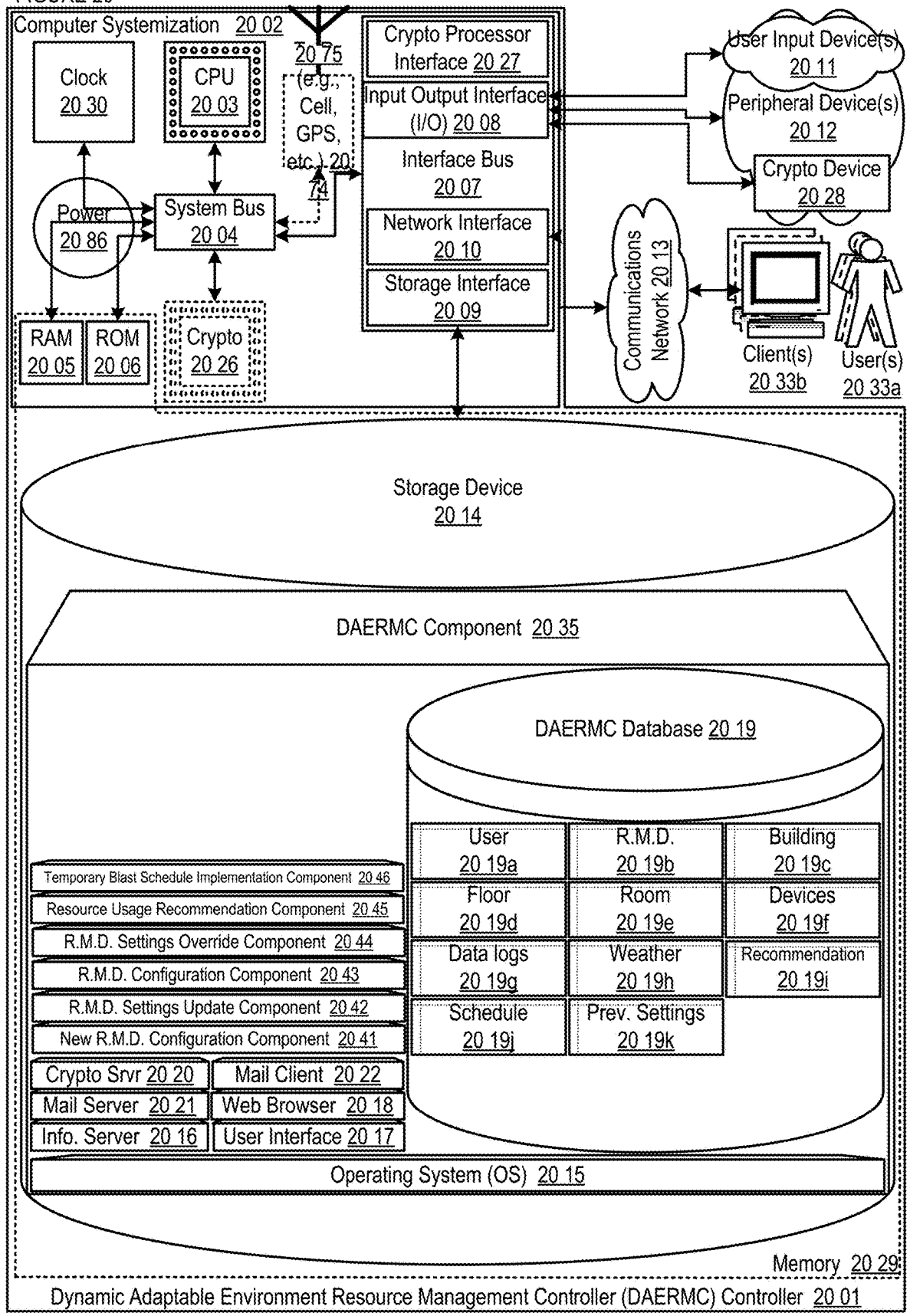
FIG. 20 shows a block diagram illustrating embodiments of a DAERMC resource management device.

FIG. 20 shows a block diagram illustrating embodiments of a DAERMC controller. In this embodiment, the DAERMC controller 2001 may serve to aggregate, process, store, search, serve, identify, instruct, generate, match, and/or facilitate interactions with a computer through NFC and virtual wallet technologies, and/or other related data.

Typically, users, which may be people and/or other systems, may engage information technology systems (e.g., computers) to facilitate information processing. In turn, computers employ processors to process information; such processors 2003 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2029 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DAERMC controller 2001 may be connected to and/or communicate with entities such as, but not limited to: one or more users from user input devices 2011; peripheral devices 2012; an optional cryptographic processor device 2028; and/or a communications network 2013.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DAERMC controller 2001 may be based on computer systems that may comprise, but are not limited to, components such as: a computer systemization 2002 connected to memory 2029.

Computer Systemization

A computer systemization 2002 may comprise a clock 2030, central processing unit ("CPU(s)" and/or "processor(s)" (these terms are used interchangeable throughout the disclosure unless noted to the contrary)) 2003, a memory 2029 (e.g., a read only memory (ROM) 2006, a random access memory (RAM) 2005, etc.), and/or an interface bus 2007, and most frequently, although not necessarily, are all interconnected and/or communicating through a system bus 2004 on one or more (mother)board(s) 2002 having conductive and/or otherwise transportive circuit pathways through which instructions (e.g., binary encoded signals) may travel to effectuate communications, operations, storage, etc. The computer systemization may be connected to a power source 2086; e.g., optionally the power source may be internal. Optionally, a cryptographic processor 2026 and/or transceivers (e.g., ICs) 2074 may be connected to the system bus. In another embodiment, the cryptographic processor and/or transceivers may be connected as either internal and/or external peripheral devices 2012 via the interface bus I/O. In turn, the transceivers may be connected to antenna(s) 2075, thereby effectuating wireless transmission and reception of various communication and/or sensor protocols; for example the antenna(s) may connect to: a Texas Instruments WiLink WI1283 transceiver chip (e.g., providing 802.11n, Bluetooth 3.0, FM, global positioning system (GPS) (thereby allowing DAERMC controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2029 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DAERMC controller and beyond through various interfaces.

Should processing requirements dictate a greater amount speed and/or capacity, distributed processors (e.g., Distributed DAERMC), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the DAERMC may be achieved by implementing a microcontroller such as CAST's R8051XC2 microcontroller; Intel's MCS 51 (i.e., 8051 microcontroller); and/or the like. Also, to implement certain features of the DAERMC, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DAERMC component collection (distributed or otherwise) and/or features may be implemented via the microprocessor and/or via embedded components; e.g., via ASIC, coprocessor, DSP, FPGA, and/ or the like. Alternately, some implementations of the DAERMC may be implemented with embedded components that are configured and used to achieve a variety of features or signal processing.

Depending on the particular implementation, the embedded components may include software solutions, hardware solutions, and/or some combination of both hardware/software solutions. For example, DAERMC features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DAERMC features. A hierarchy of programmable interconnects allow logic blocks to be interconnected as needed by the DAERMC system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DAERMC may be developed on regular FPGAs and then migrated into a fixed version that more resembles ASIC implementations. Alternate or coordinating implementations may migrate DAERMC controller features to a final ASIC instead of or in addition to FPGAs. Depending on the implementation all of the aforementioned embedded components and microprocessors may be considered the "CPU" and/or "processor" for the DAERMC.

Power Source

The power source 2086 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2086 is connected to at least one of the interconnected subsequent components of the DAERMC thereby providing an electric current to all subsequent components. In one example, the power source 2086 is connected to the system bus component 2004. In an alternative embodiment, an outside power source 2086 is provided through a connection across the I/O 2008 interface. For example, a USB and/or IEEE 1394 connection carries both data and power across the connection and is therefore a suitable source of power.

Interface Adapters

Interface bus(ses) 2007 may accept, connect, and/or communicate to a number of interface adapters, conventionally although not necessarily in the form of adapter cards, such as but not limited to: input output interfaces (I/O) 2008, storage interfaces 2009, network interfaces 2010, and/or the like. Optionally, cryptographic processor interfaces 2027 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2009 may accept, communicate, and/or connect to a number of storage devices such as, but not limited to: storage devices 2014, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2010 may accept, communicate, and/ or connect to a communications network 2013. Through a communications network 2013, the DAERMC controller is accessible through remote clients 2033b (e.g., computers with web browsers) by users 2033a. Network interfaces may employ connection protocols such as, but not limited to: direct connect, Ethernet (thick, thin, twisted pair 10/100/ 1000 Base T, and/or the like), Token Ring, wireless connection such as IEEE 802.11a-x, and/or the like. Should processing requirements dictate a greater amount speed and/or capacity, distributed network controllers (e.g., Distributed DAERMC), architectures may similarly be employed to pool, load balance, and/or otherwise increase the communicative bandwidth required by the DAERMC controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2010 may be used to engage with various communications network types 2013. For example, multiple network interfaces may be employed to allow for the communication over broadcast, multicast, and/or unicast networks.

Input Output interfaces (I/O) 2008 may accept, communicate, and/or connect to user input devices 2011, peripheral devices 2012, cryptographic processor devices 2028, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/big/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2011 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2012 may be connected and/or communicate to I/O and/or other facilities of the like such as network interfaces, storage interfaces, directly to the interface bus, system bus, the CPU, and/or the like. Peripheral devices may be external, internal and/or part of the DAERMC controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the DAERMC controller may be embodied as an embedded, dedicated, and/or monitor-less (i.e., headless) device, wherein access would be provided over a network interface connection.

Cryptographic units such as, but not limited to, microcontrollers, processors 2026, interfaces 2027, and/or devices 2028 may be attached, and/or communicate with the DAERMC controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2029. However, memory is a fungible technology and resource, thus, any number of memory embodiments may be employed in lieu of or in concert with one another. It is to be understood that the DAERMC controller and/or a computer systemization may employ various forms of memory 2029. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2029 will include ROM 2006, RAM 2005, and a storage device 2014. A storage device 2014 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2029 may contain a collection of program and/or database components and/or data such as, but not limited to: operating system component(s) 2015 (operating system); information server component(s) 2016 (information server); user interface component(s) 2017 (user interface); Web browser component(s) 2018 (Web browser); database(s) 2019; mail server component(s) 2021; mail client component(s) 2022; cryptographic server component(s) 2020 (cryptographic server); the DAERMC component(s) 2035, including components 2041-2046; and/or the like (i.e., collectively a component collection). These components may be stored and accessed from the storage devices and/or from storage devices accessible through an interface bus. Although non-conventional program components such as those in the component collection, typically, are stored in a local storage device 2014, they may also be loaded and/or stored in memory such as: peripheral devices, RAM, remote storage facilities through a communications network, ROM, various forms of memory, and/or the like.

Operating System

The operating system component 2015 is an executable program component facilitating the operation of the DAERMC controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DAERMC controller to communicate with other entities through a communications network 2013. Various communication protocols may be used by the DAERMC controller as a subcarrier transport mechanism for interaction, such as, but not limited to: multicast, TCP/IP, UDP, unicast, and/or the like.

Information Server

An information server component 2016 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DAERMC controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DAERMC database 2019, operating systems, other program components, user interfaces, Web browsers, and/or the like.

Access to the DAERMC database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DAERMC. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DAERMC as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets)

similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2017 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2018 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DAERMC enabled nodes. The combined application may be nugatory on systems employing standard Web browsers.

Mail Server

A mail server component 2021 is a stored program component that is executed by a CPU 2003. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the DAERMC.

Access to the DAERMC mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2022 is a stored program component that is executed by a CPU 2003. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2020 is a stored program component that is executed by a CPU 2003, cryptographic processor 2026, cryptographic processor interface 2027, cryptographic processor device 2028, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the DAERMC may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DAERMC component to engage in secure transactions if so desired. The cryptographic component facilitates the secure accessing of resources on the DAERMC and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DAERMC Database

The DAERMC database component 2019 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the DAERMC database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DAERMC database is implemented as a data-structure, the use of the DAERMC database 2019 may be integrated into another component such as the DAERMC component 2035. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2019 includes several tables 2019*a-k*. A user account table 2019*a* includes fields such as, but not limited to: user_ID, user_name, user_password, user_fname, user_lname, user_address, user_devices, user_email, user_date_added, user_RMDs, user_buildings, and/or the like. The user account table may support and/or track multiple user accounts on a DAERMC.

A resource management device table 2019*b* includes fields such as, but not limited to: RMD_ID, RMD_type, RMD_make, RMD_model, RMD_version, RMD_location, RMD_settings_current, RMD_settings_history, RMD_child_RMDs, RMD_initiated, RMD_last_updated, and/or the like. The resource management device table may support and/or track multiple resource management devices on a DAERMC.

A building table 2019*c* includes fields such as, but not limited to: building_ID, building_name, building_address, building_GPS, building_floors, and/or the like. The building table may support and/or track buildings using resource management devices on a DAERMC.

A floor table 2019*d* includes fields such as, but not limited to: floor_ID, floor_name, floor_RMDs, floor_rooms, floor_number, and/or the like. The floor table may support and/or track floors using resource management devices on a DAERMC.

A room table 2019*e* includes fields such as, but not limited to: room_ID, room_type, room_name, room_RMDs, room_number, room_window_facing, and/or the like. The room table may support and/or track rooms using resource management devices on a DAERMC.

An devices table 2019*f* includes fields such as, but not limited to: device_ID, device_user ID, device_type, device_make, device_model, device_OS, device_name, and/or the like. The devuces table may support and/or track electronic devices (e.g., electronic mobile devices and/or the like) on a DAERMC.

A data logs table 2019*g* includes fields such as, but not limited to: log_ID, log_date, log_settings, log_errors, logs_status, logs_usage, and/or the like. The building table may support and/or track data logs from resource management devices on a DAERMC.

A weather table 2019*h* includes fields such as, but not limited to: weather_ID, weather_date, weather_temperature, weather_humidity, weather_daytime, weather_nighttime, weather_storm_data, and/or the like. The weather table may support and/or track weather data on a DAERMC.

A recommendation table 2019*i* includes fields such as, but not limited to: rec_ID, rec_user, rec_RMD, rec_settings, rec_date_created, rec_model, rec_score, rec_approved, and/or the like. The recommendation table may support and/or track settings recommendations on a DAERMC.

A schedule table 2019*j* includes fields such as, but not limited to: schedule_ID, schedule_name, schedule_user, schedule_away, schedule_away_settings, schedule_home, schedule_home_settings, schedule_sleep, schedule_sleep_ settings, schedule_date_created, and/or the like. The schedule table may support and/or track settings schedules on a DAERMC.

A previous settings table 2019k includes fields such as, but not limited to: ps_ID, ps_user, ps_RMD, ps_settings_by_date, ps_settings_by_user, and/or the like. The previous schedule table may support and/or track previous settings data on a DAERMC.

In one embodiment, the DAERMC database may interact with other database systems. For example, employing a distributed database system, queries and data access by search DAERMC component may treat the combination of the DAERMC database, an integrated data security layer database as a single database entity.

In one embodiment, user programs may contain various user interface primitives, which may serve to update the DAERMC. Also, various accounts may require custom database tables depending upon the environments and the types of clients the DAERMC may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2019a-k. The DAERMC may be configured to keep track of various settings, inputs, and parameters via database controllers.

The DAERMC database may communicate to and/or with other components in a component collection, including itself, and/or facilities of the like. Most frequently, the DAERMC database communicates with the DAERMC component, other program components, and/or the like. The database may contain, retain, and provide information regarding other nodes and data.

The DAERMCs

The DAERMC component 2035 is a stored program component that is executed by a CPU. In one embodiment, the DAERMC component incorporates any and/or all combinations of the aspects of the DAERMC that was discussed in the previous figures. As such, the DAERMC affects accessing, obtaining and the provision of information, services, transactions, and/or the like across various communications networks. The features and embodiments of the DAERMC discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DAERMC's features and facilities, and in many cases reduce the costs, energy consumption/requirements, and extend the life of DAERMC's underlying infrastructure; this has the added benefit of making the DAERMC more reliable. Similarly, many of the features and mechanisms are designed to be easier for users to use and access, thereby broadening the audience that may enjoy/employ and exploit the feature sets of the DAERMC; such ease of use also helps to increase the reliability of the DAERMC. In addition, the feature sets include heightened security as noted via the Cryptographic components 2020, 2026, 2028 and throughout, making access to the features and data more reliable and secure.

The DAERMC transforms weather, user, and settings inputs via DAERMC's New Resource Management Device Configuration 2041, Resource Management Device Settings Update 2042, Resource Management Device Configuration 2043, Resource Management Device Settings Override Configuration 2044, Resource Usage Recommendation 2045, and Temporary Blast Schedule Implementation 2046 components into settings, data logs, schedules and settings recommendation outputs.

The DAERMC component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DAERMC server employs a cryptographic server to encrypt and decrypt communications. The DAERMC component may communicate to and/or with other components in a component collection, including itself, and/or facilities of the like. Most frequently, the DAERMC component communicates with the DAERMC database, operating systems, other program components, and/or the like. The DAERMC may contain, communicate, generate, obtain, and/or provide program component, system, user, and/or data communications, requests, and/or responses.

Distributed DAERMCs

The structure and/or operation of any of the DAERMC node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DAERMC controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DAERMC controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An example listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
index.jsp?topic=/com.ibm.IBMDI.doc/referenceguide295.htm and other parser implementations:

http://publib.boulder.ibm.com/infocenter/tivihelp/v2r1/
index.jsp?topic=/com.ibm.IBMDI.doc/referenceguide259.htm all of which are hereby expressly incorporated by reference.

In order to address various issues and advance the art, the entirety of this application for DYNAMIC ADAPTABLE ENVIRONMENT RESOURCE MANAGEMENT CONTROLLER APPARATUSES, METHODS AND SYSTEMS (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DAERMC individual and/or enterprise user, database configuration and/or relational model, data type, data transmission and/or network framework, syntax structure, and/or the like, various embodiments of the DAERMC, may be implemented that enable a great deal of flexibility and customization. While various embodiments and discussions of the DAERMC have included management of energy and/or temperature settings and/or related resources it is to be understood that the embodiments described herein may be readily configured and/or customized for a wide variety of other applications and/or implementations, including any other resource management (e.g. electricity, water, gas, and/or the like).

What is claimed is:

1. A dynamic adaptable environment resource apparatus, comprising:
    a plurality of environment sensors configured to collect home status data;
    a graphical interface configured to receive and/or display resource schedule data;
    a processor configured to:
        process the resource schedule data and the home status data and issue communications to implement at least one adaptive environment schedule, the at least one adaptive environment schedule changing based on the processed resource schedule data and the processed home status data,
        receive a user request to initiate a temporary override of the at least one adaptive environment schedule,
        implement a temporary override schedule based on the temporary override of the at least one adaptive environment schedule without adjusting the at least one adaptive environment schedule, the temporary override schedule being a different schedule from the at least one adaptive environment schedule and including a specified time period for the duration of the temporary override schedule, and
        return to the at least one adaptive environment schedule after completion of the specified time period of the temporary override schedule, wherein home status data collected from the plurality of environment sensors during the temporary override of the at least one adaptive environment schedule does not change the at least one adaptive environment schedule.

2. The apparatus of claim 1, wherein the plurality of environment sensors include one of temperature sensors, proximity sensors, light sensors, and humidity sensors.

3. The apparatus of claim 1, wherein the home status data includes home temperature data, home humidity data, a home brightness data, home occupancy status data, and/or outdoor weather data.

4. The apparatus of claim 3, wherein the home occupancy status indicates whether a particular user is within a home and/or whether any of a plurality of users are within a home.

5. The apparatus of claim 3, wherein the outdoor weather data includes weather pattern data, outdoor temperature data, and outdoor humidity data.

6. The apparatus of claim 1, further comprising an illumination interface configured to provide illumination based on at least one of home status data, resource schedule data, and temporary override schedule.

7. The apparatus of claim 1, the processor is configured to change an environment schedule when changes in light or humidity in a portion of a site are detected via at least one of the environment sensors, or when changes in weather in a user's area are detected via at least one of the environment sensors.

8. A dynamic adaptable environment resource processor implemented method, comprising:
    receiving a request to initiate a heat blast or a cool blast at a resource management device;
    creating a temporary blast schedule based on the request;
    overriding a current schedule with the temporary blast schedule for a duration of the temporary blast schedule;
    calculating a temporary blast schedule termination delay based on a duration of the temporary blast schedule, or based on a difference between a final temperature of the temporary blast schedule and a regular schedule temperature of the current schedule;
    implementing the temporary blast schedule termination delay after the temporary blast schedule ends; and
    restoring the current schedule after the temporary blast schedule termination delay.

9. The method of claim 8, wherein the temporary blast schedule is created using a minimum temperature when a cool blast is initiated.

10. The method of claim 8, wherein the temporary blast schedule is created using a maximum temperature when a heat blast is initiated.

11. The method of claim 8, wherein the temporary blast schedule includes a start time, the duration of the temporary blast schedule, a temperature setpoint, and an indication of whether the request was made locally or remotely.

12. A dynamic adaptable environment resource processor implemented method, comprising:
   receiving a request to initiate a heat blast or a cool blast at a resource management device;
   overriding a current schedule with a temporary blast schedule, the temporary blast schedule being based on the request;
   initiating a temporary blast schedule initiation notification action;
   determining if the temporary blast schedule is close to ending, such that the resource management device initiates a temporary blast schedule termination warning notification action if the temporary blast schedule is close to ending;
   determining when the temporary blast schedule has ended, such that the resource management device initiates a temporary blast schedule termination notification action when the temporary blast schedule ends;
   calculating a temporary blast schedule termination delay based on a duration of the temporary blast schedule, or based on a difference between a final temperature of the temporary blast schedule and a regular schedule temperature of the current schedule;
   implementing the temporary blast schedule termination delay after the temporary blast schedule ends; and
   restoring the current schedule after the temporary blast schedule termination delay.

13. The method of claim 12, wherein the temporary blast schedule initiation notification action is one of initiating an ambient light within a casing of the resource management device, initiating an auditory notification, or displaying a notification on a display of the resource management device.

14. The method of claim 13, wherein initiating the ambient light for the temporary blast schedule initiation notification action includes turning the ambient light on in a static mode until the temporary blast schedule termination warning notification is initiated.

15. The method of claim 12, wherein initiating the temporary blast schedule initiation notification action includes flashing an ambient light until the temporary blast schedule termination notification is initiated.

16. The method of claim 12, wherein the temporary blast schedule includes a start time, the duration of the temporary blast schedule, a temperature setpoint, and an indication of whether the request was made locally or remotely.

17. A dynamic adaptable environment resource apparatus, comprising:
   a processor; and
   a memory disposed in communication with the processor and containing processor-readable instructions that enable the processor to:
   determine environment control parameters;
   determine environment temporal preferences;
   determine an at least one adaptive environment schedule based on determined environment control parameters and determined environment temporal preferences;
   implement the at least one adaptive environment schedule, the implementation of the at least one adaptive environment schedule including monitoring at least one sensor and adjusting an at least one HVAC device to maintain environmental conditions according to the at least one adaptive environment schedule;
   receive a temporary override request to change environment conditions relative to the at least one adaptive environment schedule; and
   implement the temporary override request without adjusting the at least one adaptive environment schedule, wherein data collected from the at least one sensor during the temporary override of the at least one adaptive environment schedule does not change the at least one adaptive environment schedule.

* * * * *